US009272925B2

(12) United States Patent
Lee et al.

(10) Patent No.: US 9,272,925 B2
(45) Date of Patent: Mar. 1, 2016

(54) APPARATUS FOR TREATING BALLAST WATER WITH ULTRAVIOLET RAYS, HAVING SQUARE CROSS-SECTION

(75) Inventors: Soo-Tae Lee, Busan (KR); Tae-Sung Pyo, Busan (KR); Su-Kyu Lee, Busan (KR)

(73) Assignee: Panasia Co., Ltd., Busan (KR)

( * ) Notice: Subject to any disclaimer, the term of this patent is extended or adjusted under 35 U.S.C. 154(b) by 0 days.

(21) Appl. No.: 14/424,381

(22) PCT Filed: Sep. 5, 2012

(86) PCT No.: PCT/KR2012/007115
§ 371 (c)(1),
(2), (4) Date: Feb. 26, 2015

(87) PCT Pub. No.: WO2014/034987
PCT Pub. Date: Mar. 6, 2014

(65) Prior Publication Data
US 2015/0203368 A1 Jul. 23, 2015

(30) Foreign Application Priority Data
Sep. 3, 2012 (KR) .................. 10-2012-0097377

(51) Int. Cl.
| A61L 2/10 | (2006.01) |
| C02F 1/32 | (2006.01) |
| B08B 1/00 | (2006.01) |
| B63J 4/00 | (2006.01) |
| B63B 11/00 | (2006.01) |
| C02F 103/00 | (2006.01) |

(52) U.S. Cl.
CPC ............... C02F 1/325 (2013.01); B08B 1/008 (2013.01); B63B 11/00 (2013.01); B63J 4/002 (2013.01); *C02F 2103/008* (2013.01); *C02F 2201/324* (2013.01); *C02F 2201/326* (2013.01); *C02F 2201/328* (2013.01); *C02F 2201/3227* (2013.01); *C02F 2303/04* (2013.01)

(58) Field of Classification Search
USPC ............................ 250/428, 431, 432 R, 435
See application file for complete search history.

(56) References Cited

FOREIGN PATENT DOCUMENTS

| JP | 2001-029941 | 2/2001 |
| JP | 2001-029941 A | 2/2001 |
| JP | 2012-125736 | 7/2012 |
| JP | 2012-125736 A | 7/2012 |
| JP | 2012-162252 A | 8/2012 |
| KR | 10-0505079 | 8/2005 |
| KR | 10-2009-0039305 | 4/2009 |
| KR | 10-0964403 | 6/2010 |
| KR | 10-0994168 | 11/2010 |

OTHER PUBLICATIONS

PCT/KR2012/007115; International Search Report dated Jan. 30, 2013.

*Primary Examiner* — Nicole Ippolito
*Assistant Examiner* — Hanway Chang
(74) *Attorney, Agent, or Firm* — Workman Nydegger

(57) ABSTRACT

Disclosed herein is an apparatus for sterilizing ballast water. Ultraviolet lamps are installed in a body, and a cross-section of the body that is perpendicular to the orientation of the ultraviolet lamps is rectangular. The ultraviolet lamps are arranged at regular intervals in the rectangular cross-section of the body so that the number of ultraviolet lamps arranged per a unit cross-sectional area can be minimized. Thereby, the power consumption of the apparatus and the space required for installation thereof can be reduced. Furthermore, lines, each of which includes ultraviolet lamps arranged in a row perpendicular to the direction of the flow of ballast water, are arranged in the rectangular cross-section of the body. The ultraviolet lamps of each line are disposed between the ultraviolet lamps of the preceding or following line. Thus, ballast water can be prevented from being discharged out of the body without colliding with any ultraviolet lamp.

7 Claims, 40 Drawing Sheets

APPARATUS FOR TREATING BALLAST WATER WITH ULTRAVIOLET RAYS, HAVING SQUARE CROSS-SECTION

TECHNICAL FIELD

The present invention generally relates to ultraviolet ballast water treatment apparatuses using ultraviolet rays for sterilizing ballast water drawn into vessels. More particularly, the present invention relates to an ultraviolet ballast water treatment apparatus having a rectangular cross-section in which ultraviolet lamps are installed in a body, and a cross-section of the body that is perpendicular to the direction of orientation of the ultraviolet lamps is formed to be rectangular, wherein the ultraviolet lamps are arranged at positions spaced apart from each other at regular intervals in the rectangular cross-section of the body so that the number of ultraviolet lamps arranged per a unit cross-sectional area can be minimized, whereby the power consumption of the ultraviolet ballast water treatment apparatus and the space required for installation of the ultraviolet ballast water treatment apparatus in a vessel having a limited space can be reduced. Furthermore, the ultraviolet ballast water treatment apparatus is configured such that a plurality of lines, each of which includes a plurality of ultraviolet lamps arranged in a row perpendicular to the direction of the flow of ballast water, are arranged in the rectangular cross-section of the body, wherein the ultraviolet lamps of each line are disposed between the ultraviolet lamps of the preceding or following line so that ballast water can be prevented from being discharged out of the body without colliding with any ultraviolet lamp. In addition, the ultraviolet ballast water treatment apparatus is provided with a drive shaft that moves an arm coupled to wipers for use in removing foreign substances from the ultraviolet lamp unit, wherein the drive shaft is disposed at a predetermined position such that the drive shaft does not impede application of ultraviolet rays to ballast water.

BACKGROUND ART

Ballast water refers to sea water that is charged into a ballast tank of a vessel to maintain balance of the vessel when the vessel sails without cargo.

As marine transportation rates have gradually increased along with an increase in international trade, the number of vessels used has increased, and the vessels used are becoming larger. As a result, the amount of ballast water used in vessels has greatly increased. As the amount of ballast water used in vessels is increased, occurrence of damage to indigenous ocean ecosystems attributable to the introduction of foreign marine creature species is also increased. To solve such international environmental issues, in 2004, the IMO (International Maritime Organization) established 'International Convention for the Control and Management for ships' Ballast Water and Sediments'. Since 2009, ballast water treatment apparatuses have been obligatorily installed in newly constructed vessels.

Of apparatuses for treating ballast water, ultraviolet ballast water treatment apparatuses that sterilize ballast water using ultraviolet rays are widely used. FIG. 1 is an exploded perspective view of a conventional ultraviolet ballast water treatment apparatus. FIG. 2 is a sectional view of the conventional ultraviolet ballast water treatment apparatus.

Referring to FIGS. 1 and 2, the conventional ultraviolet ballast water treatment apparatus includes a cylindrical body 1001. Due to the cylindrical shape of the body 1001, ultraviolet lamps 1002 provided in the body 1001 are also arranged in a circumferential shape corresponding to the cylindrical shape of the body 1001. As shown in FIG. 2, when the number of ultraviolet lamps 1002 is comparatively large, the ultraviolet lamps 1002 are arranged in a plurality of rows having different diameters.

However, in the conventional ultraviolet ballast water treatment apparatus, because the ultraviolet lamps 1002 must be densely arranged at regular intervals in the body 1001 having a circular cross-section, the number of ultraviolet lamps per a unit cross-sectional area is increased, and the power consumption is thus increased. When it is intended to increase the number of ultraviolet lamps and thus increase the ballast water treatment capacity, a circumferential row must be added. Therefore, the cross-sectional area of the body 1001 is greatly increased by the square of an increased radius (the area of a circle=$\pi r^2$). In addition, the number of ultraviolet lamps of the added circumferential row must be greater than that of the existing outermost row (the circumference of the added circumferential row is larger than that of the existing outermost row). As such, it is impossible to increase the capacity scale of ballast water treatment by a small degree. Thus, it is difficult to increase the treatment capacity by only the required degree.

Moreover, as shown in FIG. 2, when the ultraviolet lamps 1002 are arranged in a circumferential direction, there is the possibility of ballast water linearly passing between the ultraviolet lamps 1002 without making direct contact with the ultraviolet lamps 1002 while passing through the ultraviolet ballast water treatment apparatus (refer to the arrows designated by ⓐ, ⓑ, and ⓒ). Given the fact that the treatment effect using ultraviolet rays is proportional not only to the intensity of ultraviolet rays but also the time for which ultraviolet rays are applied to ballast water, the ballast water treatment effect of the conventional technique is largely reduced because the speed of the flow of ballast water (refer to ⓐ, ⓑ, and ⓒ) that linearly flows without making contact with any ultraviolet lamp 1002 is increased and thus the time for which ultraviolet rays are applied to ballast water is reduced.

DISCLOSURE

Technical Problem

Accordingly, the present invention has been made keeping in mind the above problems occurring in the prior art, and an object of the present invention is to provide an ultraviolet ballast water treatment apparatus in which ultraviolet lamps are installed in a body, and a cross-section of the body that is perpendicular to the direction of the orientation of the ultraviolet lamps has a rectangular shape, wherein the ultraviolet lamps are arranged at positions spaced apart from each other at regular intervals in the rectangular cross-section of the body so that the number of ultraviolet lamps arranged per a unit cross-sectional area can be minimized, whereby the power consumption of the ultraviolet ballast water treatment apparatus and the space required for installation of the ultraviolet ballast water treatment apparatus in a vessel having a limited space can be reduced.

Another object of the present invention is to provide an ultraviolet ballast water treatment apparatus in which the number of ultraviolet lamps per a unit cross-sectional area can be minimized, whereby even if the capacity of ultraviolet ballast water treatment apparatus is greatly increased, the volume of the apparatus can be prevented from being largely increased.

A further object of the present invention is to provide an ultraviolet ballast water treatment apparatus that is configured such that a plurality of lines, each of which includes a plurality of ultraviolet lamps arranged in a row perpendicular to the direction of the flow of ballast water, are arranged in the rectangular cross-section of the body, wherein the ultraviolet lamps of each line are disposed between the ultraviolet lamps of the preceding or following line so that ballast water can be prevented from being discharged out of the body without colliding with any ultraviolet lamp unit, thus enhancing the efficiency of treating ballast water using ultraviolet rays.

Yet another object of the present invention is to provide an ultraviolet ballast water treatment apparatus in which a drive shaft that moves an arm provided with wipers for removing foreign substances adhering to the ultraviolet lamp unit is disposed between the lines so that the drive shaft can be prevented from impeding application of ultraviolet rays to ballast water, wherein if the drive shaft is disposed in an intermediate one of three lines and thus there is an interference between the drive shaft and an ultraviolet lamp, the corresponding ultraviolet lamp is disposed ahead of or behind the drive shaft with respect to the direction of the flow of ballast water so as to prevent ballast water from flowing out of the apparatus without making contact with any ultraviolet lamp.

Still another object of the present invention is to provide an ultraviolet ballast water treatment apparatus in which each wiper for use in removing foreign substances from the corresponding ultraviolet lamp has a double structure including a main wiper part and auxiliary wiper parts and is installed in the corresponding wiper body, whereby foreign substances adhering to the ultraviolet lamp unit can be more reliably removed by the double structure.

Still another object of the present invention is to provide an ultraviolet ballast water treatment apparatus in which the main wiper part is disposed in a central portion of the circumferential inner surface of the wiper body and used to remove foreign substances adhering to the ultraviolet lamp unit disposed inside the inner circumferential surface of the wiper body, and the auxiliary wiper parts are disposed on opposite sides of the main wiper part so that when the wiper body is moved forward or backward, the corresponding auxiliary wiper part primarily removes foreign substances from the ultraviolet lamp unit before the main wiper part wipes the ultraviolet lamp unit to remove the remaining foreign substances.

Technical Solution

In order to accomplish the above objects, the present invention provides an ultraviolet ballast water treatment apparatus having a rectangular cross-section, including: a body including an inlet port and an outlet port through which ballast water is drawn into and discharged out of the body; an ultraviolet lamp unit including ultraviolet lamps applying ultraviolet rays to ballast water flowing through the body; and a washing unit provided to remove foreign substances adhering to the ultraviolet lamp unit, wherein a cross-section of the body that is perpendicular to a direction of orientation of the ultraviolet lamps is rectangular, and the ultraviolet lamps are arranged at regular intervals in the rectangular cross-section, whereby a number of ultraviolet lamps arranged per a unit cross-sectional area is minimized.

The ultraviolet lamps may form a plurality of lines in the rectangular cross-section of the body. Each of the lines may include the corresponding ultraviolet lamps arranged in a row perpendicular to a direction in which the ballast water flows.

The ultraviolet lamps of a second line spaced apart from a first line adjacent to the inlet port by a predetermined distance with respect to the direction of the flow of ballast water may be respectively disposed between the ultraviolet lamps of the first line when seen in the direction of the flow of ballast water, whereby the ballast water is prevented from being discharged out of the body without colliding with the ultraviolet lamps.

Furthermore, a drive shaft provided to move an arm provided with a wiper may be disposed between the lines. The wiper may be used to remove foreign substances adhering to the ultraviolet lamp unit.

The lines may comprise three lines, and a drive shaft provided to move an arm provided with a wiper may be disposed on an intermediate line of the three lines, the wiper being used to remove foreign substances adhering to the ultraviolet lamp unit. The ultraviolet lamp of the intermediate line that corresponds to a position interfering with the drive shaft may be disposed ahead of or behind the drive shaft with respect to the direction of the flow of the ballast water, whereby the ballast water is prevented from being discharged out of the body without colliding with the ultraviolet lamps.

The washing unit may include: a wiper body encircling each of the ultraviolet lamps, with a wiper installed in the wiper body, the wiper being used to remove foreign substances; an arm connecting the wiper body to a drive shaft; and a drive motor providing power to the drive shaft moving the arm. The wiper may include a main wiper part and an auxiliary wiper part installed in the wiper body, the main wiper part and the auxiliary wiper part doubly removing foreign substances adhering to the ultraviolet lamp unit.

The main wiper part may be disposed in a central portion of an inner circumferential surface of the wiper body, the main wiper part removing foreign substances adhering to the ultraviolet lamp unit disposed inside the wiper body. The auxiliary wiper part may comprise auxiliary wiper parts respectively disposed on opposite sides of the main wiper parts so that when the arm is moved forward or rearward, foreign substances adhering to the ultraviolet lamp unit are primarily removed by a corresponding one of the auxiliary wiper parts before being wiped by the main wiper part.

Each of the auxiliary wiper parts may include an inclined protrusion protruding from an inner circumferential surface of a main body of the auxiliary wiper part outward and forward in a direction inclined by a predetermined angle. The inclined protrusion may include a pointed part coming into line contact with a surface of the ultraviolet lamp unit rather than making surface contact therewith. The main wiper part may include: a depression in an inner circumferential surface thereof that comes into contact with the surface of the ultraviolet lamp unit; and a first blade and a second blade respectively provided on opposite sides of the depression.

Advantageous Effects

The present invention having the above-mentioned constructions, which will be explained in detail with reference to the embodiments, has the following effects.

In the present invention, ultraviolet lamps are installed in a body, and a cross-section of the body that is perpendicular to the direction of the orientation of the ultraviolet lamps has a rectangular shape. The ultraviolet lamps are arranged at positions spaced apart from each other at regular intervals in the rectangular cross-section of the body so that the number of ultraviolet lamps arranged per a unit cross-sectional area can be minimized. Thereby, the power consumption of the ultraviolet ballast water treatment apparatus and the space required for installation of the ultraviolet ballast water treatment apparatus in a vessel having a limited space can be reduced.

As stated above, in the present invention, the number of ultraviolet lamps per a unit cross-sectional area can be minimized. Thus, even if the capacity of ultraviolet ballast water treatment apparatus is greatly increased, the volume of the apparatus can be prevented from being largely increased.

Furthermore, a plurality of lines, each of which includes a plurality of ultraviolet lamps arranged in a row perpendicular to the direction of the flow of ballast water, are arranged in the rectangular cross-section of the body. The ultraviolet lamps of each line are disposed between the ultraviolet lamps of the preceding or following line so that ballast water can be prevented from being discharged out of the body without colliding with any ultraviolet lamp unit, thus enhancing the efficiency of treating ballast water using ultraviolet rays.

In addition, a drive shaft that moves an arm provided with wipers for removing foreign substances adhering to the ultraviolet lamp unit is disposed between the lines so that the drive shaft can be prevented from impeding application of ultraviolet rays to ballast water. If the drive shaft is disposed in an intermediate one of three lines and thus there is an interference between the drive shaft and an ultraviolet lamp, the corresponding ultraviolet lamp is disposed ahead of or behind the drive shaft with respect to the direction of the flow of ballast water, thus preventing ballast water from flowing out of the apparatus without making contact with any ultraviolet lamp.

Each wiper for use in removing foreign substances from the corresponding ultraviolet lamp has a double structure including a main wiper part and auxiliary wiper parts and is installed in the corresponding wiper body, whereby foreign substances adhering to the ultraviolet lamp unit can be more reliably removed by the double structure.

The main wiper part is disposed in a central portion of the circumferential inner surface of the wiper body and used to remove foreign substances adhering to the ultraviolet lamp unit disposed inside the inner circumferential surface of the wiper body. The auxiliary wiper parts are disposed on opposite sides of the main wiper part. Thus, when the wiper body is moved forward or backward, the corresponding auxiliary wiper part primarily removes foreign substances from the ultraviolet lamp unit before the main wiper part wipes the ultraviolet lamp unit to remove the remaining foreign substances. Thereby, foreign substances adhering to the ultraviolet lamp unit can be more reliably removed.

Figure 1:
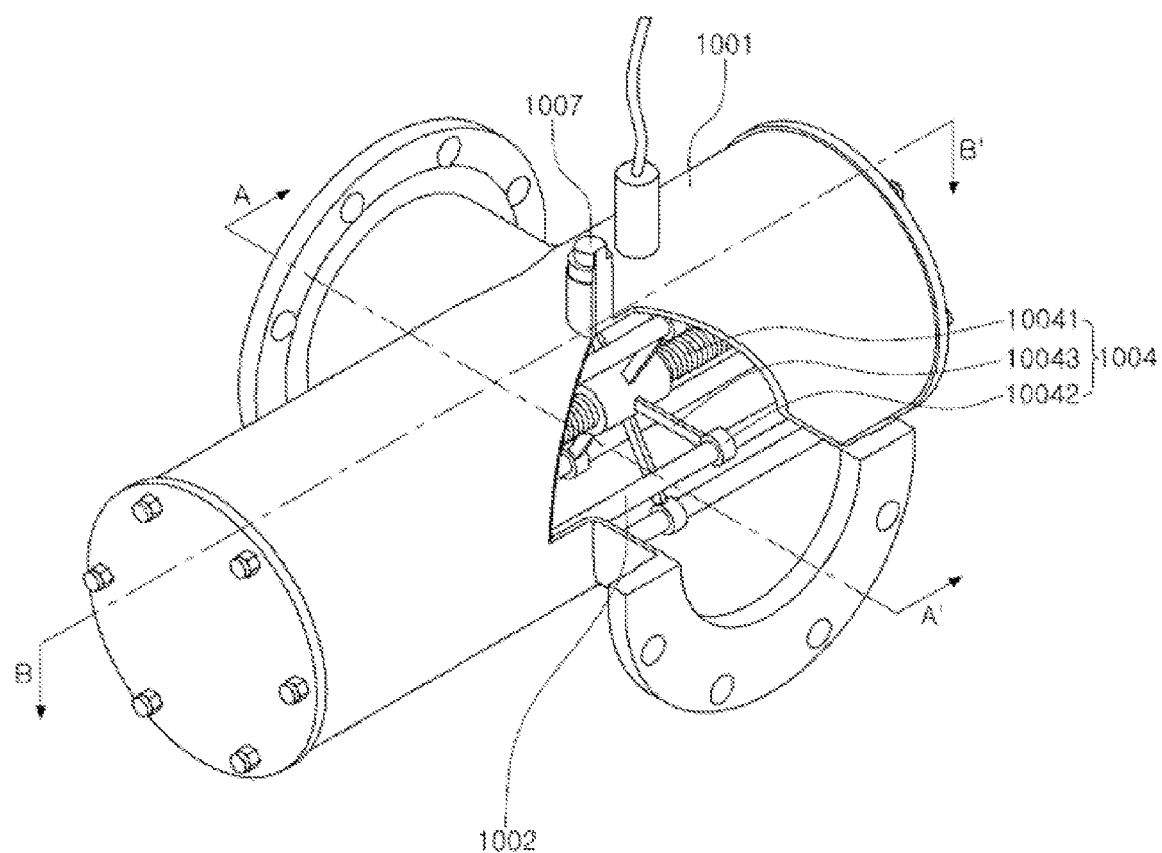
FIG. 1 is an exploded perspective view showing a conventional ultraviolet ballast water treatment apparatus.

DESCRIPTION OF THE REFERENCE
NUMERALS IN THE DRAWINGS

10: body 110: rectangular cross-section 121: upper surface
  122: lower surface
123: side surface 124: inlet port 125: outlet port 126: side cover
1211: installation or maintenance hole 1212: cover 130: partition plate 131: lamp insert hole
132: drive shaft insert hole 133: first space 134: second space 135: third space
140: gas flow line 141: auxiliary flow line 150: gas inlet line
160: protruding plate 161: second protruding plate 170: motor receiving casing
30: ultraviolet lamp unit 310: ultraviolet lamp 311: electrode 320: sleeve pipe
330: line 330-1: first line 330-2: second line 340: ultraviolet ray sensor
50: washing unit 50': washing unit 510: wiper 511: main wiper part
512: auxiliary wiper part 5111: first blade 5112: depression 5113: second blade
5121: inclined protrusion 5122: pointed part 520: wiper body
530: arm 531: plate part 532: hub 5321: hub body
53211: core-part-receiving depression 53212: core-part support 5322: core part
53221: chamfered part 5323: cover plate 53231: insert hole
540: drive shaft 541: rotor 542: stator 5411: contact surface
543: annular casing 5431: rotor seating depression 5432: first depression
544: cover frame 5441: stator seating depression 5442: second depression 5443: third depression
545: first member 546: second member 547: elastic spring
548: sealing member 549: nut 5491: washer
550: drive motor 560: reed switch 561: receiving depression 5611: first inner circumferential surface
5612: second inner circumferential surface 5613: internal thread 5614: stop protrusion 5615: tapered portion
562: elastic member 563: magnet 564: cover member 5641: first outer circumferential surface
5642: second outer circumferential surface 5643: thread 5644: locking groove
5645: tapered portion 5646: stopper 565: O-ring

DESCRIPTION OF THE REFERENCE
NUMERALS PERTAINING TO THE
CONVENTIONAL TECHNIQUE

1001: body 1002: ultraviolet lamp 10021: electrode
1003: partition plate 10031: lamp insert hole 10032: drive shaft insert hole
1004: washing unit 10041: drive shaft 10042: wiper body
10043: arm 100431: hub 100432: core part
10044: wiper 10045: reed switch 100451: magnet
1005: cover member 10051: O-ring 1007: ultraviolet ray sensor

BEST MODE

Hereinafter, embodiments of an ultraviolet ballast water treatment apparatus having a rectangular cross-section according to the present invention will be described in detail with reference to the attached drawings. If in the specification, detailed descriptions of well-known functions or configurations would unnecessarily obfuscate the gist of the present invention, the detailed descriptions will be omitted. In the drawings, reference letter 'W' denotes the flow of ballast water.

As shown in FIGS. 3, 4, and 5 through 7, an ultraviolet ballast water treatment apparatus according to an embodiment of the present invention includes: a body 10 having an inlet port 124 and an outlet port 125 through which ballast water is drawn into and out of the body 10; an ultraviolet lamp unit 30 including ultraviolet lamps 310 applying ultraviolet rays to ballast water flowing through the body 10; and a washing unit 50 provided to remove foreign substances adhering to the ultraviolet lamp unit 30. The body 10 has a rectangular cross-section 110 perpendicular to a direction in which the ultraviolet lamps 310 are oriented. The ultraviolet lamps 310 are uniformly arranged in the rectangular cross-section 110 at positions spaced apart from each other at regular intervals so that the number of ultraviolet lamps per a unit area of the cross-section 110 can be minimized.

First, the general constructions and functions of the body 10, the ultraviolet lamp unit 30, and the washing unit 50 used in the ultraviolet ballast water treatment apparatus according to the present invention will be described.

The body 10 of the ultraviolet ballast water treatment apparatus has the inlet port 124 and the outlet port 125 on opposite ends thereof. Ballast water drawn into the body 10 through the inlet port 124 flows through the body 10 while ultraviolet rays are applied to the ballast water, before discharged out of the body 10 through the outlet port 125.

The ultraviolet lamp unit 30 applies ultraviolet rays to ballast water flowing through the body 10 so as to sterilize the ballast water. The ultraviolet lamp unit 30 includes the ultraviolet lamp 310, sleeve pipes 320, and an ultraviolet ray sensor 340. Each ultraviolet lamp 310 is configured to generate and emit ultraviolet rays and generally has a stick or rod shape. Electrodes 311 are provided on respective opposite ends of the ultraviolet lamp 310. Each ultraviolet lamp 310 is oriented perpendicular to the direction in which ballast water flows. The opposite ends of the ultraviolet lamp 310 are respectively inserted into partition plates 130 that are disposed at respective opposite sides of the space in the body 10 and partition space in the body 10 into a space, through which ballast water flows, and space, in which no ballast water flows. Each sleeve pipe 320 covers and protects the corresponding ultraviolet lamp 310. Given the fact that the intensity of ultraviolet rays emitted from the ultraviolet lamp 310 is reduced if foreign substances adhere to the surface of the sleeve pipe 320, the sleeve pipe 320 is configured such that the surface thereof can be washed by the washing unit 50, which will be described later herein. The ultraviolet ray sensor 340 functions to measure the intensity of ultraviolet rays in the body 10. That is, to maintain the intensity of ultraviolet rays in the body 10 within a predetermined range in which ultraviolet treatment can be effective, the ultraviolet ray sensor 340 measures the intensity of ultraviolet rays and transmits a measured value to a control unit (not shown) so that it can be used in controlling the operation of the ultraviolet ballast water treatment apparatus.

The washing unit 50 functions to remove foreign substances adhering to the ultraviolet lamp unit 30, in detail, the surfaces of the sleeve pipes 320. The washing unit 50 includes: a wiper body 520 that includes wipers 510 for use in removing foreign substances and is provided around the ultraviolet lamps 310, in detail, around the sleeve pipes 320; an arm 530 that connects the wiper body 520 to a drive shaft 540; and a drive motor 550 that provides power to the drive shaft 540 for moving the arm 530.

Figure 3:
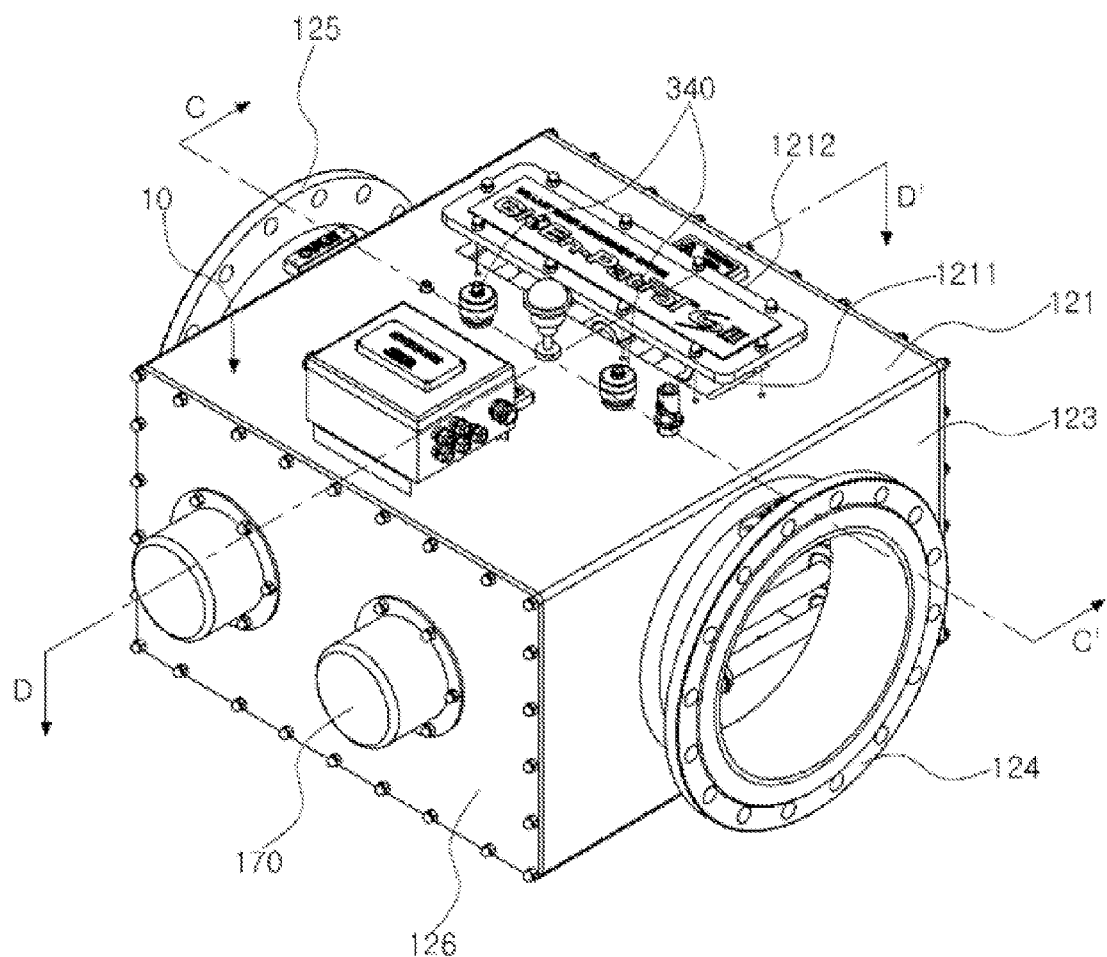
FIG. 3 is a perspective view illustrating an ultraviolet ballast water treatment apparatus according to an embodiment of the present invention.
Figure 4:
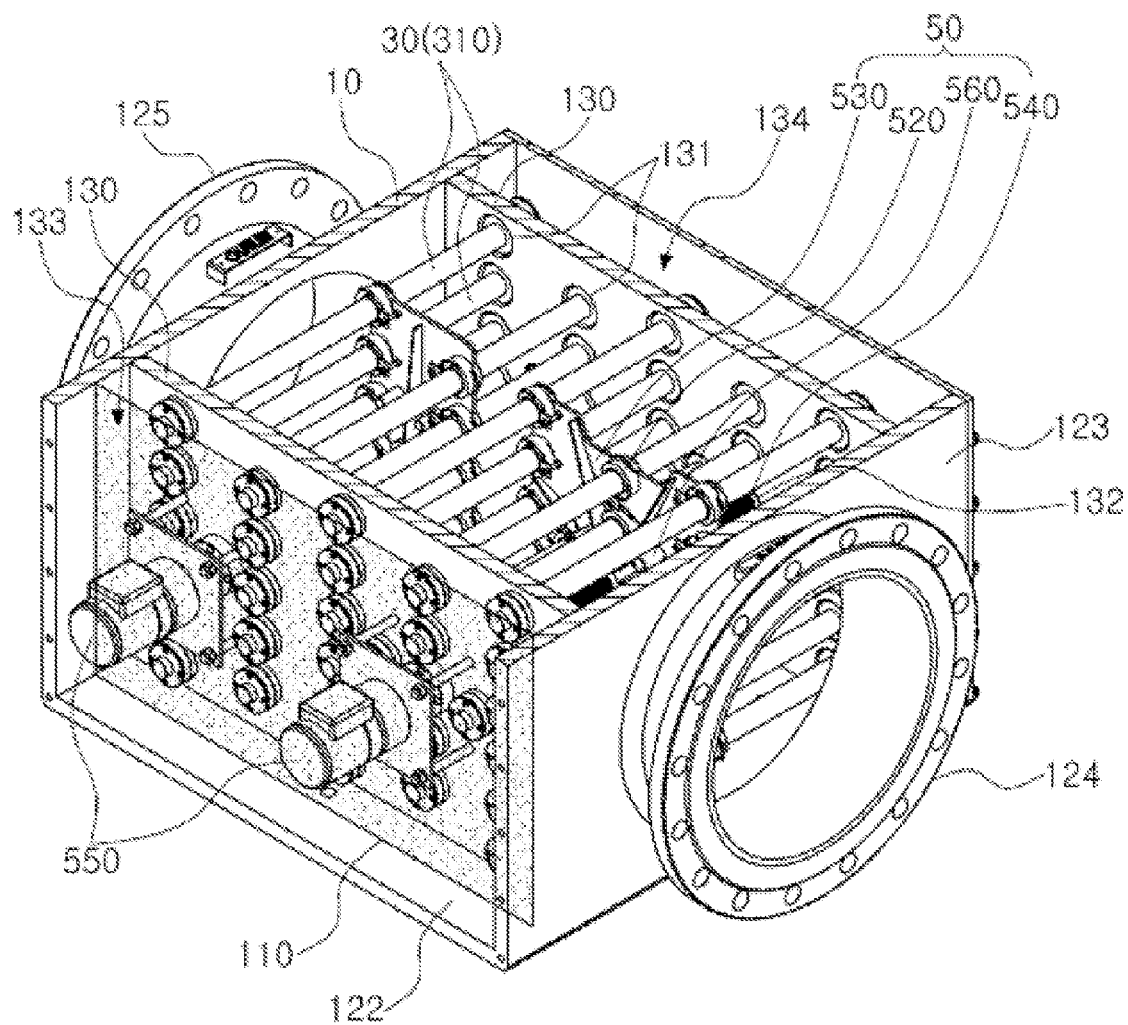
FIG. 4 is an exploded perspective view of the ultraviolet ballast water treatment apparatus of FIG. 3.
Figure 5:
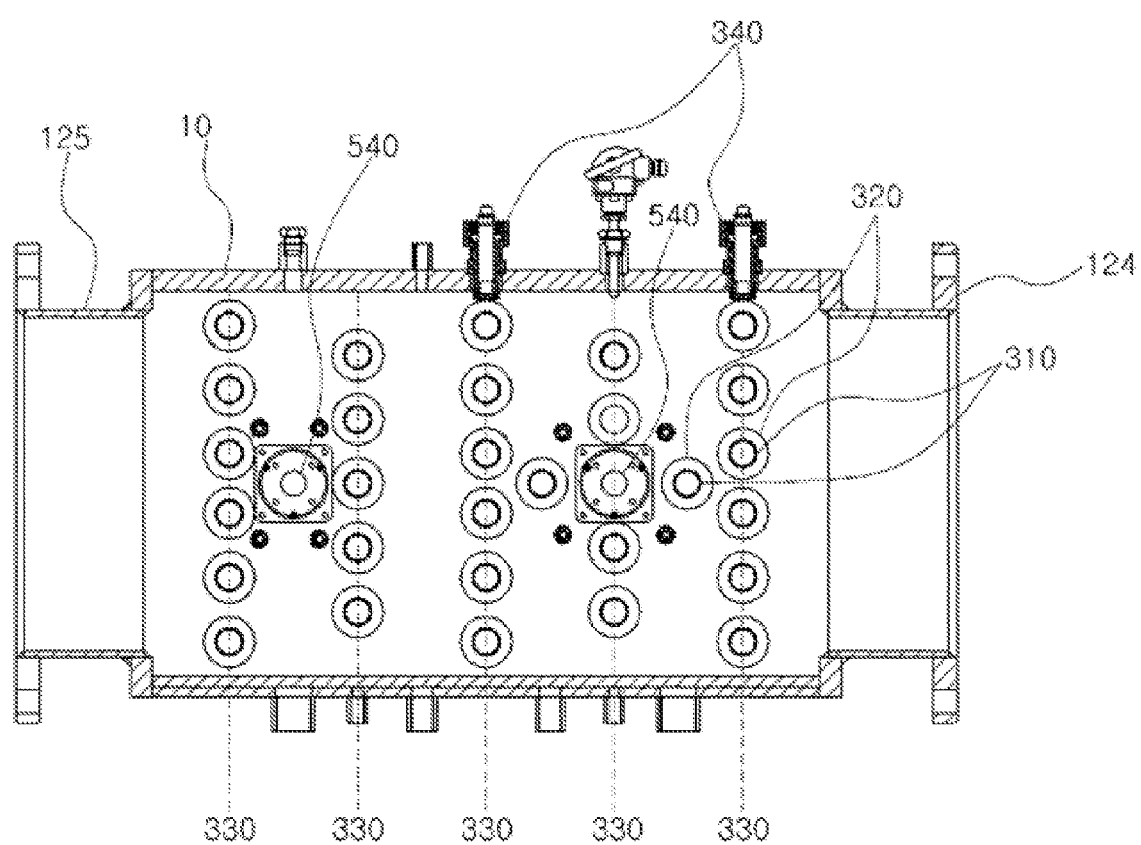
FIG. 5 is a sectional view taken along line C-C' of FIG. 3.
Figure 7:
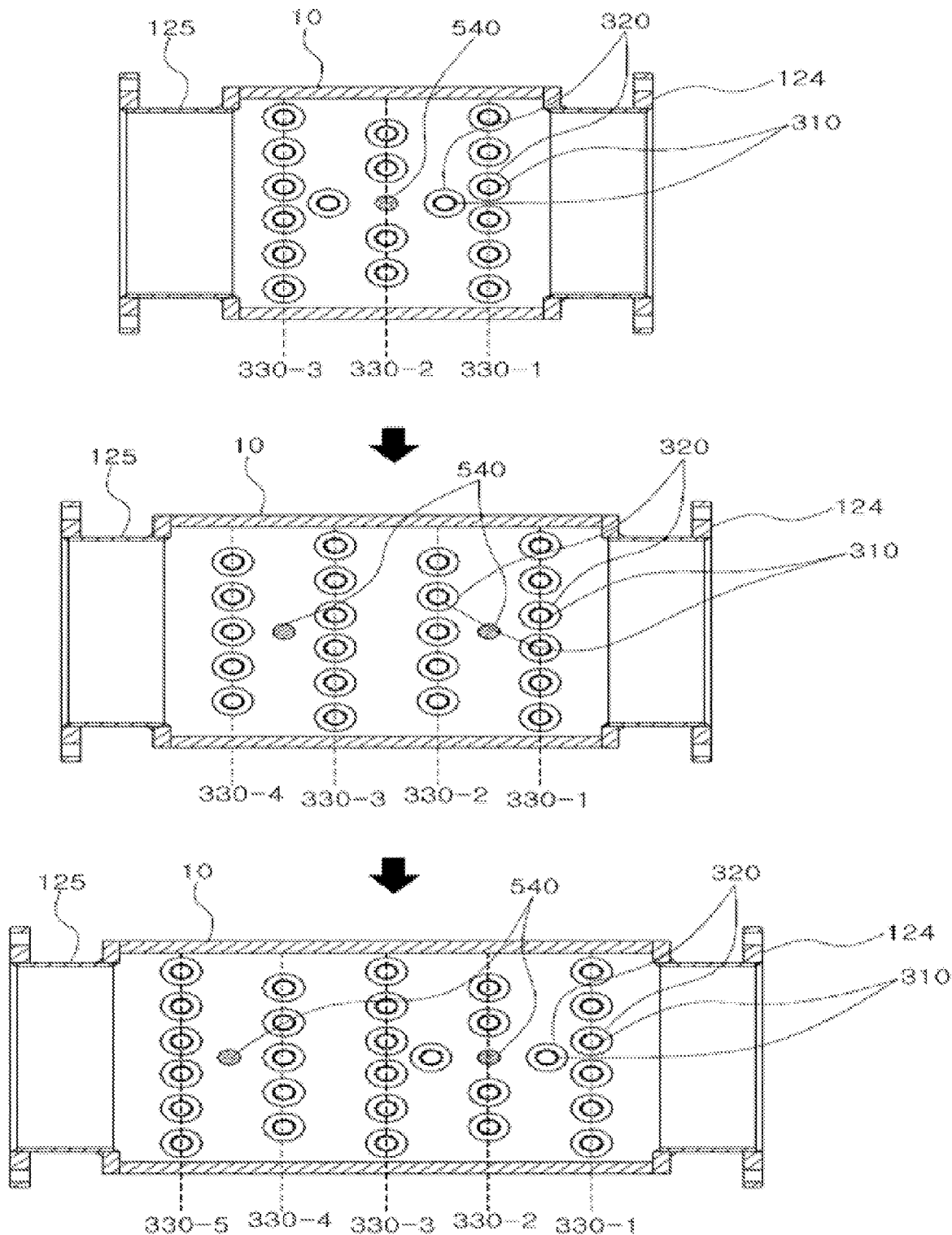
FIG. 7 is a view showing changes of the cross-section of the apparatus of FIG. 5 depending on the number of ultraviolet lamps.

Particularly, one of the main characteristics of the ultraviolet ballast water treatment apparatus according to this embodiment of the present invention is that the cross-section 110 of the body 10 that is perpendicular to the direction of orientation of the ultraviolet lamps 310 is rectangular, and the ultraviolet lamps 310 are arranged at regular intervals in the rectangular cross-section 110 so that the number of ultraviolet lamps per a unit area of the cross-section 110 can be minimized. As pointed out in the problems of the conventional technique (refer to FIG. 2), in the cylindrical ultraviolet ballast water treatment apparatus having a circular cross-section, the ultraviolet lamps 1002 are densely arranged at regular intervals in the body 1001 having a circular cross-section. Hence, the number of ultraviolet lamps per a unit area of the cross-section is comparatively large, thus increasing the power consumption. Even when it is intended to increase the number of ultraviolet lamps and thus increase the capacity of treatment of ballast water, an additional circumferential row must be added. Therefore, the cross-sectional area of the body 1001 is greatly increased by the square of an increased radius (the area of a circle=$\pi r^2$), and the number of ultraviolet lamps of the added circumferential row must be greater than that of the existing outermost row (the circumference of the added circumferential row is larger than that of the existing outermost row). As such, it is impossible to increase the capacity scale of ballast water treatment by a small degree. Thus, it is difficult to increase the treatment capacity only by a required degree. However, in this embodiment of the present invention, as shown in FIGS. 3 through 5, the body 10 generally has a hexahedral shape, and the cross-section 110 perpendicular to the direction on the orientation of the ultraviolet lamps 310 is rectangular. The ultraviolet lamps 310 are arranged in the rectangular cross-section 110 of the body 10 in such a way that a plurality of lines 330 {hereinafter, reference numerals 330-$n$ ($n$=1 to 5) are given in a sequence starting from the inlet port 124}, each of which includes a plurality of ultraviolet lamps 310 arranged in a row perpendicular to the direction of the flow of ballast water, are arranged at positions spaced apart from each other in the direction of the flow of ballast water. Therefore, even when it is intended to add only a small number of ultraviolet lamps, the cross-section of the body 10 has only to be increased by a portion corresponding to successively adding a single line 330, as shown in FIG. 7. As such, unlike the conventional technique having the inefficient problem in which the cross-sectional area of the body is undesirably largely increased and additional ultraviolet lamps 310 that were not originally needed but are now required, the present invention makes it possible to increase the capacity by only the amount needed. Furthermore, compared to the conventional technique in which the ultraviolet lamps are arranged in circumferential rows, the rectangular cross-section 110 according to the present invention in which the ultraviolet lamps 310 are arranged in linear rows can reduce the number of ultraviolet lamps, arranged at regular intervals, required per a unit area. Therefore, the power consumption per a unit capacity can be reduced. In addition, even in a large-capacity scale, the size of the ultraviolet ballast water treatment apparatus can be markedly reduced compared to that of the conventional technique.

Figure 6:
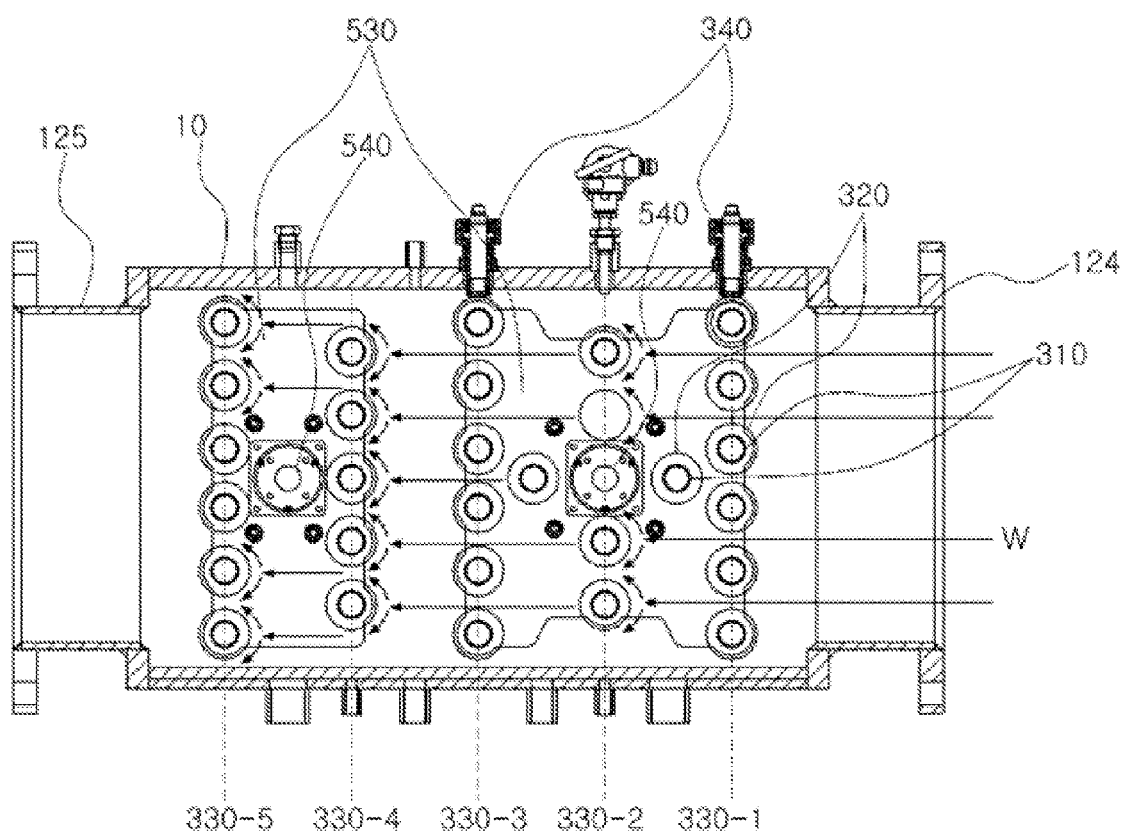
FIG. 6 is a view illustrating the flow of ballast water of FIG. 5.

In the present invention, with regard to the arrangement of the ultraviolet lamps 310 in the lines 330 in the rectangular cross-section 110, as shown in FIGS. 5 and 6, a first line 330-1 is disposed adjacent to the inlet port 124, and the ultraviolet lamps 310 of a second line 330-2 spaced apart from the first line 330-1 by a predetermined distance in the direction of the flow of ballast water are disposed between the ultraviolet lamps 310 of the first line 330-1 when seen in the direction of the flow of ballast water. In this case, as shown in FIG. 6, ballast water can be prevented from only linearly flowing, without colliding with the ultraviolet lamps 310 and changing in direction of the flow thereof, before being discharged out of the body 10. As pointed out as the problems of the conventional technique (refer to FIG. 2), when the ultraviolet lamps 1002 are arranged in the circumferential direction, ballast water drawn into the ultraviolet ballast water treatment apparatus may linearly pass between the ultraviolet lamps 1002 without making contact with any ultraviolet lamp 1002 (refer to ⓐ, ⓑ, and ⓒ). Given the fact that the ballast water treatment effect of ultraviolet rays is proportional not only to the intensity of ultraviolet rays but also the time for which ultraviolet rays are applied to ballast water, the ballast water treatment effect of the conventional technique is largely reduced because the speed of the flow of ballast water (refer to ⓐ, ⓑ, and ⓒ) that linearly flows without making contact with any ultraviolet lamp 1002 is increased and thus the time for which ultraviolet rays are applied to ballast water is reduced. On the other hand, the present invention makes sure that ballast water flowing through the apparatus comes into contact with the ultraviolet lamps 310 and changes in direction so that the speed of the flow of ballast water is reduced and the time for which ultraviolet rays are applied to ballast water is increased, whereby the ballast water treatment effect of ultraviolet rays can be enhanced.

Furthermore, in the present invention, the drive shaft 540 that moves the arm 530 provided with the wipers 510 for removing foreign substances adhering to the ultraviolet lamp unit 30 is disposed between the lines 330 so that the drive shaft 540 can be prevented from impeding application of ultraviolet rays to ballast water. If the drive shaft 540 is disposed in an intermediate one of three lines 330 and thus there is an interference between the drive shaft 540 and an ultraviolet lamp 310, as shown in FIG. 5, the corresponding ultraviolet lamp 310 is disposed ahead of or behind the drive shaft 540 with respect to the direction of the flow of ballast water so as to prevent ballast water from flowing out of the apparatus without making contact with any ultraviolet lamp 310.

Referring to FIGS. 3, 4, 10 and 11, in an ultraviolet ballast water treatment apparatus according to another embodiment of the present invention, the body 10 is provided integrally with partition plates 130 that support the opposite ends of the ultraviolet lamps 310 and partition the space in the body 10 into a space, through which ballast water flows, and a space, in which no ballast water flows. The apparatus according to this embodiment is characterized in that installation or replacement of the ultraviolet lamps 310 can be conducted without requiring a separate process of assembling the partition plates 130 with the body 10.

Figure 8:
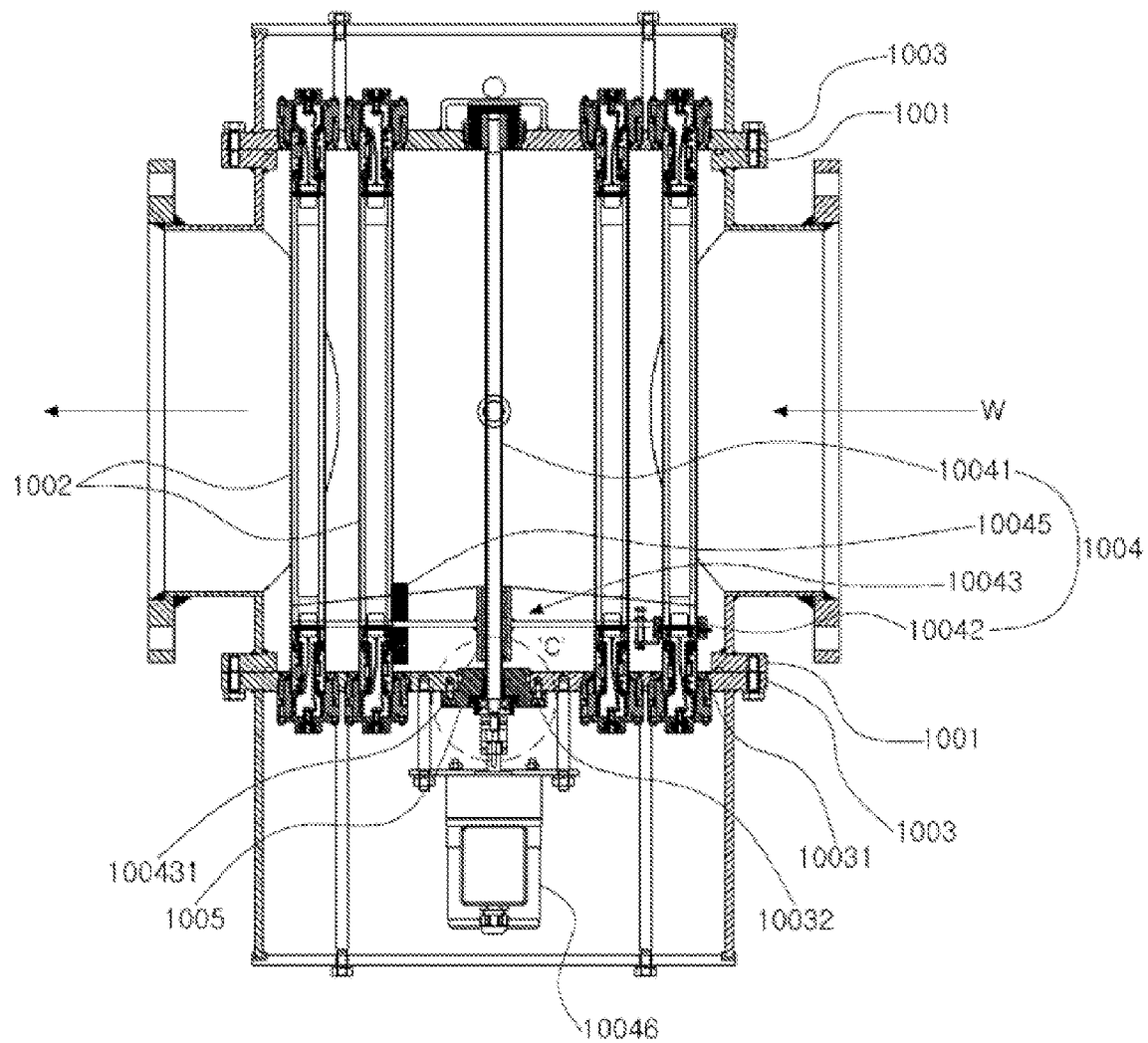
FIG. 8 is a sectional view taken along line B-B' of the conventional ultraviolet ballast water treatment apparatus.
Figure 9:
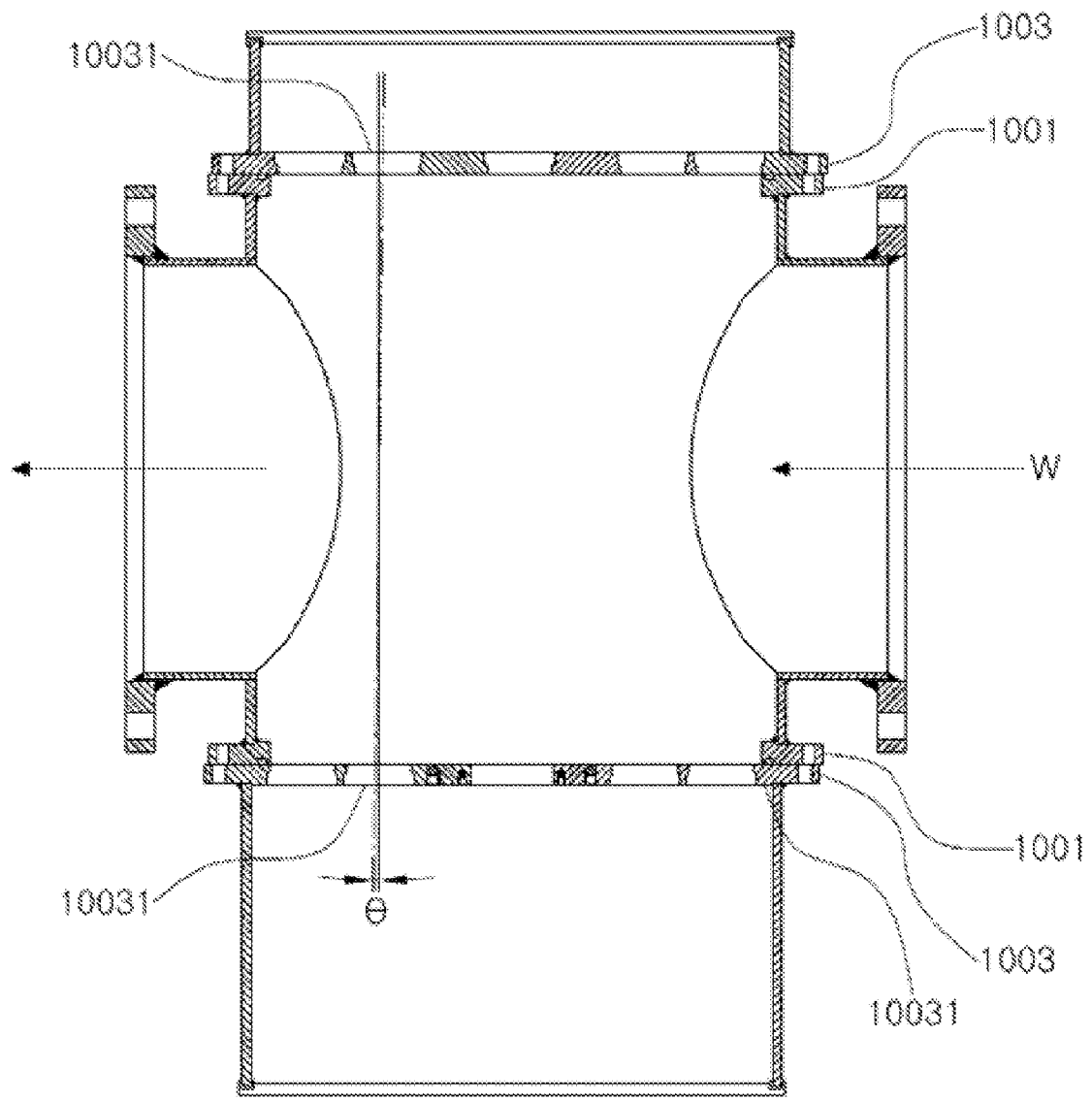
FIG. 9 is a view showing an eccentric state of a lamp insert hole when partition plates of FIG. 8 are not accurately assembled.
Figure 10:
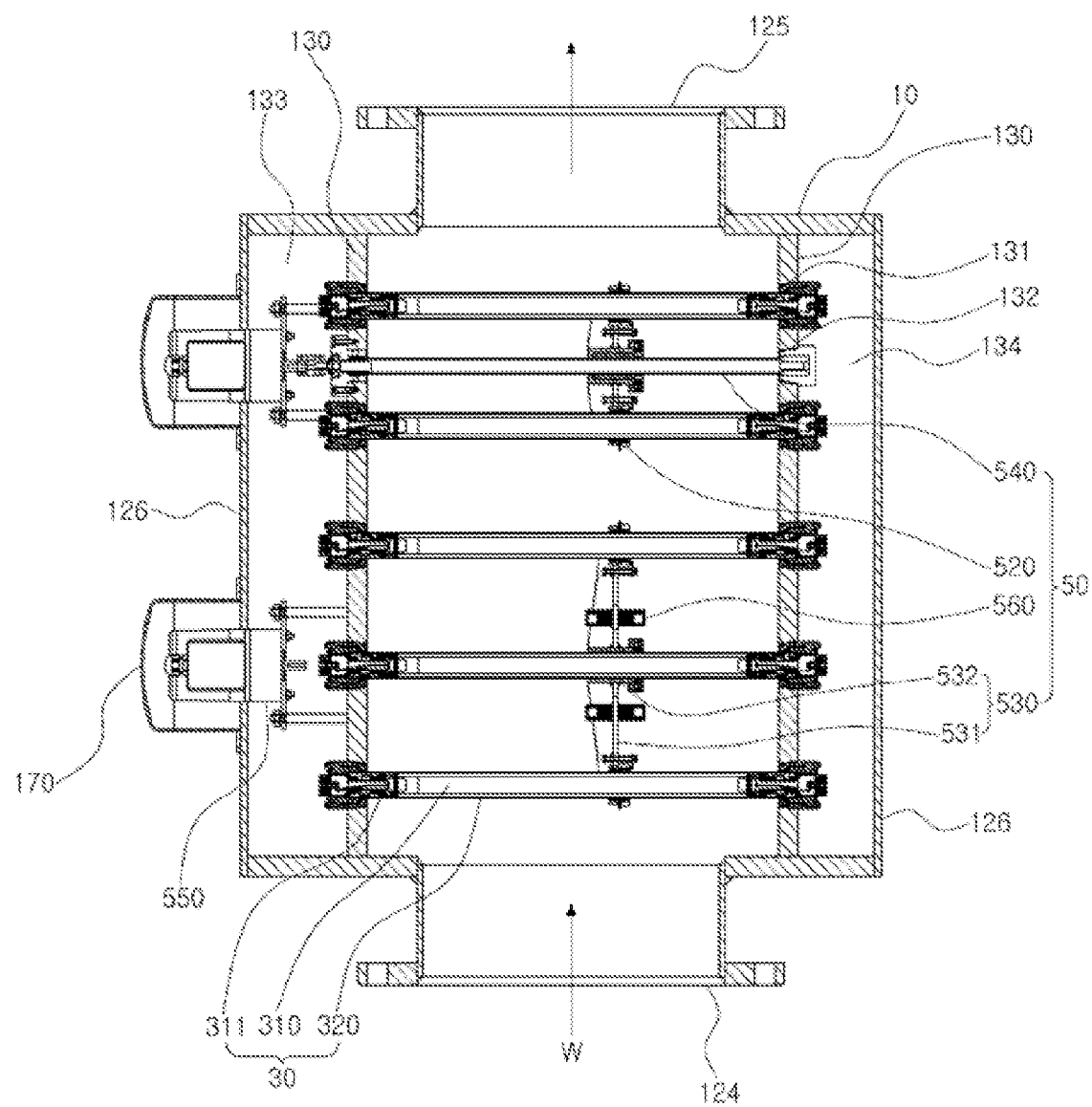
FIG. 10 is a sectional view taken along line D-D' of the ultraviolet ballast water treatment apparatus according to another embodiment of the present invention.

In the case of the conventional ultraviolet ballast water treatment apparatus, as shown in FIGS. 8 and 9, the partition plates 1003 that support the opposite ends of the ultraviolet lamps 1002 and partition the space in the body 1001 into a ballast-water-flowing space and a no-ballast-water space are assembled with the opposite sides of the body 1001 by bolts. However, the structure of assembling the partitions plates 1003 with the opposite sides of the body 1001 by means of bolts makes the assembly work complex and increases the time required for the assembly work. Furthermore, unless a worker is highly skilled, it is very difficult to accurately align the centers of the partition plates 1003 with the center of the body 1001 when assembling the partition plates 1003 with the body 1001. As such, if the centers of the partition plates 1003 are not accurately aligned with the center of the body 1001, the centers of lamp insert holes 10031 formed in the partition plates 1003 that are respectively provided on the opposite sides of the body 1001 are also misaligned from each other, that is, are misaligned from each other by an eccentric angle of θ (refer to FIG. 9). In other words, the centers of the lamp insert holes 10031 of the partition plate provided at one side of the body 1001 are not aligned with the centers of the lamp insert holes 10031 of the partition plate provided at the other side of the body 1001. Thus, each ultraviolet lamp 1002 that is inserted at opposite ends thereof into the corresponding lamp insert holes 10031 that are misaligned from each other by an eccentric angle of θ is easily damaged while the ultraviolet ballast water treatment apparatus is operated.

To avoid the above problems, in the present invention, as shown in FIGS. 3, 4, 10, and 11, four surfaces (an upper surface 121, a lower surface 122, and opposite side surfaces 123 on which the inlet port 124 and the outlet port 125 are provided) and the partition plates 130 are integrally formed with the body 10. In detail, the four surfaces are surfaces that enclose four edges of the rectangular cross-section 110 perpendicular to the direction of the orientation of the ultraviolet lamps 310. The partition plates 130 are disposed to predetermined depths in the opposite open sides of the hexahedral body 10 other than the four surfaces.

Figure 11:
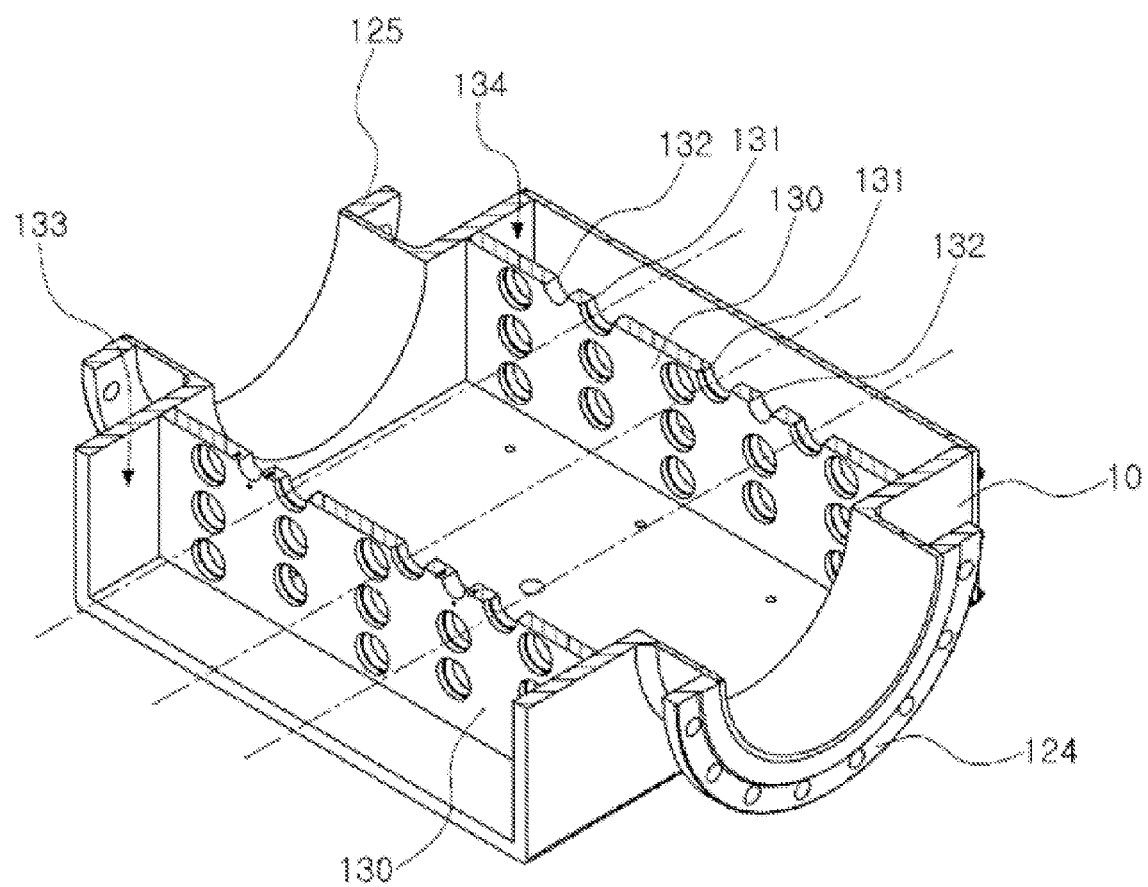
FIG. 11 is a view showing lamp insert holes of FIG. 10 aligned with each other on the same axes.

As such, when the partition plates 130 are integrally provided in the body 10, the separate complex process of assembling the partition plates with the body can be omitted, whereby the time required for the assembly process can be reduced, compared to the conventional technique. In addition, with regard to the alignment of the lamp insert holes 131 formed in the partition plates 130 into which the corresponding opposite ends of the ultraviolet lamps 310 are inserted, as shown in FIG. 11, the centers of the lamp insert holes 131 formed in the partition plate 130 that is disposed in one side of the body 10 can be accurately aligned with the centers of the lamp insert holes 131 formed in the partition plate 130 that are disposed in the other side of the body 10 (because the body is used as it is in a shape produced in a factory without requiring a separate assembly process that may cause a problem of eccentric lamp insert holes). Moreover, each ultraviolet lamp 310 that is coupled at opposite ends thereof to the corresponding lamp insert holes 131 aligned with each other on the same axis can be increased in durability so that it can be prevented from being damaged even after being used over a long period of time.

In this embodiment of the present invention in which the partition plates 130 are integrally provided in the body 10, an installation or maintenance hole 1211 is formed in the upper surface 121 or the lower surface 122 of the body 10 for installation or replacement of elements of the washing unit 50 disposed between the partition plates 130. A cover 1212 that openably covers the installation or maintenance hole 1211 may be provided.

That is, in the case where the partition plates 130 are integrally provided in the body 10, it is not easy to install or replace the wiper body 520 and the arm 530 of the washing unit 50 that are disposed between the partition plate 130 and the partition plate 130. Given this, the installation or maintenance hole 1211 having a size allowing the arm 530, which is largest among the elements of the washing unit 50, to be inserted into the body 10 is formed in the upper surface 121 or the lower surface 122 of the body 10. Thereby, installation or replacement of the elements provided in the body 10 can be facilitated regardless of the integrated structure of the partition plates 130. The installation or maintenance hole 1211 must be sealed when work such as the installation or replacement of an element is not required. Thus, the installation or maintenance hole 1211 is usually sealed by the separate cover 1212 so as to prevent loss of ballast water.

Referring to FIGS. 3, 4, 13 and 14, in an ultraviolet ballast water treatment apparatus according to a further embodiment of the present invention, a washing unit 50 includes a plurality of washing units 50', each of which simultaneously removes foreign substances from ultraviolet lamps 310 disposed within a predetermined range. Thus, even if the capacity of the ultraviolet ballast water treatment apparatus is increased and the number of ultraviolet lamps 310 is thus increased, the washing units 50' are arranged in parallel to each other and, thus, the operation of removing foreign substances can be effectively conducted.

Figure 12:
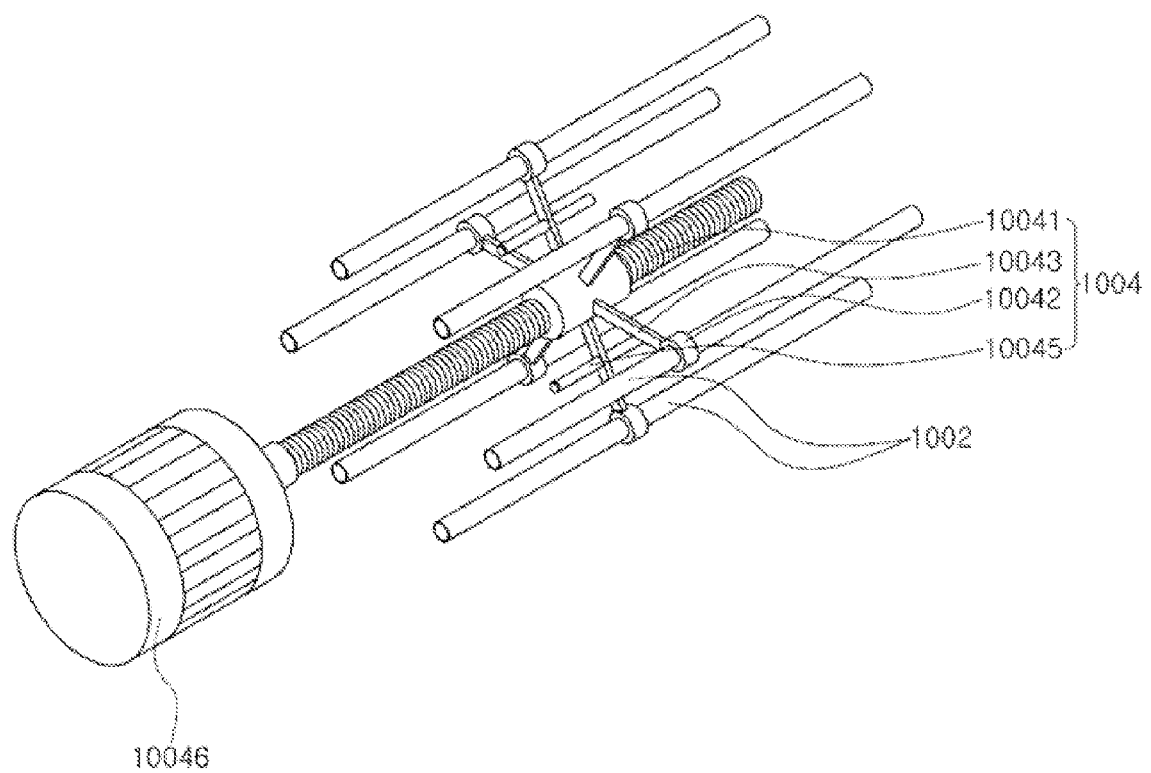
FIG. 12 is a perspective view showing the construction of a washing unit of the conventional ultraviolet ballast water treatment apparatus.

In the case of the conventional ultraviolet ballast water treatment apparatus, as shown in FIGS. 1 and 12, because the body 1001 of the ultraviolet ballast water treatment apparatus is cylindrical, the ultraviolet lamps 1002 disposed in the body 1001 are also arranged in a circumferential direction corresponding to the cylindrical shape of the body 1001. Furthermore, a washing unit 1004 for use in removal of foreign substances from the surfaces of the ultraviolet lamp 1002 is also configured such that: wiper bodies 10042 surround the ultraviolet lamp 1002 arranged in the circumferential direction around the drive shaft 10041 disposed on an axis corresponding to the central axis of the body 1001 and are radially arranged; and arms 10043 radially extend and connect the drive shaft 10041 to the respective wiper bodies 10042. Therefore, if the number of ultraviolet lamps 1002 is increased and the ultraviolet lamps 1002 are arranged in a plurality of circumferential rows, only the single washing unit (each referring to including a drive shaft, wiper bodies, and arms as a set) must be provided on the single drive shaft 10041. Thereby, the sizes and weights of the drive shaft 10041 and arms 10043 must be increased. This causes a variety of problems.

Unlike this, as shown in FIGS. 3, 4, 13, and 14, this embodiment of the present invention can include several washing units 50' each of which includes the drive shaft 540, a wiper body 520 and arms 530 as a set. In this case, due to a need for increasing the capacity of the ultraviolet ballast water treatment apparatus, when it is required to increase the size (cross-section) of the body 10 and the number of ultraviolet lamps 310 (that is, the number of lines 330) installed in the body 10, an additional washing unit 50' has only to be provided in parallel. Therefore, this embodiment can prevent the conventional problem of an increase in size and weight of the washing unit 50' despite maintaining the effects of removing foreign substances.

Figure 14:
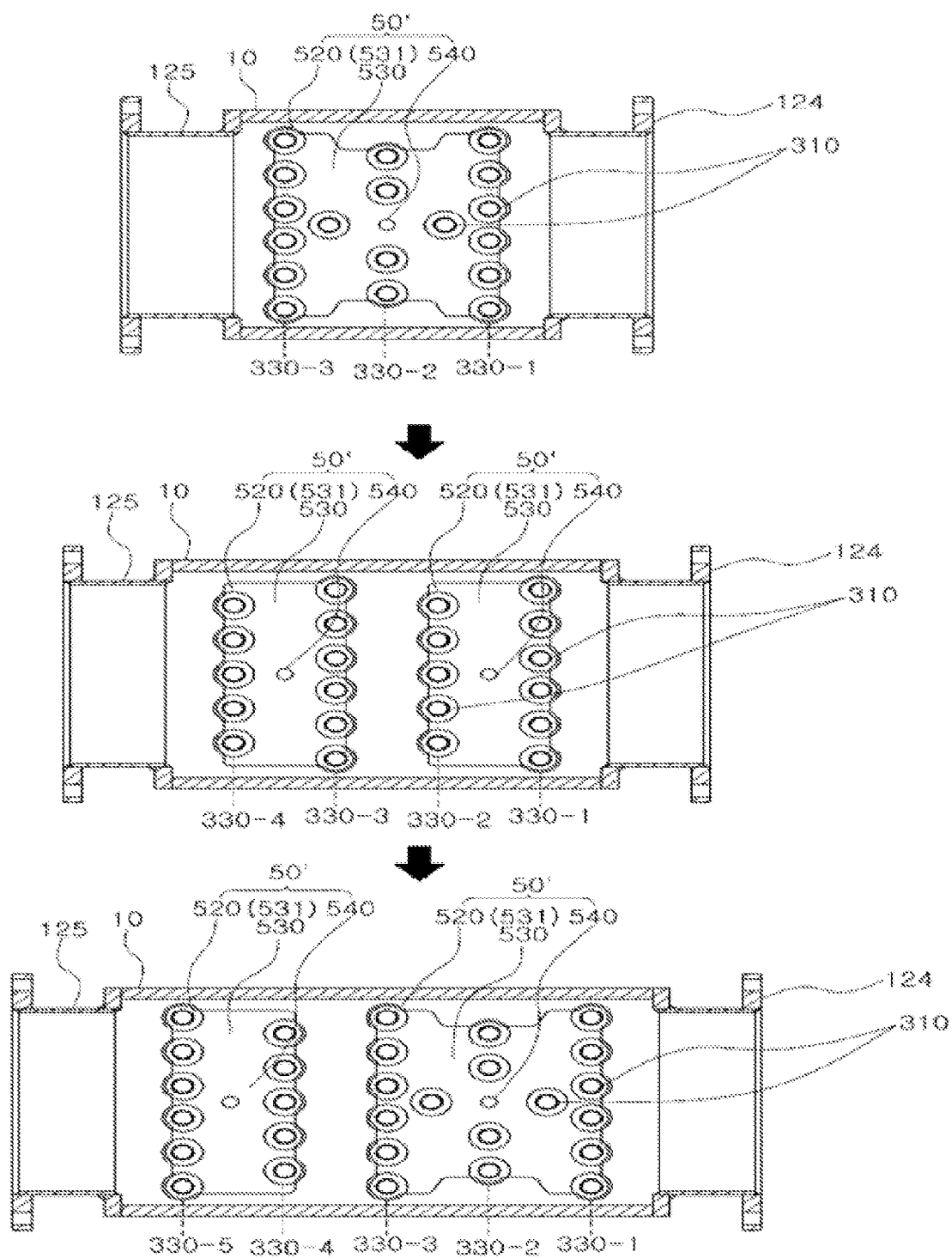
FIG. 14 illustrates changes in the number of washing units of FIG. 13.
Figure 15:
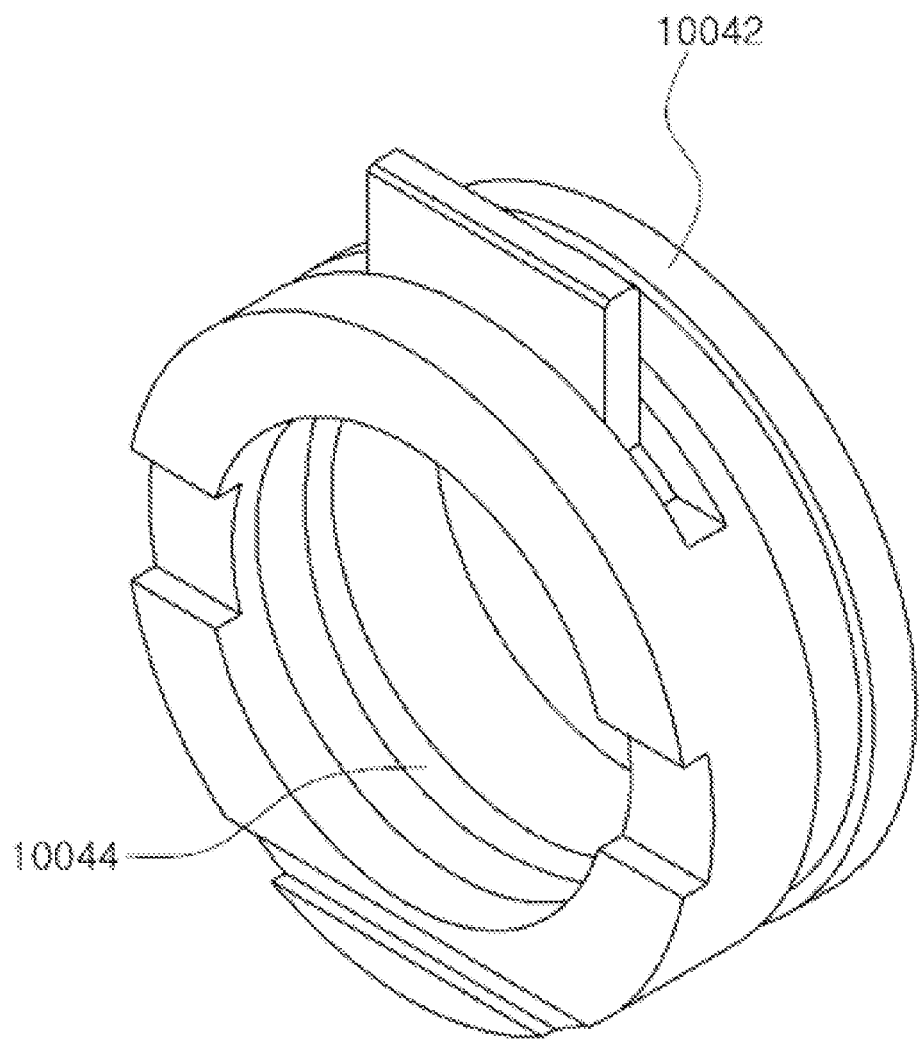
FIG. 15 is a perspective view showing a wiper body of the conventional ultraviolet ballast water treatment apparatus.
Figure 16:
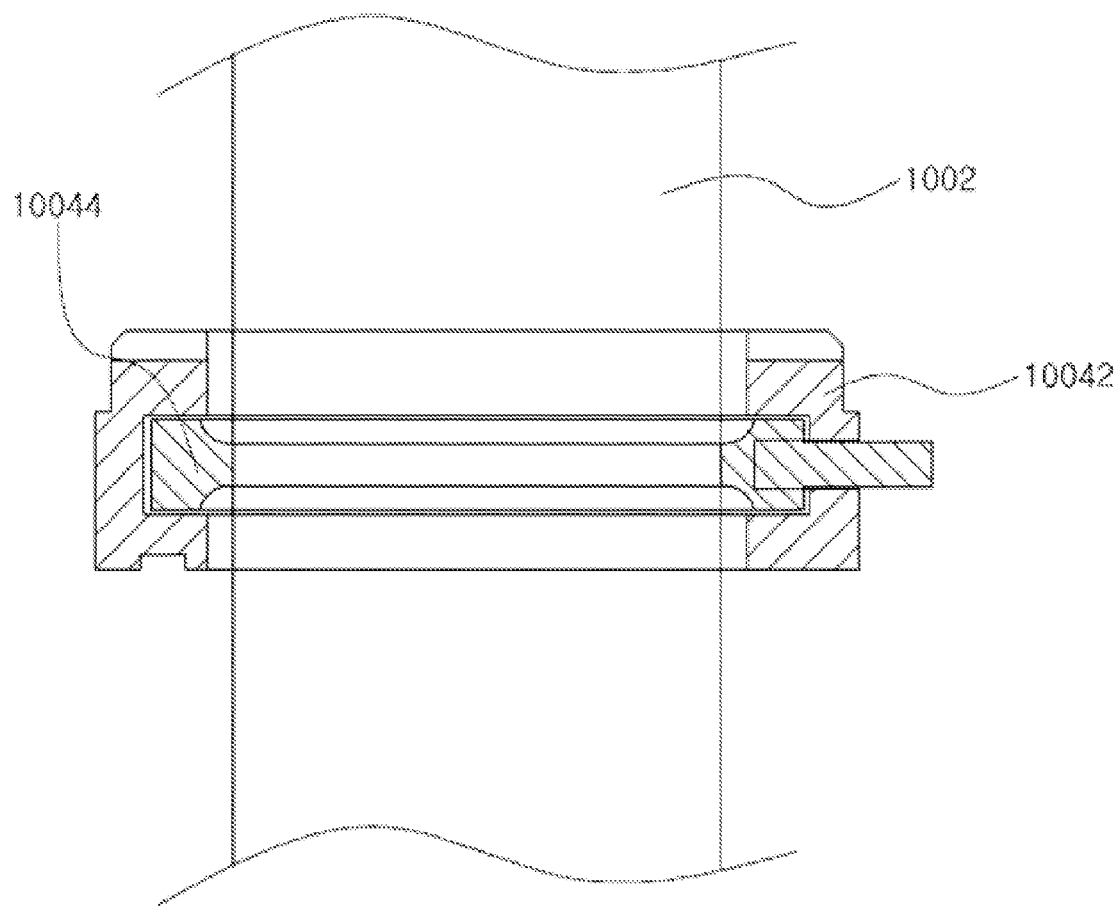
FIG. 16 is a sectional view of the wiper body of FIG. 15.
Figure 17:
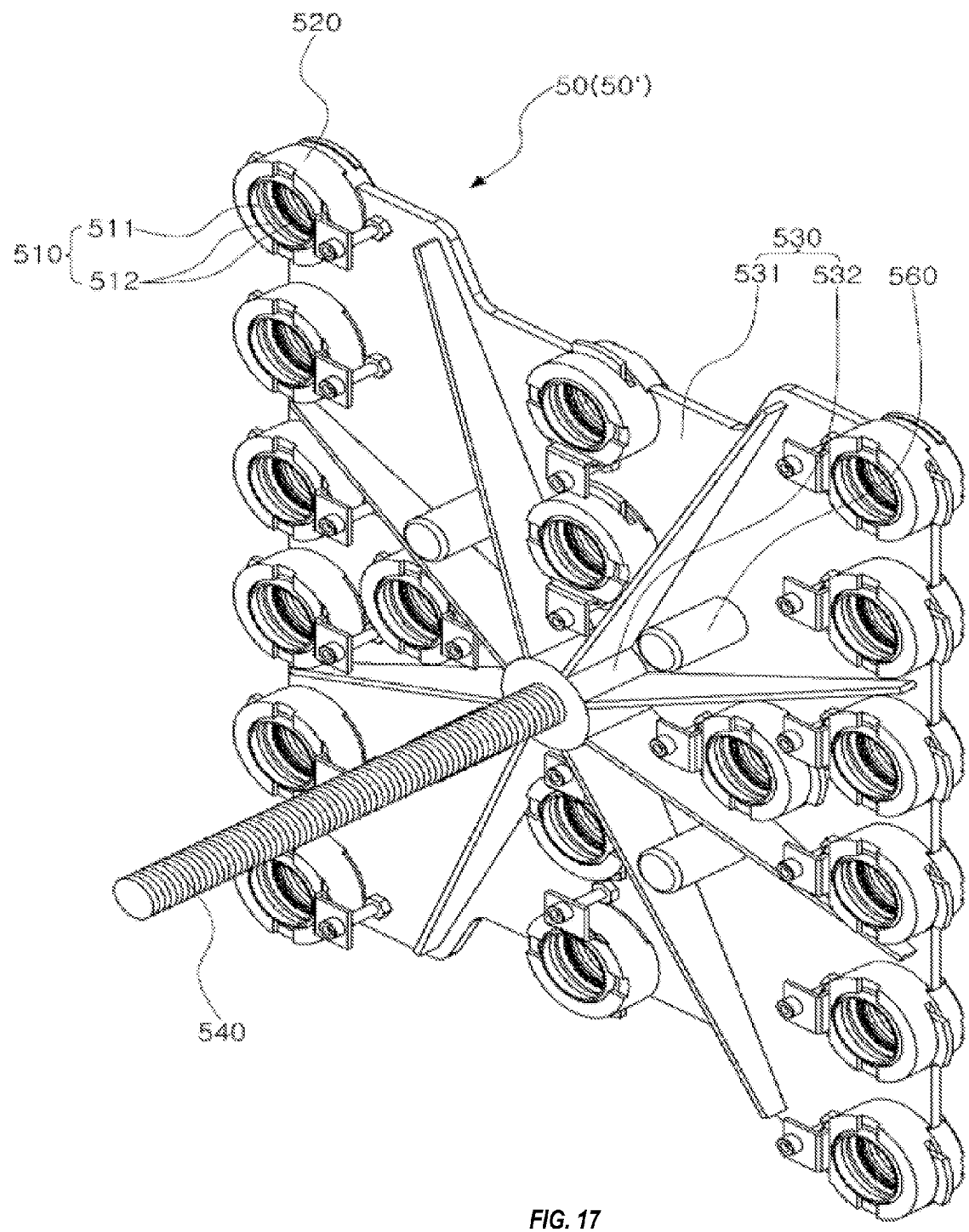
FIG. 17 is a perspective view illustrating a washing unit used in the ultraviolet ballast water treatment apparatus.
Figure 18:
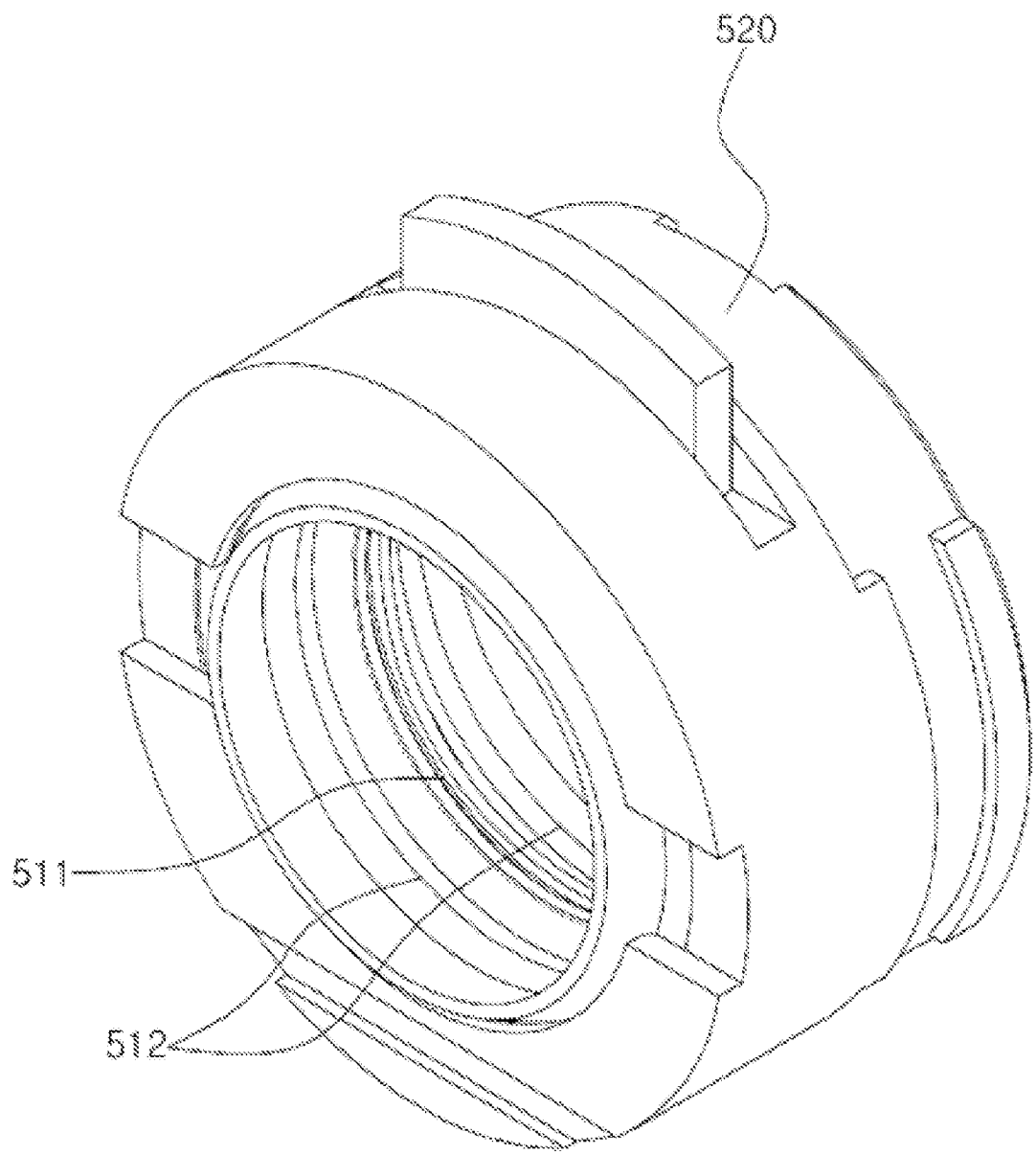
FIG. 18 is a perspective view illustrating a wiper body of FIG. 17.
Figure 19:
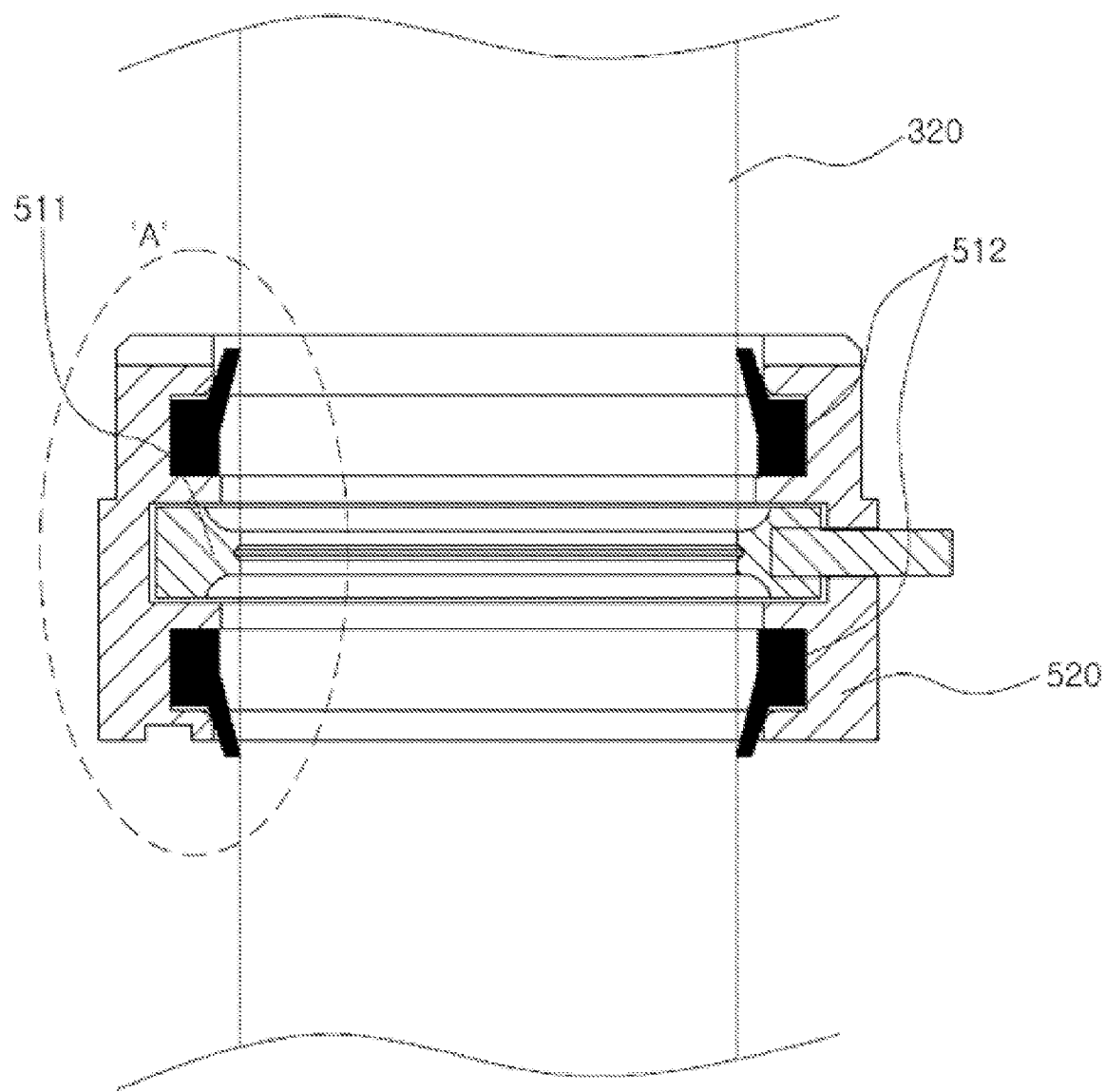
FIG. 19 is a sectional view of the wiper body of FIG. 18.

As such, if different kinds of washing units 50' (as needed, including a washing unit 50' covering two lines 330 of ultraviolet lamps 310, and a washing unit 50' covering three lines 330 of ultraviolet lamps 310) are prepared, as shown in FIG. 14, when the cross-section of the body 10 is extended in a predetermined direction and the number of lines 330 of ultraviolet lamps 310 is increased, an additional washing unit 50' corresponding to the number of lines 330 increased has only to be provided in parallel. That is, it is not required to separately produce a washing unit 50' having a size corresponding to an increase or reduction in size of the cross-section of the body 10. Consequently, the production cost can be reduced. Moreover, this embodiment of the present invention can reliably prevent not only a problem in which the arms 530 of the washing unit 50' are excessively long from the drive shaft 540 so that the arm 530 cannot be smoothly operated, thus reducing the washing efficiency but also a problem that may be caused by an increase in weight of the drive shaft 54 attributable to an excessive increase in diameter of the drive shaft 54.

Figure 13:
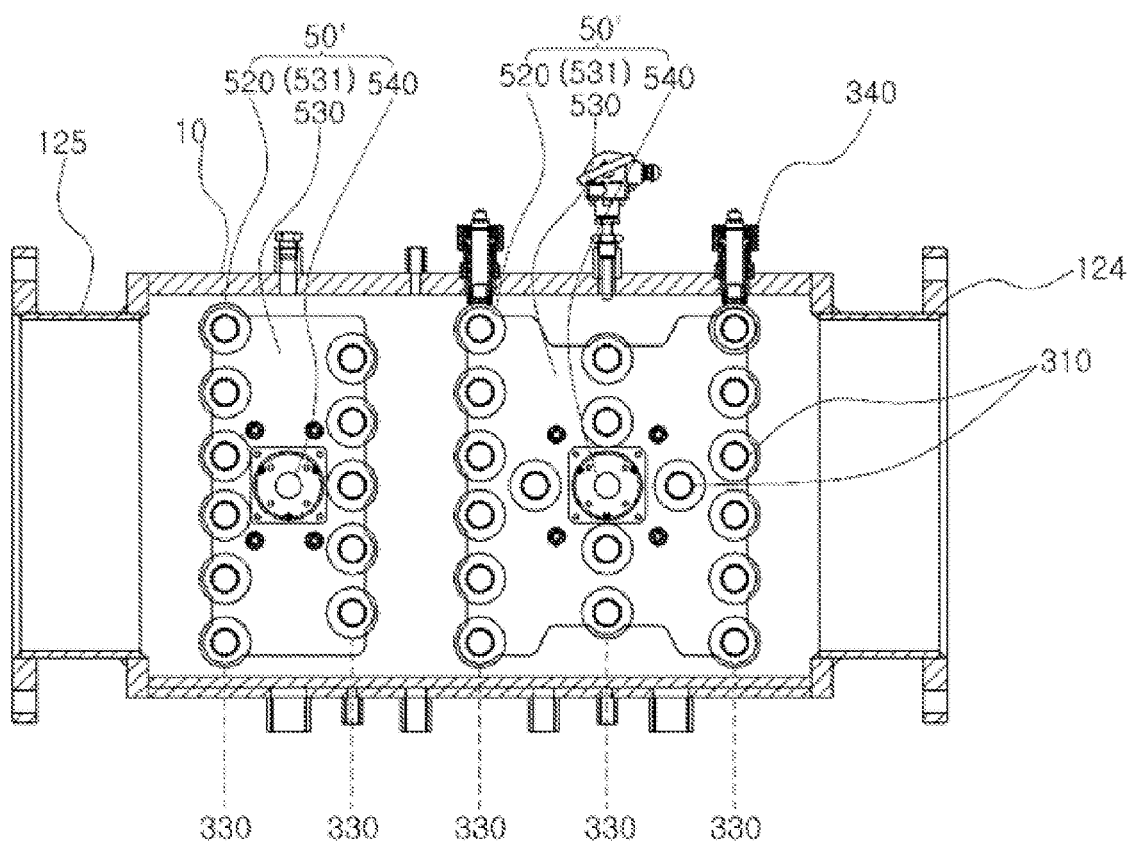
FIG. 13 is a sectional view taken along line C-C' according to a further embodiment of the present invention.

Furthermore, in this embodiment of the present invention, the drive shaft 540 that moves the arm 530 coupled to the wipers 510 for removal of foreign substances from the ultraviolet lamp unit 30 is disposed between the lines 330 so that the drive shaft 540 can be prevented from impeding application of ultraviolet rays to ballast water. If the drive shaft 540 is disposed in an intermediate one of three lines 330 and thus there is an interference between the drive shaft 540 and an ultraviolet lamp 310, as shown in FIG. 13, the corresponding ultraviolet lamp 310 is disposed ahead of or behind the drive shaft 540 with respect to the direction of the flow of ballast water so as to prevent ballast water from flowing out of the apparatus without making contact with any ultraviolet lamp 310.

Referring to FIGS. 3, 4, and 17 through 20, in an ultraviolet ballast water treatment apparatus according to yet another embodiment of the present invention, each wiper 510 of the washing unit 50 comes into contact with the surface of the ultraviolet lamp unit 30 (in detail, the sleeve pipe 320 that protects the corresponding ultraviolet lamp 310) and removes foreign substances from the sleeve pipe 320. The wiper 510 includes a main wiper part 511 and auxiliary wiper parts 512 that are provided on an inner circumferential surface of the wiper body 520 so as to remove foreign substances from the ultraviolet lamp unit 30 in a double wiping fashion. The wiper body 520 is an annular frame that surrounds the ultraviolet lamp unit 30, in detail, the sleeve pipe 320 protecting the ultraviolet lamp 310. The wiper body 520 is removably coupled to a predetermined portion of the arm 530. The wiper 510 that makes direct contact with foreign substances and removes them is installed on the inner circumferential surface of the wiper body 520.

In the case of the conventional ultraviolet ballast water treatment apparatus, as shown in FIGS. 1, 12, 15, and 16, a single wiper part 10044 is provided on an inner circumferential surface of an annular wiper body 10042. When the wiper body 10042 is moved forward and backward, the wiper part 10044 removes foreign substances adhering to the surface of the ultraviolet lamp 1002. However, in the conventional case where the single wiper part 10044 is installed in the wiper body 10042, when the wiper part 10044 is moved forward along with the wiper body 10042, the wiper part 10044 is bent rearward. Reversely, when the wiper part 10044 is moved backward, it is bent forward. Such continuous friction of the wiper part 10044 easily deforms or wears the wiper part 10044, thus reducing the replacement cycle therefor. Consequently, the operation of the ultraviolet ballast water treatment apparatus must also be frequently interrupted. Moreover, if the wiper part 10044 is repeatedly bent forward and rearward interlocking with the forward and backward movement of the wiper body 10042 while removing foreign substances from the ultraviolet lamp 1002, the edge of the wiper part 10044 becomes excessively softened, whereby the force of removing foreign substances is reduced, and the efficiency of removal of foreign substances is thus reduced.

On the other hand, in the present invention, as shown in FIGS. 3, 4, and 17 through 20, the main wiper part 511 and the auxiliary wiper parts 512 are installed in the inner circumferential surface of the wiper body 520, thus removing foreign substances adhering to the ultraviolet lamp unit 30 (in detail, the sleeve pipe 320 protecting the ultraviolet lamp 310) in a double wiping fashion.

The main wiper part 511 is disposed in a central portion of the inner circumferential surface of the wiper body 520 so as to remove foreign substances adhering to the ultraviolet lamp unit 30 disposed inside the wiper body 520. The main wiper part 511 is made of material such as ethylene propylene diene monomer (EPDM) rubber, MBR rubber, or fluoro rubber. Unlike the conventional technique having the single wiper structure, in the present invention, the auxiliary wiper parts 512 that are disposed on opposite sides of the main wiper part 511 and will be explained later herein first remove foreign substances, and then the main wiper part 511 secondarily removes remaining foreign substances. Therefore, the foreign substances adhering to the ultraviolet lamp unit 30 (in detail, the surface of the sleeve pipe 320 protecting the ultraviolet lamp 310) can be more effectively removed.

The main wiper part 511 has a depression 5112 in an inner circumferential surface thereof that comes into contact with the surface of the ultraviolet lamp unit 30. The main wiper part 511 includes a first blade 5111 and a second blade 5113 that are respectively disposed on opposite sides of the depression 5112. Thus, when the arm 530 and the wiper body 520 connected to the arm 530 are moved forward or backward, the first blade 5111 or the second blade 5113 is slightly pushed into the depression 5112 so that the foreign substance removal and the movement of the wiper body 520 can be more reliably conducted. That is, if the edge of the main wiper part 511 is maintained perpendicular to the surface of the sleeve pipe 320 without being pushed in any one direction while the main wiper part 511 is moved in a direction, the friction between the elements is increased, thus impeding smooth movement of the elements. Furthermore, if the edge of the main wiper part 511 is pushed and bent in both directions when the main wiper part 511 is moved back and forth, the edge of the main wiper part 511 may be excessively softened. Then, as pointed out in the problems of the conventional technique, the force of removing foreign substances is reduced, and the foreign substance removal efficiency is also reduced. However, in this embodiment of the present invention, the first blade 5111 and the second blade 5113 are provided on the opposite sides of the depression 5112. Thus, when the wiper body 520 moves in one direction to wash the ultraviolet lamp unit 30, the first blade 5111 is pushed into the depression 5112 while removing foreign substances from the ultraviolet lamp unit 30. When the wiper body 520 moves in the other direction to wash the ultraviolet lamp unit 30, the second blade 5113 is pushed into the depression 5112 while removing foreign substances from the ultraviolet lamp unit 30. As such, each of the first and second blades 5111 and 5113 is bent in any one direction only when the wiper body 520 is moved in a specific direction. Therefore, deformation or abrasion of the wiper body 520 can be markedly reduced compared to the conventional technique in which the edge of the wiper part is bent in both directions when the wiper part is moved forward and backward. Furthermore, even if either the first blade 5111 or the second blade 5113 that first makes contact with foreign substances does not reliably remove all of the foreign substances, the other one of the first and second blades 5111 and 5113 will secondarily wipe over remaining foreign substances thereby removing the residual foreign substance. Therefore, the foreign substance removal efficiency can be enhanced.

The auxiliary wiper parts 512 are respectively disposed on the opposite sides of the main wiper part 511. When the arm 530 and the wiper body 520 connected to the arm 530 are moved forward or backward, the corresponding one of the auxiliary wiper parts 512 first makes contact with foreign substances adhering to the ultraviolet lamp unit 30 (in detail, the sleeve pipe 320 protecting the ultraviolet lamp 310) to remove the foreign substances before the main wiper part 511 comes into contact with the remaining foreign substances to remove them. The auxiliary wiper parts 512 are made of material such as Teflon. Unlike the conventional technique having the single wiper structure, the main wiper part 511 and the auxiliary wiper parts 512 disposed on the opposite sides of the main wiper part 511 can remove foreign substances in a double-wiping fashion, whereby the foreign substances adhering to the ultraviolet lamp unit 30 (in detail, the sleeve pipe 320 protecting the ultraviolet lamp 310) can be further effectively removed.

Figure 20:
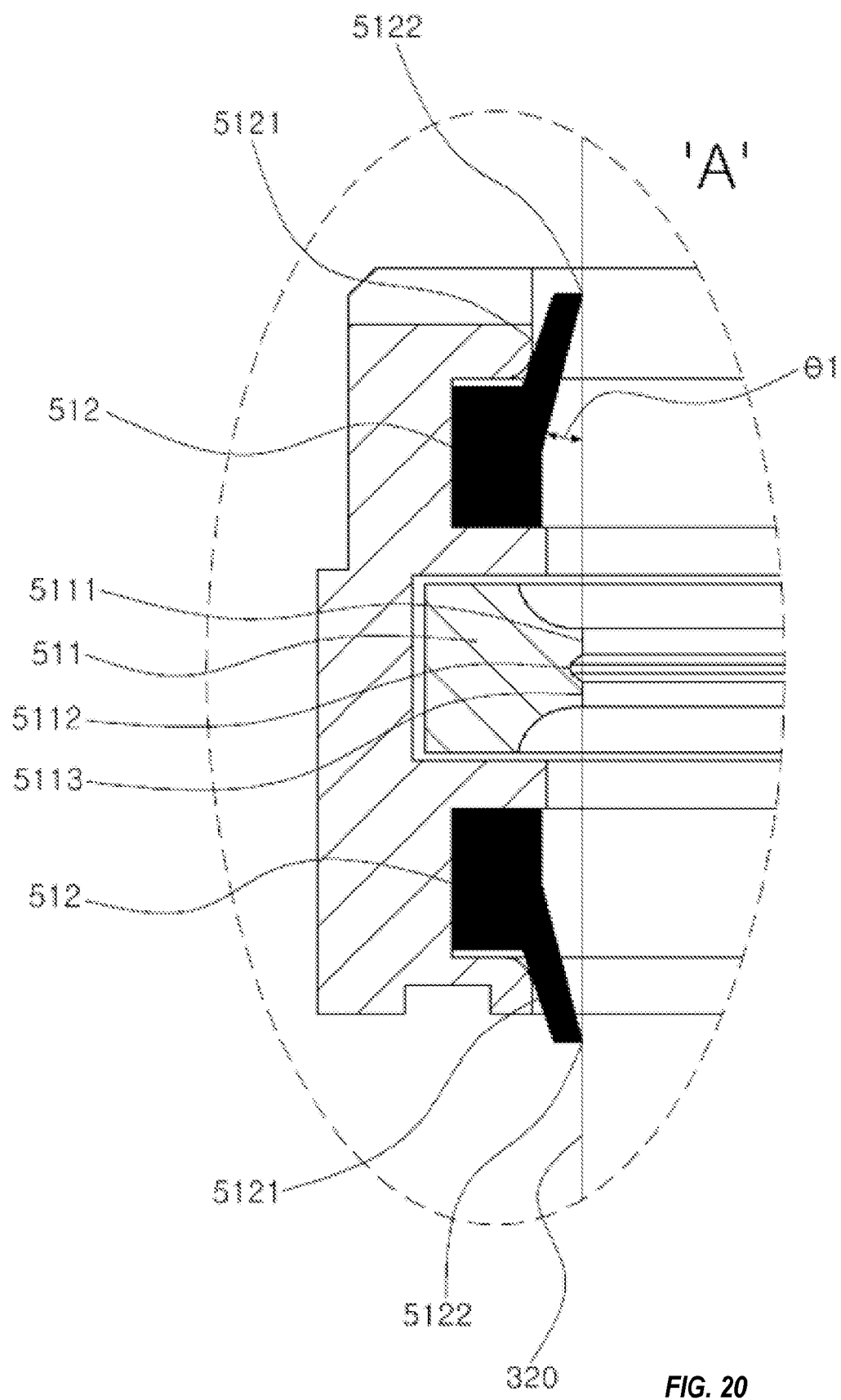
FIG. 20 is an enlarged view of portion 'A' of FIG. 19.

Each auxiliary wiper part 512 includes an inclined protrusion 5121 that protrudes from an inner circumferential surface of a main body of the auxiliary wiper part 512 outward and forward in a direction inclined by θ1. The inclined protrusion 5121 that protrudes from the inner circumferential surface of the auxiliary wiper part 512 outward and forward in an inclined direction includes a pointed part 5122 that comes into line contact with the surface of the sleeve pipe 320 rather than making surface contact therewith, thus minimizing friction between the surface of the sleeve pipe 320 and the auxiliary wiper part 512, and enhancing the foreign substance removal performance. In detail, as shown in FIG. 20, because the inclined protrusion 5121 protrudes from the inner circumferential surface of the auxiliary wiper part 512 outward and forward in an inclined direction, only an edge of the inclined protrusion 5121 makes contact with the surface of the sleeve pipe 320 to remove foreign substances therefrom rather than the entirety of the inner circumferential surface of the auxiliary wiper part 512 being brought into contact with the surface of the sleeve pipe 320. Particularly, the pointed part 5122 is configured such that the edge of the inclined protrusion 5121 makes line contact with the surface of the sleeve pipe 320 rather than making surface contact with the surface of the sleeve pipe 320. Therefore, the friction between the surface of the sleeve pipe 320 and the auxiliary wiper part 512 can be further reduced while the foreign substance removal process is conducted. Furthermore, the inclined protrusion 5121 is inclined forward with respect to the direction of the forward movement of the wiper body 520. Thus, the inclined protrusion 5121 makes contact with the surface of the sleeve pipe 320 at an acute angle rather than at a right angle. Consequently, the auxiliary wiper part 512 that primarily conducts the foreign substance removal can more effectively remove foreign substances from the surface of the sleeve pipe 320.

Referring to FIGS. 3, 4, 17, and 22 through 24, in an ultraviolet ballast water treatment apparatus according to still another embodiment of the present invention, the washing unit 50 includes a reed switch 560 that monitors the arm 530 to prevent the arm 530 from excessively moving forward or backward out of a predetermined range. The reed switch 560 is configured such that a magnet 563 is inserted into an element of the rear switch 560 and prefabricated elements of the rear switch 560 are separably assembled with each other, whereby deformation of the magnet 563 that may be caused by welding can be prevented. A magnetic force sensor provided on each partition plate 130 in the body 10 monitors the magnetic force of the magnet 563 installed in the reed switch 560 attached to the arm 530. When the magnet 563 approaches within a predetermined range, the magnetic force sensor transmits a corresponding signal to the control unit (not shown), and the control unit converts the direction of the movement of the arm 530 into the other direction. In this way, the reed switch 560 is used for control of the movement of the arm 530.

Figure 21:
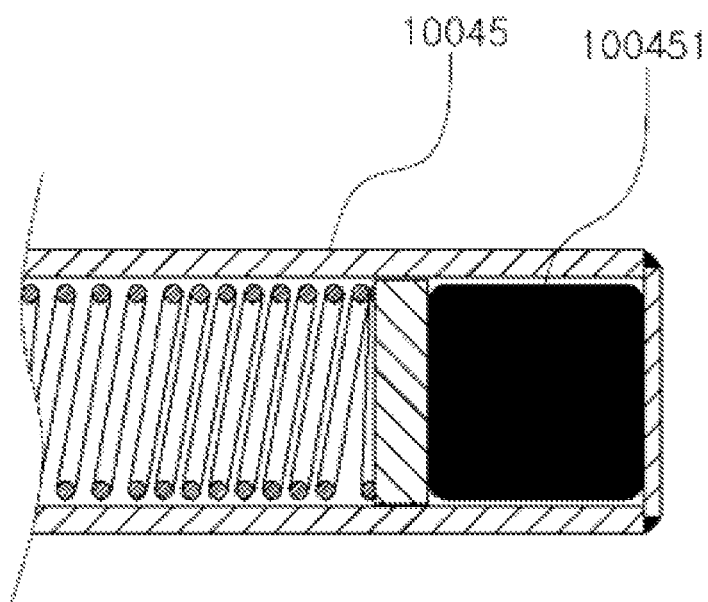
FIG. 21 is a sectional view of a reed switch of the conventional ultraviolet ballast water treatment apparatus.

In the case of the conventional ultraviolet ballast water treatment apparatus, as shown in FIGS. 1, 12 and 21, the washing unit 1004 includes a reed switch 10045 that monitors the arms 10043 such that the arms 10043 are prevented from excessively moving forward or backward out of a predetermined range. The reed switch 10045 is manufactured through a process of inserting a magnet 100451 into an element of the rear switch 10045, and sealing the outer surface of the rear switch 10045 by welding. However, in the conventional reed switch 10045 in which the magnet 100451 is disposed in the reed switch 10045 and then the outer surface of the reed switch 10045 is sealed by welding, the magnetic force of the magnet 100451 may be weakened or lost by heat generated during the welding process. In this case, the intended function of the reed switch 10045 deteriorates. Furthermore, due to the welding, the entirety of the outer surface of the reed switch 10045 is made of metal, e.g., stainless steel. Substances such as iron shavings contained in sea water are attached to the surface of the reed switch 10045 that is always disposed in ballast water. Here, corrosion is caused between two kinds of metals, that is, the stainless steel of the outer surface of the reed switch 10045 and substances such as iron shavings attached thereto. In this way, the outer surface of the reed switch 10045 rapidly corrodes.

Figure 22:
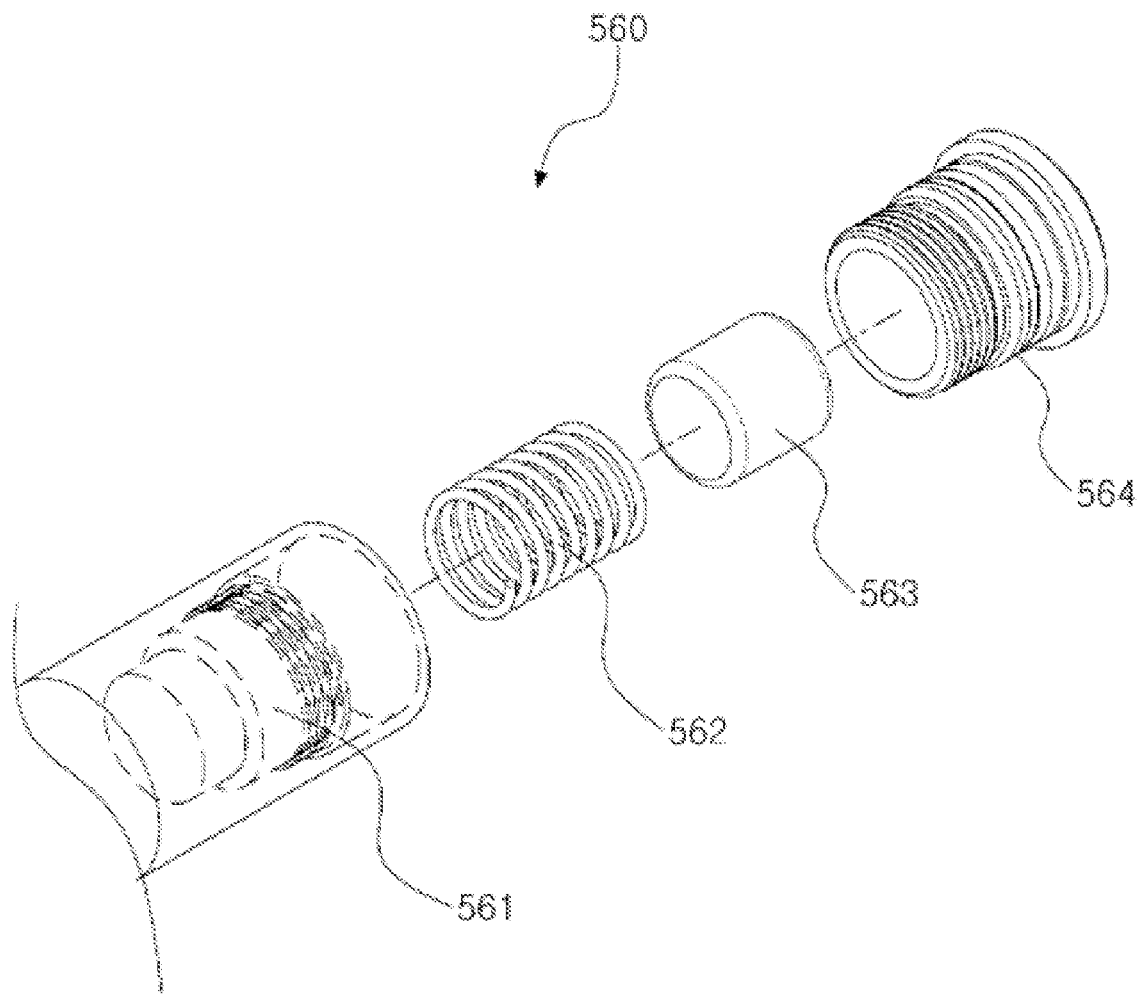
FIG. 22 is an exploded perspective view of FIG. 17.
Figure 23:
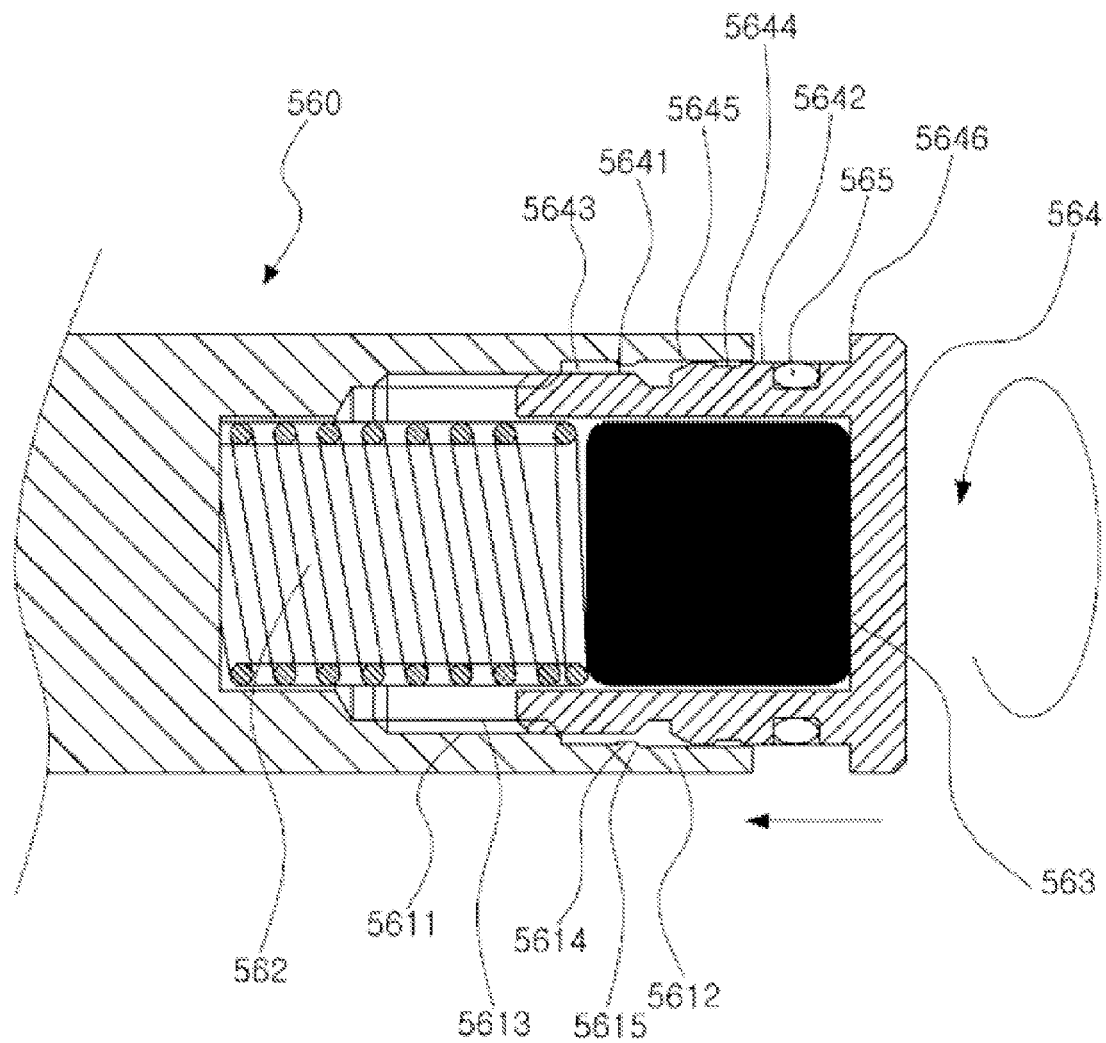
FIG. 23 is a sectional view showing a process of assembling the reed switch of FIG. 22.
Figure 24:
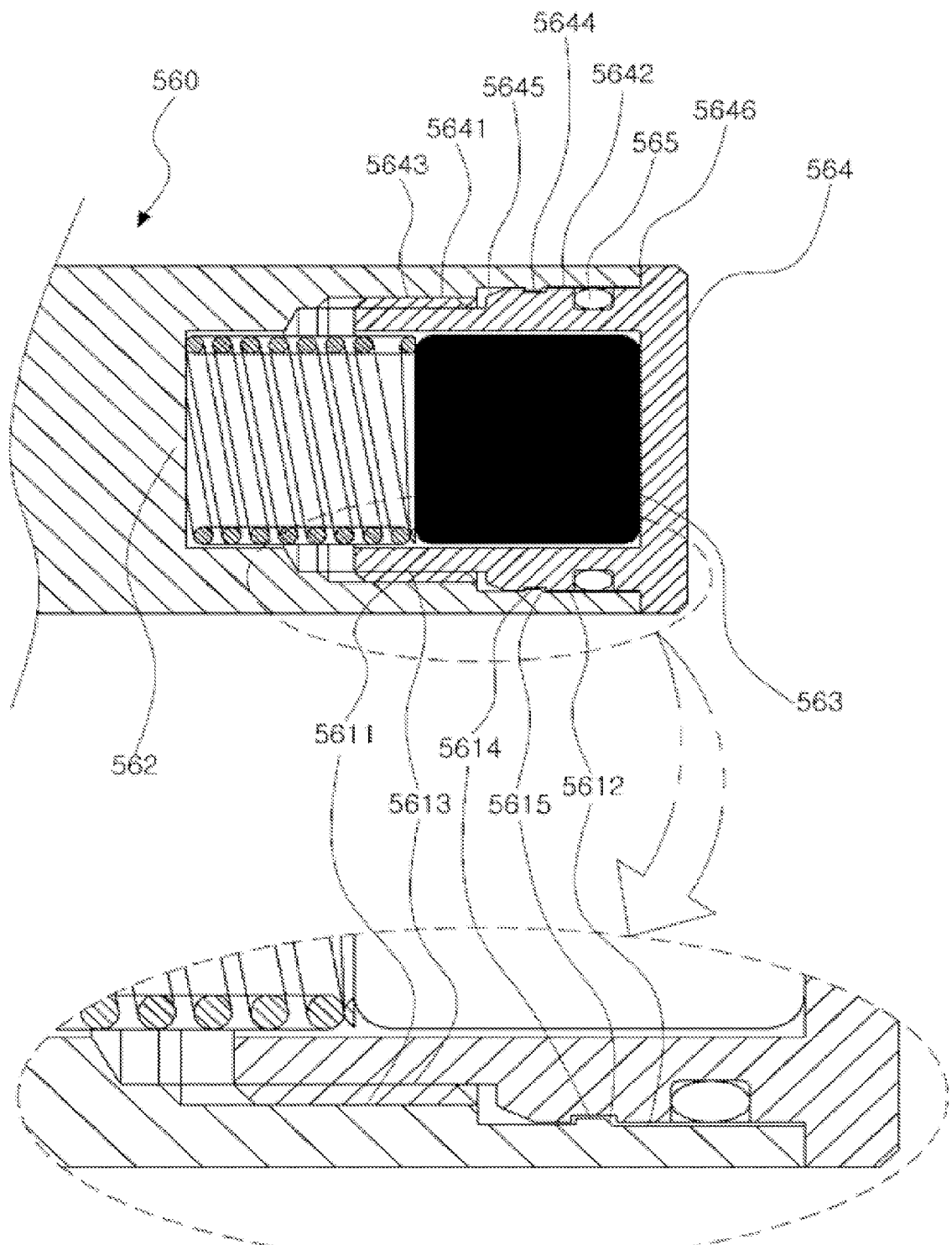
FIG. 24 is a sectional view showing the assembled reed switch of FIG. 22.

In the present invention, as shown in FIGS. 3, 4, 17, and 22 through 24, the reed switch 560 is configured such that the magnet 563 is disposed in the corresponding element and then the prefabricated elements thereof are assembled with each other and sealed. Thereby, the magnet 563 can be prevented from being deformed by welding. That is, as shown in FIGS. 22 through 24, the reed switch 560 has in each of opposite ends thereof a receiving depression 561 in which an elastic member 562 and the magnet 563 are disposed, and a cover member 564 that is coupled to the receiving depression 561 to seal the receiving depression 561 after the elastic member 562 and the magnet 563 has been disposed in the receiving depression 561.

To separably assemble the cover member 564 with the receiving depression 561, the receiving depression 561 includes a first inner circumferential surface 5611, on which an internal thread 5613 is formed, and a second inner circumferential surface 5612 that has a larger diameter than that of the first inner circumferential surface 5611 and is provided with a stop protrusion 5614. Corresponding to the structure of the receiving depression 561, the cover member 564 includes a first outer circumferential surface 5641 that has an external thread 5643 that engages with the internal thread 5613 of the first inner circumferential surface 5611, and a second outer circumferential surface 5642 that has a larger diameter than that of the first outer circumferential surface 5641 and is provided with a locking groove 5644 to which the stop protrusion 5614 is locked. When the cover member 564 is inserted into the receiving depression 561, as shown in FIG. 23, the external thread 5643 of the first outer circumferential surface 5641 of the cover member 564 engages with the internal thread 5613 of the first inner circumferential surface 5611 of the receiving depression 561. When the engagement of the external thread 5643 with the internal thread 5613 is completed, as shown in FIG. 24, the stop protrusion 5614 of the second inner circumferential surface 5612 of the receiving depression 561 is inserted into and locked to the locking groove 5644 of the second outer circumferential surface 5642 of the cover member 564. In addition, the elastic force of the elastic member 562 in the receiving depression 561 prevents the threaded coupling between the receiving depression 561 and the cover member 564 from being undesirably loosened. Thereby, the reed switch 560 can be reliably airtightly sealed.

Here, a tapered portion 5615 that is chamfered at a predetermined angle is provided on a surface of the stop protrusion 5614 that faces an opening of the receiving depression 561. A tapered portion 5645 chamfered at a predetermined angle is also provided on a stepped part forming a boundary between the first outer circumferential surface 5641 and the second outer circumferential surface 5642 of the cover member 564. Thereby, although the stop protrusion 5614 is provided on the inner circumferential surface of the receiving depression 561, the cover member 564 can be easily inserted into the receiving depression 561. In other words, when the cover member 564 is inserted into the receiving depression 561, the stepped portion forming the boundary between the first outer circumferential surface 5641 and the second outer circumferential surface 5642 of the cover member 564 interferes with the stop protrusion 5614 provided on the inner circumferential surface of the receiving depression 561. This may impede the insertion of the cover member 564 into the receiving depression 561. If excessive force is applied to the elements to insert the cover member 564 into the receiving depression 561, the stop protrusion 5614 or other elements may be damaged. To prevent this, the tapered portions 5615 and 5645 chamfered at predetermined angles are respectively provided on the surface of the stop protrusion 5614 that faces the opening of the receiving depression 561 and comes into contact with the cover member 564 when the cover member 564 is inserted into the receiving depression 561 and on the stepped portion forming the boundary between the first outer circumferential surface 5641 and the second outer circumferential surface 5642 of the cover member 564.

Furthermore, the cover member 564 includes a stopper 5646 that protrudes outward form the second outer circumferential surface 5642 and comes into close contact with an outer end of the receiving depression 561. The stopper 5646 functions to accurately control the depth to which the cover member 564 is inserted into the receiving depression 561 so that the reed switch can be reliably sealed. If the cover member 564 is provided without the stopper 5646 or the like, the cover member 564 may be inserted into the receiving depression 561 to an excessive depth. Alternatively, the cover member 564 may not be completely inserted into the receiving depression 561 when the coupling of the cover member 564 to the receiving depression 561 is completed. In this case, space between the cover member 564 and the receiving depression 561 may not be airtightly sealed. In the present invention, the stopper 5646 protrudes outward from the second outer circumferential surface 5642 of the cover member 564 and comes into close contact with the outer end of the receiving depression 561 so that the depth to which the cover member 564 is inserted into the receiving depression 561 can be accurately controlled.

The cover member 564 is made of nonmetallic material, e.g., polyether ether ketone (PEEK), so as to prevent the cover member 564 from corroding (caused between two kinds of metals as pointed out in the problems of the conventional technique) due to substances such as iron shavings contained in ballast water and attached to the surface of the cover member 564. Meanwhile, a separate groove, in which an O-ring 565 for airtightness is disposed, may be formed in the second outer circumferential surface 5642 of the cover member 564 or the second inner circumferential surface 5612 of the receiving depression 561.

Referring to FIGS. 3, 4, 17, 26, and 27, in an ultraviolet ballast water treatment apparatus according to still another embodiment of the present invention, the arm 530 of the washing unit 50 includes a plate part 531 to which the wiper bodies 520 are coupled, and a hub 532 that is movably coupled to the drive shaft 540 passing through a central portion of the plate part 531. The hub 532 includes a hub body 5321, and a core part 5322 that is threaded over the outer circumferential surface of the drive shaft 540 and is force-fitted into the hub body 5321.

Figure 25:
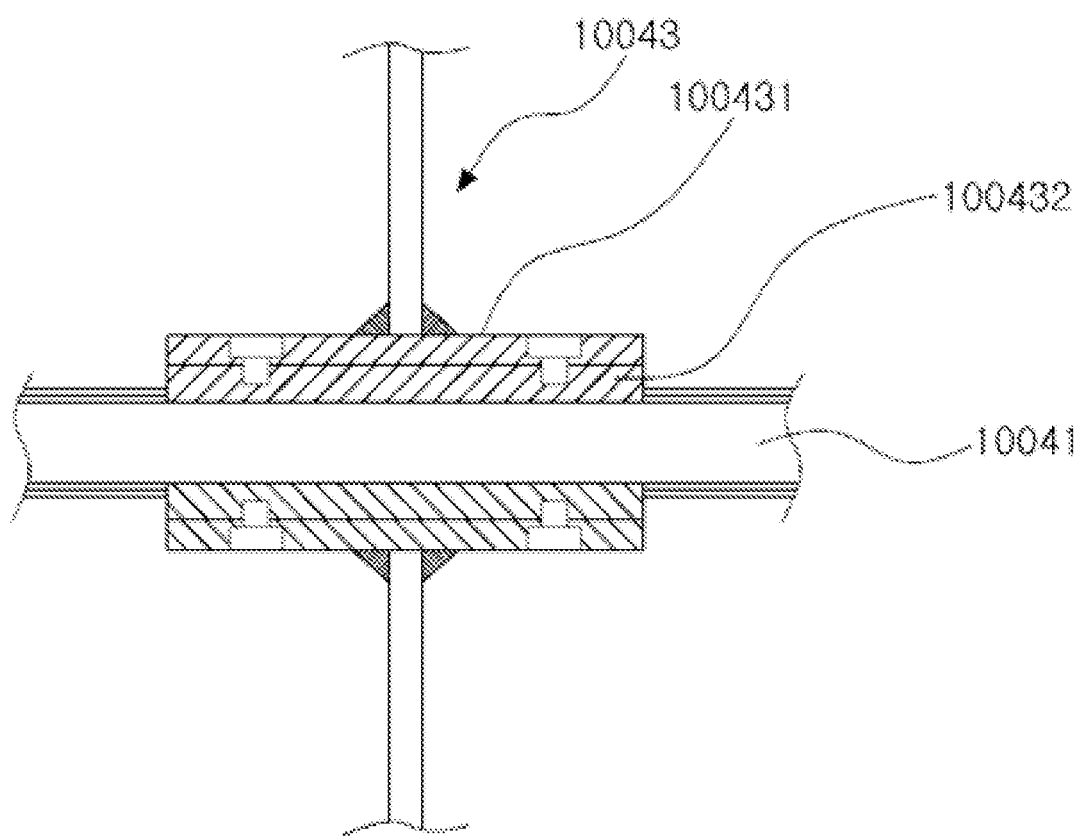
FIG. 25 is a sectional view showing the coupling between an arm and a drive shaft of the conventional ultraviolet ballast water treatment apparatus.

In the case of the conventional ultraviolet ballast water treatment apparatus, as shown in FIGS. 1, 12, and 25, the arms 10043 to which the wiper bodies 10042 are radially coupled are coupled by a hub 100431 to the drive shaft 1004 that functions to move the arms 10043 forward and backward. As shown in FIG. 25, with regard to the conventional structure of coupling the hub 100431 to the drive shaft 10041, a separate core part 100432 is provided on the inner circumferential surface of the hub 100431, and an internal thread formed on the inner circumferential surface of the core part 100432 engages with an external thread formed on the drive shaft 10041. Thus, the arms 10043 can be moved forward or backward by the rotation of the drive shaft 10041. Here, the core part 100432 is coupled to the inner circumferential surface of the hub 100431 by screws. However, as such, if screws are used to couple the hub 100431 to the core part 100432, the following problems are caused. That is, during rotation of the drive shaft 10041 and movement of the arms 10043, a moment is applied to the core part 100432, whereby rotating force is continuously applied to the end of the screw that is disposed in the core part 100432. Thereby, the screw may be loosened, thus causing a problem in which despite the rotation of the drive shaft 10041 the arms 10043 cannot be rotated in conjunction with the drive shaft 10041, or a problem of the core part 100432 being displaced from the correct position thereof.

To avoid the above conventional problems, as shown in FIGS. 3, 4, 17, 26, and 27, the hub 532 of the present invention is configured such that the core part 5322 that is threaded over the outer circumferential surface of the drive shaft 540 is force-fitted into the inner circumferential surface of the hub body 5321 without using any screw, thus fundamentally preventing the core part 5322 from being separated from the hub body 5321.

Figure 26:
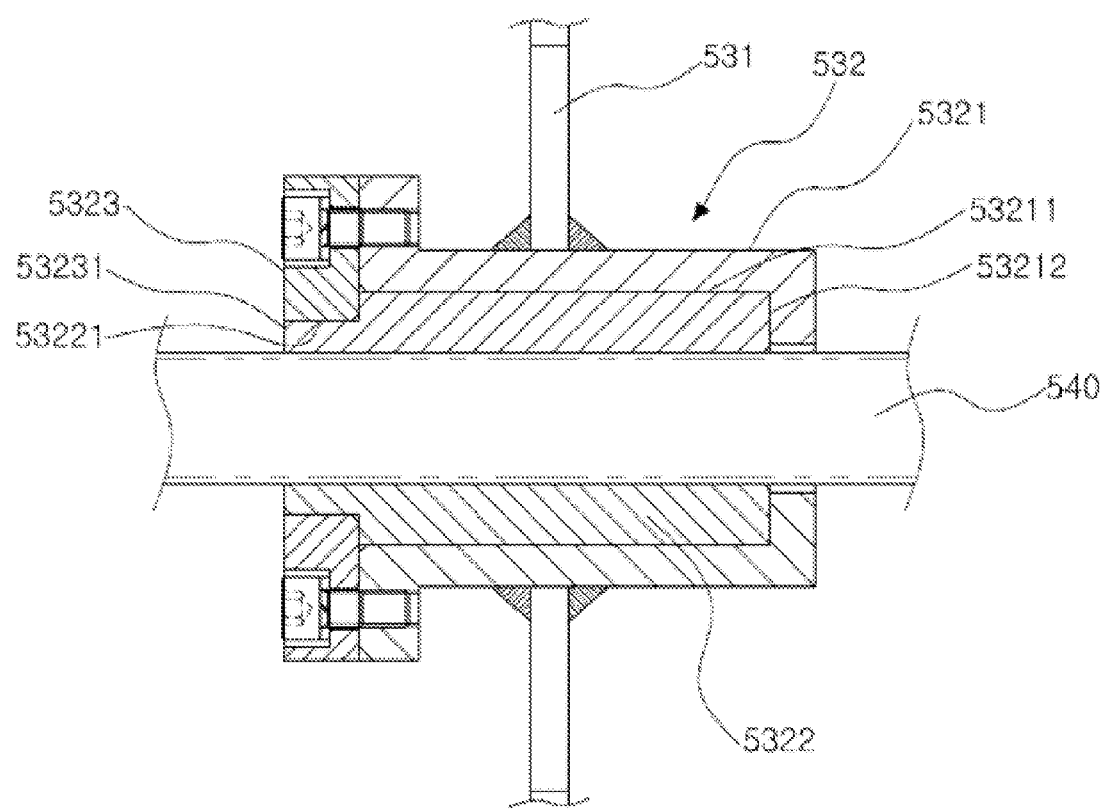
FIG. 26 is a sectional view showing the structure of an arm of FIG. 17.
Figure 27:
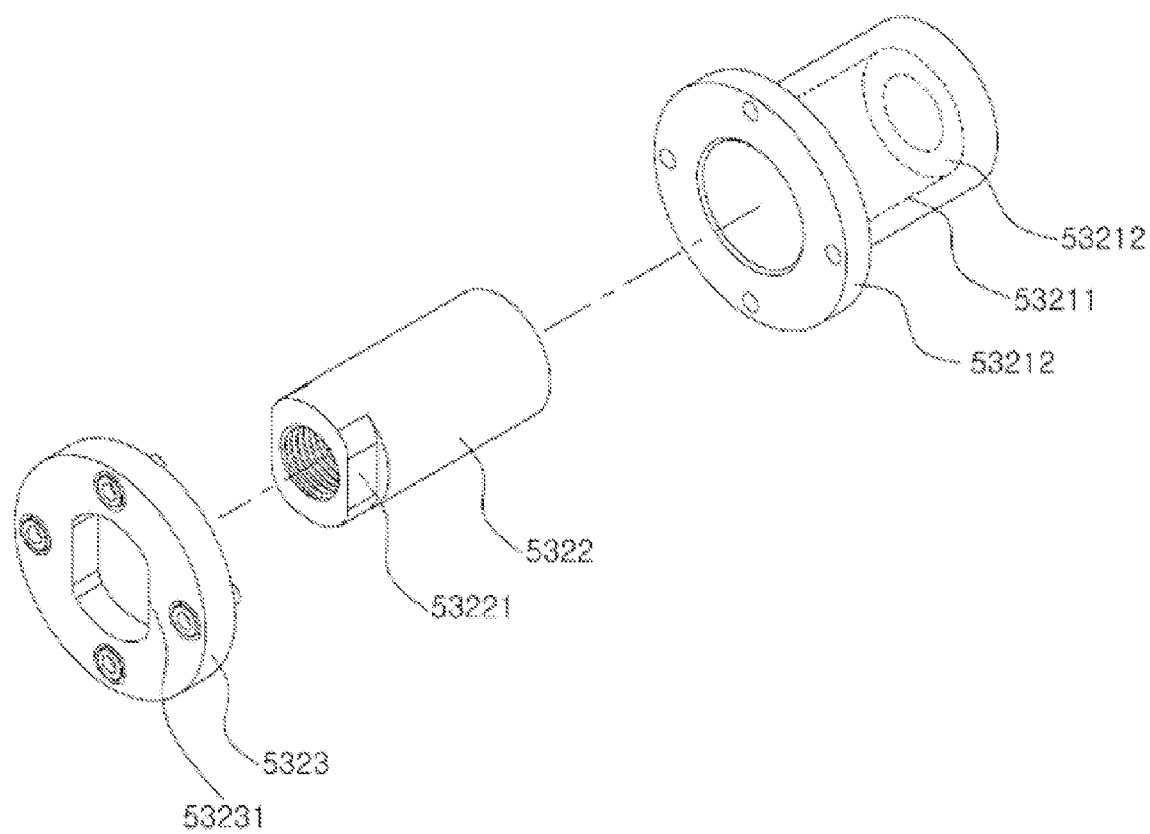
FIG. 27 is an exploded perspective view of an arm hub.

In more detail, as shown in FIGS. 26 and 27, a core-part-receiving depression 53211 for receiving the core part 5322 therein is formed in the hub body 5321. After the core part 5322 is inserted into the core-part-receiving depression 53211, a separate cover plate 5323 is coupled to a first end of the hub body 5321 to close the opening of the core-part-receiving depression 53211 into which the cover part 5322 has been inserted. In this way, the core part 5322 can be reliably fastened to the hub body 5321 without using a screw directly coupling the core part 5322 to the hub body 5321. Preferably, the diameter of the core-part-receiving depression 53211 is equal to or slightly less than the outer diameter of the core part 5322 so that the core part 5322 can be force-fitted into the core-part-receiving depression 53211.

A chamfered part 53221 is formed by reducing the outer diameter of a first end of the core part 5322 that makes contact with the cover plate 5323. The cover plate 5323 has in a central portion thereof an insert hole 53231. The first end of the core part 5322 on which the chamfered part 53221 is formed is inserted into the insert hole 53231. The insert hole 53231 has a shape corresponding to that of the first end of the core part 5322 on which the chamfered part 53221 is formed so that the first end of the core part 5322 on which the chamfered part 53221 is formed can be precisely force-fitted into the insert hole 53231. When the first end of the core part 5322 on which the chamfered part 53221 is formed is inserted into the insert hole 53231 of the cover plate 5323, the chamfered part 53221 that is formed on the typically-circular outer circumferential surface of the core part 5322 by reducing the outer diameter of the core part 5322 and preferably formed in a planar shape can prevent the core part 5322 from rotating in the core-part-receiving depression 53211.

The hub body 5321 includes a core-part support 53212 in a second end thereof that is opposed to the first end thereof to which the cover plate 5323 is coupled. The core-part support 53212 protrudes from the inner circumferential surface of the core-part-receiving depression 53211 toward the center of the core-part-receiving depression 53211. Thus, a second end of the core part 5322 that is inserted into the core-part-receiving depression 53211, in other words, the end of the core part 5322 that is opposed to the first end thereof on which the chamfered part 53221 is formed, is stopped by the core-part support 53212 so that the core part 5322 is prevented from being removed from the core-part-receiving depression 53211.

Preferably, the hub body 5321 and the cover plate 5323 are made of stainless steel to prevent corrosion, and the core part 5322 is made of polyether ether ketone (PEEK) or Teflon.

Referring to FIGS. 3, 4, and 29 through 31, in an ultraviolet ballast water treatment apparatus according to still another embodiment of the present invention, the drive shaft 540 that moves the arm 530 of the washing unit 50 is disposed and supported in drive shaft insert holes 132 of the partition plates 130 that partition the space in the body 10 into the space, through which ballast water flows, and the space, in which no ballast water flows. With regard to a coupling structure of a portion of the drive shaft 540 that is disposed in each drive shaft insert hole 132, a contact surface 5411 is airtightly formed between a rotor 541 that rotates along with the drive shaft 540 and a stator 542 that is coupled to a cover frame 544 fastened to a portion of the partition plate 130 which surrounds the drive shaft insert hole 132, whereby ballast water can be prevented from leaking, that is, entering the space in which no ballast water flows and electronic devices or the like are disposed.

Figure 28:
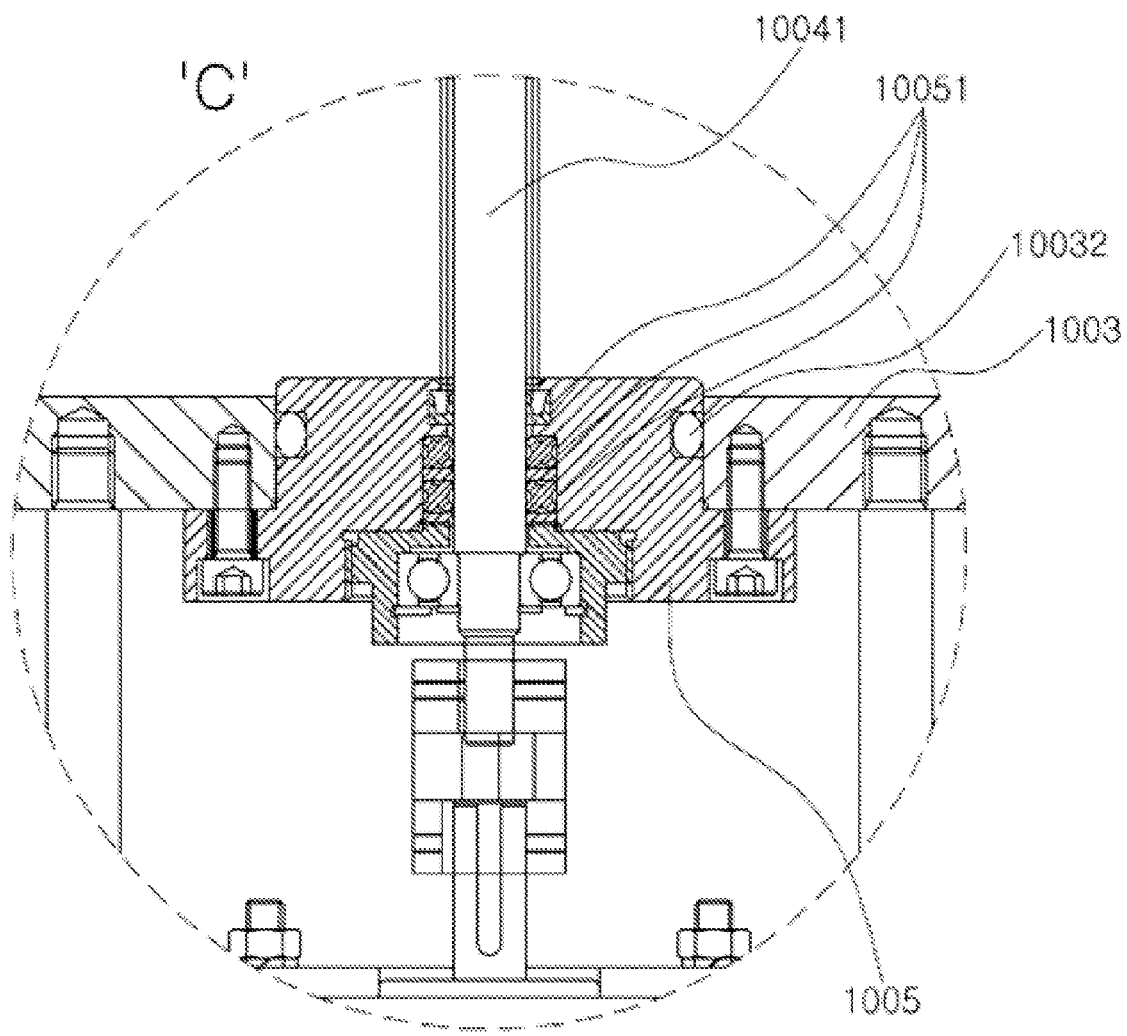
FIG. 28 is a sectional view showing the coupling between the drive shaft and a drive shaft insert hole of the conventional ultraviolet ballast water treatment apparatus.
Figure 29:
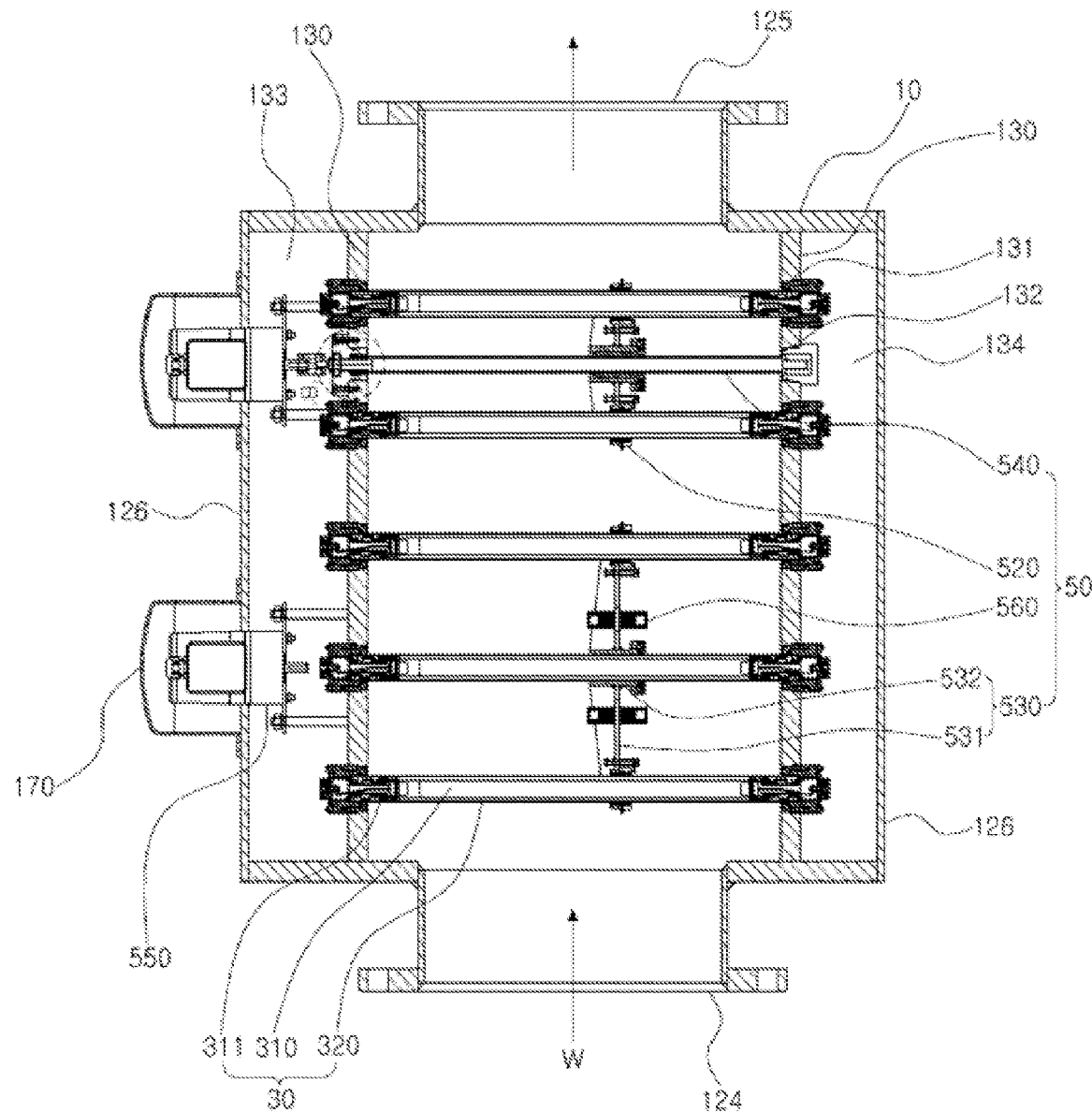
FIG. 29 is a sectional view taken along line D-D' of an ultraviolet ballast water treatment apparatus according to yet another embodiment of the present invention.

In the case of the conventional ultraviolet ballast water treatment apparatus, as shown in FIGS. 1, 8, and 28, the drive shaft 10041 that moves the arms 10043 of the washing unit for removing foreign substances adhering to the ultraviolet lamps 1002 in the body 1001 is connected to a drive motor so that drive force can be transmitted to the drive shaft 10041. In detail, an end of the drive shaft 10041 is connected to the drive motor via a drive shaft insert hole 10032 of the corresponding partition plate 1003 that partitions the space of the body 1001 into the ballast-water-flowing space and the no-ballast-water space. Here, it is important to ensure airtightness between the drive shaft 10041 and the drive shaft insert hole 10032. For this, in the conventional technique, as shown in FIG. 28, a separate cover member 1005 covers the drive shaft insert hole 10032 in which the end of the drive shaft 10041 is disposed. Separate members such as O-rings 10051 for airtightness are provided on portions of the cover member 1005 that respectively make contact with the inner circumferential surface of the drive shaft insert hole 10032 and the outer circumferential surface of the end of the drive shaft 10041, thus preventing ballast water from leaking out of the ballast-water-flowing space. However, this conventional technique uses just a basic method in which the elastic O-rings 10051 are force-fitted into the corresponding grooves to provide the airtight structure. Particularly, in the case of the O-ring 10051 that comes into contact with the outer circumferential surface of the end of the drive shaft 10041 which is repeatedly rotated, continued friction wears and deforms the O-ring 10051. After a predetermined period of time has passed, the O-ring 10051 loses the intended function thereof. Given this, the O-ring 10051 must be frequently and periodically replaced with a new one.

On the other hand, as shown in FIGS. 3, 4, and 29 through 31, the present invention is configured such that, to enhance the airtightness particularly on a portion making contact with the drive shaft 540, the contact surface 5411 is airtightly formed between the rotor 541 rotating along with the drive shaft 540 and the stator 542 coupled to the cover frame 544 fastened to the portion of the partition plate 130 that defines the drive shaft insert hole 132, thus preventing ballast water from leaking, that is, entering the no-ballast-water space.

The rotor 541 is installed in a rotor seating depression 5431 that is formed at a predetermined position in an annular casing 543 fitted over the drive shaft 540. The rotor 541 is rotated along with the annular casing 543 by rotation of the drive shaft 540. A surface of the rotor 541 along with a surface of the stator 542, which will be explained later herein, forms the contact surface 5411. The surface of the rotor 541 and the surface of the stator 542 make close (airtight) contact with each other on the contact surface 5411, and an oil film (watertight) is formed therebetween, whereby ballast water can be reliably prevented from leaking. The contact surface 5411 that is formed on the junction between the rotor 541 and the stator 542 is a portion on which friction occurs between the rotor 541 that is rotated and the stator 532 that is stationary. Therefore, the contact surface 5411 must be formed to be smooth so as to minimize friction. Particularly, smoothness of the contact surface 5411 and formation of the oil film are critical factors for ensuring airtight performance. Therefore, it is significant to form the contact surface 5411 to be completely even. Furthermore, the rotor 541 is compressed by the elastic force of an elastic spring 547, which will be explained later herein. When there is no abrasion between the rotor 541 and the stator 542 on the contact surface 5411, the airtightness is maintained by the oil film formed therebetween. When abrasion occurs between the rotor 541 and the stator 542, the elastic force of the elastic spring compresses the rotor 541 by a degree of the abrasion and thus compensates for the abrasion, whereby the airtightness between the rotor 541 and the stator 542 can be also ensured.

The stator 542 is disposed in a stator seating depression 5441 that is formed at a predetermined position in the cover frame 544 fastened to the partition plate 130 which closes the drive shaft insert hole 132 after the drive shaft 540 is inserted into the drive shaft insert hole 132. The stator 542 along with the corresponding surface of the rotor 541 forms the contact surface 5411. Particularly, the stator 542 is fixed along with a separate auxiliary seat 5421 in the stator seating depression 5441. The reason for this is because the stator 542 is disposed at the correct position and depth for the facilitation of maintenance.

Figure 30:
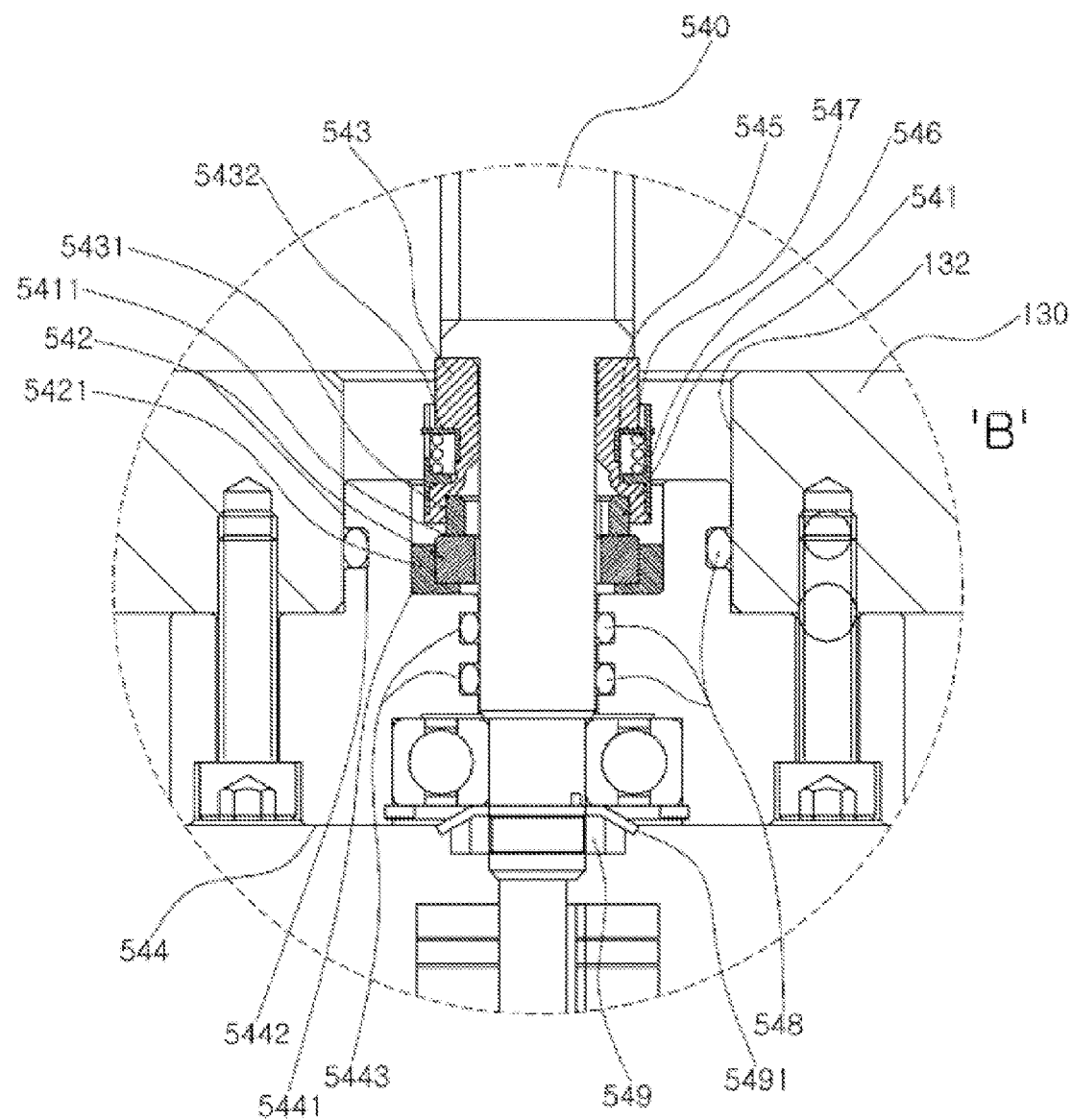
FIG. 30 is an enlarged view of portion 'B' of FIG. 29.
Figure 31:
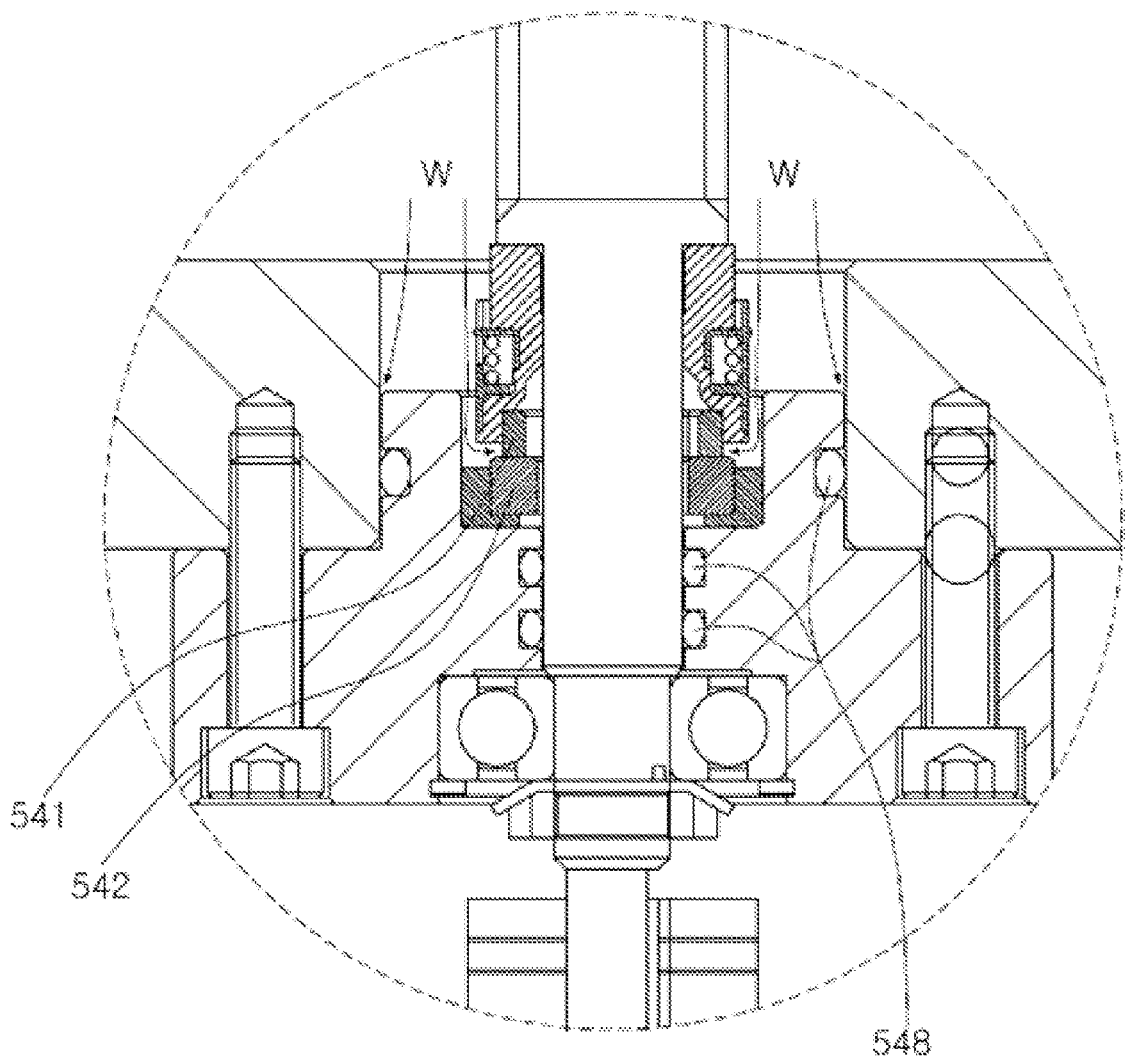
FIG. 31 is a view showing a double sealing structure for preventing loss of ballast water.

The annular casing 543 has a first depression 5432 in an outer circumferential surface thereof. A first member 545 is provided in a first side of the first depression 5432, and a second member 546 is provided in a second side of the first depression 5432. An elastic spring 547 is disposed between the first member 545 and the second member 546. A lower end of the elastic spring 547 is supported on the first member 545. Force with which an upper end of the elastic spring 547 compresses the second member 546 biases the rotor 541 toward the stator 542 with respect to the contact surface 5411, thus bringing the rotor 541 into close contact with the stator 542. The annular casing 543 is made of elastic material such as acrylonitrile-butadiene rubber (NBR), ethylene propylene diene monomer (EPDM), or fluoro rubber. As shown in FIGS. 30 and 31, the first member 545 and the second member 546 that are disposed on the respective opposite sides of the first depression 5432 with the elastic spring 547 interposed therebetween are not fixed to each other. Thus, the elastic spring 547, the first end of which is supported on the first member 545, can elastically compress the second member 546 and move it. Consequently, even when the portion of the rotor 541 that forms the contact surface 5411 is worn, the rotor 541 is compressed by the degree with which the rotor 541 is worn and thus compensated for so that the sealing on the contact surface 5411 can be continuously maintained.

The cover frame 544 is coupled into the drive shaft insert hole 132. A second depression 5442 is formed in a portion of the cover frame 544 that makes contact with the inner circumferential surface of the drive shaft insert hole 132. A sealing member 548 is provided in the second depression 5442. Furthermore, a third depression 5443 is formed in a portion of the cover frame 544 that makes contact with the drive shaft 540. A sealing member 548 is also provided in the third depression 5443. Thus, the present invention can provide a double sealing structure including the above-mentioned sealing function using the contact surface 5411 between the rotor 541 and the stator 542 and an additional sealing function using the sealing members 548. That is, as shown in FIG. 31, the sealing member 548 that is disposed in the second depression 5442 functions to prevent leakage of ballast water between the inner circumferential surface of the drive shaft insert hole 132 and the cover frame 544. The sealing member 548 that is disposed in the third depression 5443 functions to prevent leakage of ballast water between the outer circumferential surface of the drive shaft 540 and the cover frame 544. As such, in the present invention, the contact surface 5411 and the sealing members 548 form a double sealing structure that can doubly prevent ballast water from leaking through the drive shaft insert hole 132. Furthermore, as well as using screw-coupling for fastening the cover frame 544 to the partition plate 130 on an upper surface of the cover frame 544, a nut 549 and a washer 5491 are used to compress a central portion of the upper surface of the cover frame 544 and fix the cover frame 544 in place. Thereby, the cover frame 544 and the stator 542 are fixed in place at the correct positions so that the sealing performance can be more reliably ensured.

Referring to FIGS. 3, 4, and 33 through 35, in an ultraviolet ballast water treatment apparatus according to still another embodiment of the present invention, the partition plates 130 support the opposite ends of the ultraviolet lamps 310 and partition the space in the body 10 into a space in which ballast water drawn into the body 10 through the inlet port 124 flows before being discharged through the outlet port 125, and a space in which no ballast water flows. The no-ballast-water space includes a first space 133 and a second space 134 that are disposed on opposite sides of the ballast-water-flowing space (wherein, openings of the first space 133 and the second space 134 are respectively sealed by side covers 126 coupled to the body). Furthermore, the first space 133 and the second space 134 that are separated from each other and disposed on the respective opposite sides of the ballast-water-flowing space are connected to each other by a gas flow line 140. Gas (pure air) is drawn into the first space 133 through a gas inlet line 150 so as to increase the pressure in the first space 133 to a level higher than the external air pressure (atmospheric pressure). Simultaneously, the gas drawn into the first space 133 is also injected into the second space 134 through the gas flow line 140. In this way, the pressure in the first and second spaces 133 and 134 that are separately provided can be uniformly maintained to be equal to or higher than the external air pressure.

Figure 32:
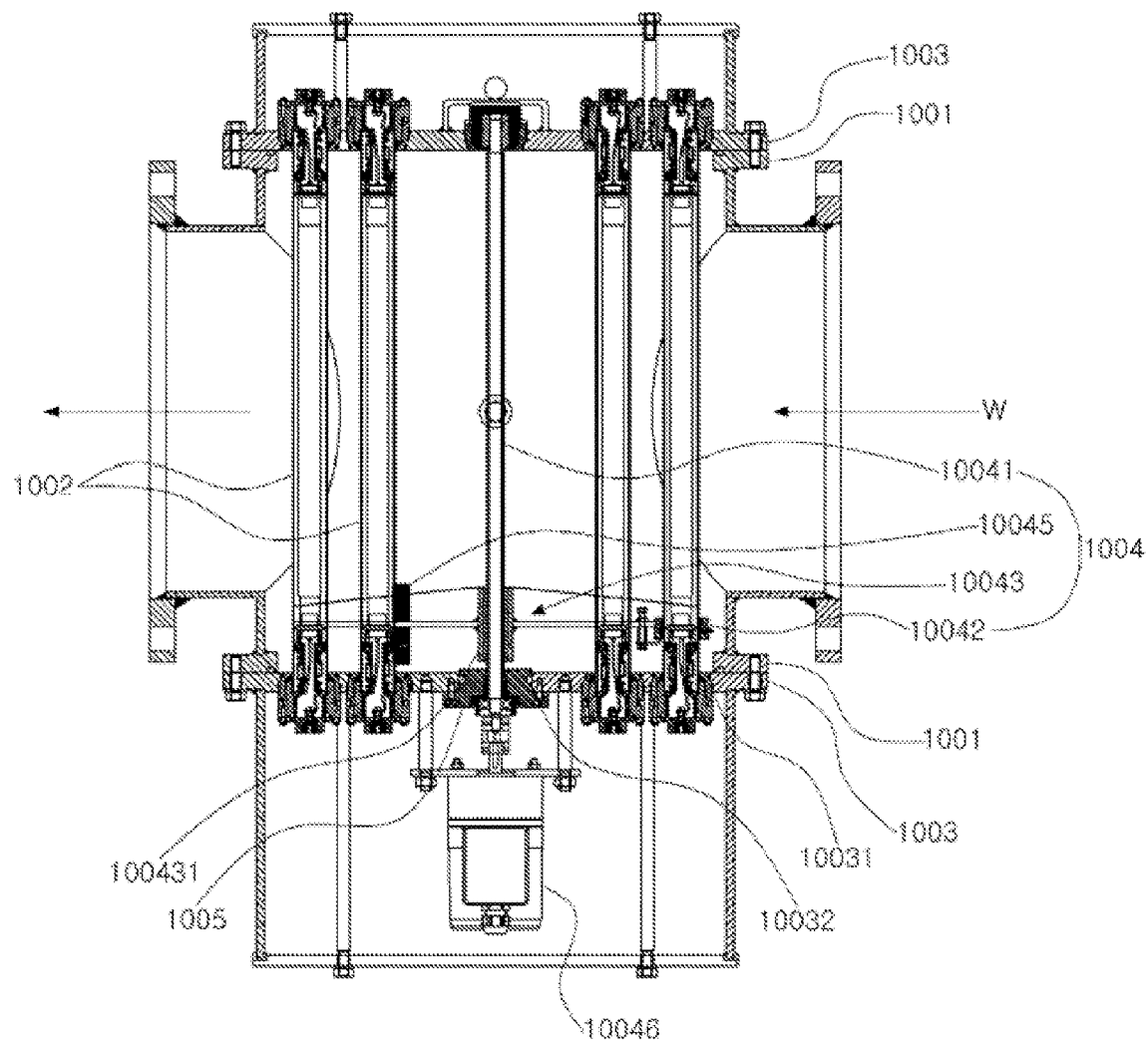
FIG. 32 is a sectional view showing the internal structure of the body of the conventional ultraviolet ballast water treatment apparatus.

In the case of the conventional ultraviolet ballast water treatment apparatus, as shown in FIGS. 1, 8, and 32, the space in the body 1001 is partitioned into the ballast-water-flowing space and the no-ballast-water space by the partition plates 1003. The no-ballast-water space comprises two no-ballast-water spaces (in which the opposite ends of the ultraviolet lamps 1002, the drive motor, etc. are disposed) that are respectively disposed at left and right opposite sides of the ballast-water-flowing space in the body 1001. Due to characteristics of the ultraviolet ballast water treatment apparatus that is installed in a vessel defining a limited space therein, an explosion proof pressure structure must be embodied by increasing the pressure in space in the ultraviolet ballast water treatment apparatus, particularly, in which electronic devices or the like are installed, thus preventing external harmful air, especially air containing explosive substances, from being drawn into the space in the apparatus. However, the conventional ultraviolet ballast water treatment apparatus has no explosion-proof pressure structure. Even if an explosion proof pressure structure is formed in the conventional ultraviolet ballast water treatment apparatus, the conventional ultraviolet ballast water treatment apparatus with the body 1001 having the above-mentioned internal structure has the following problems because the no-ballast-water spaces in which the opposite ends of the ultraviolet lamps 1002, the drive motor, etc. are installed are separated from each other on opposite sides of the body 1001 without communicating with each other. That is, as shown in FIG. 32, to embody the explosion-proof pressure structure in each no-ballast-water space, a separate gas inlet line must be connected to each of the left and right no-ballast-water spaces so that gas (pure air) is injected into each no-ballast-water space to increase the pressure in the space. As such, for each no-ballast-water space, an explosion-proof pressurizing operation must be separately conducted. Moreover, it is difficult to make the pressures in the left and right no-ballast-water spaces be equal to each other because the explosion-proof pressurizing operations for the no-ballast-water spaces are separately conducted.

To avoid the above-mentioned problems of the conventional technique, as shown in FIGS. 3, 4, and 33 through 35, the present invention is configured such that the first and second spaces 133 and 134 that are separately disposed on the opposite sides of the ballast-water-flowing space in the body 10 are connected to each other by the gas flow line 140, wherein when gas (pure air) is drawn into the first space 133 through the gas inlet line 150 to increase the pressure of the first space 133 to a level higher than the atmospheric pressure, the gas is simultaneously injected into the second space 134 through the gas flow line 140, whereby the pressures in the first and second spaces 133 and 134 can be made uniform and be equal to or higher than the atmospheric pressure. In this way, for the first and second spaces 133 and 134, uniform explosion-proof pressurization can be embodied.

Figure 33:
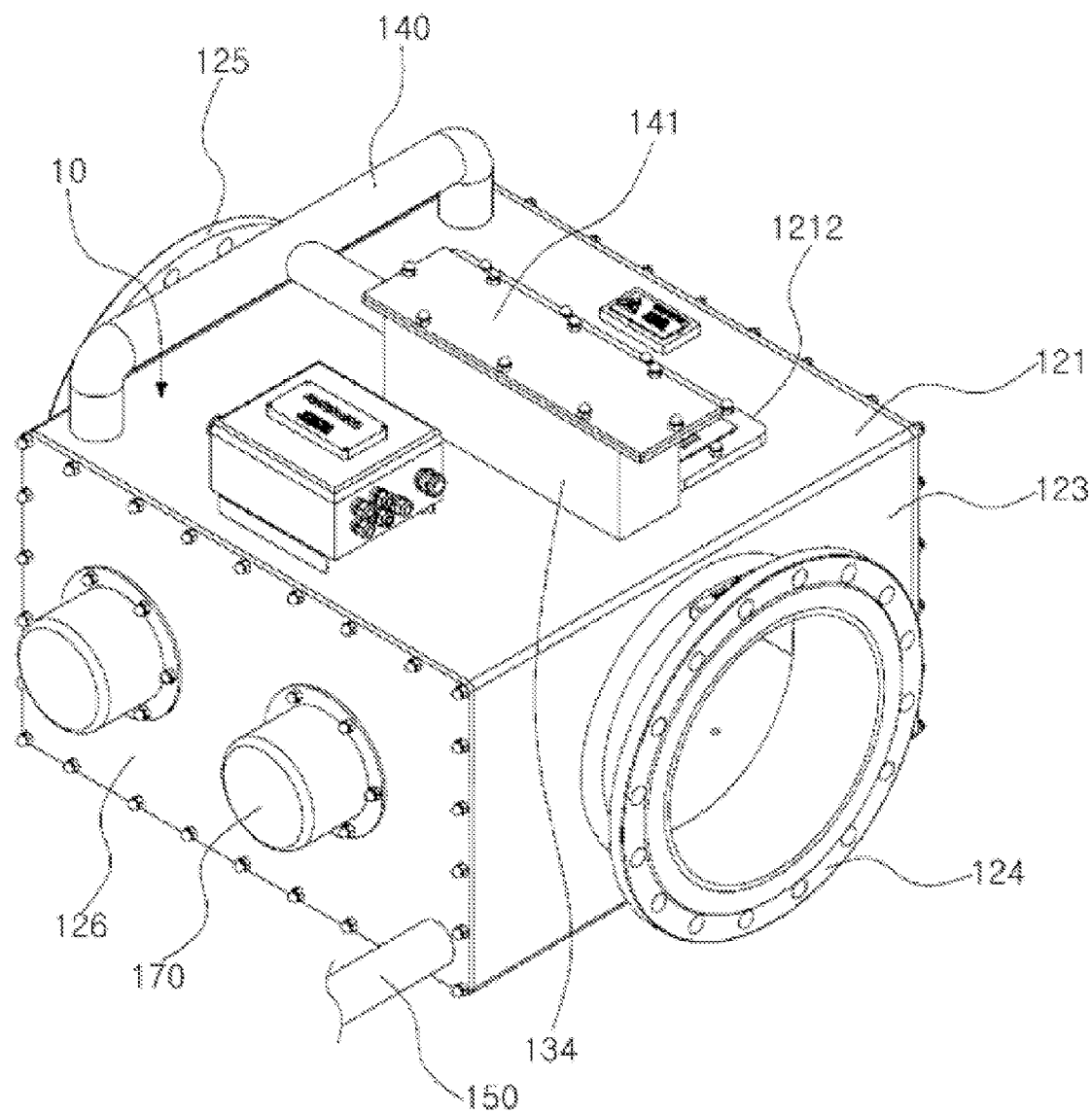
FIG. 33 is a perspective view illustrating a gas flow line according to the present invention.
Figure 34:
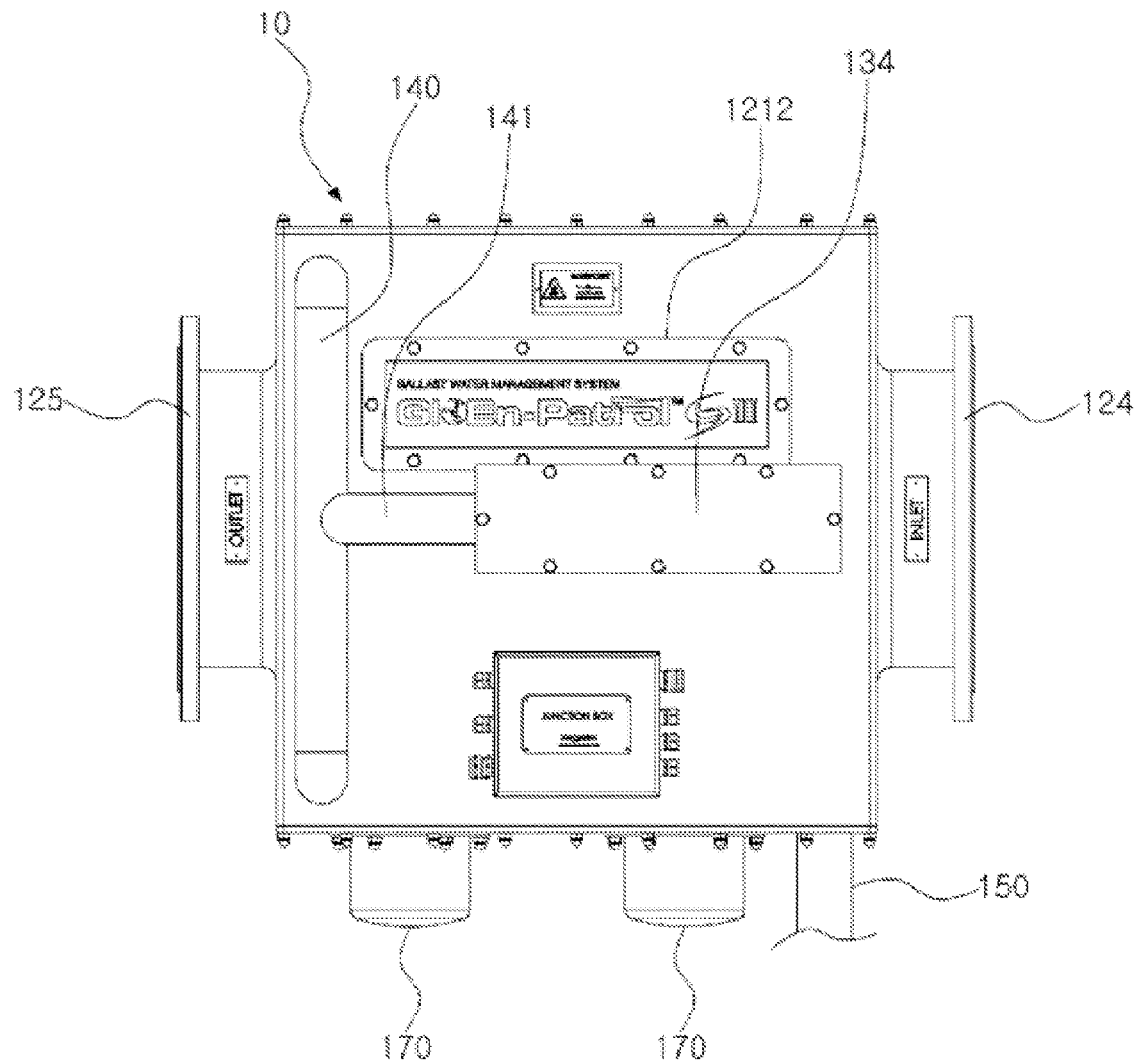
FIG. 34 is a plan view of FIG. 33.

Referring to FIGS. 33 and 34, the gas flow line 140 connecting the first space 133 to the second space 134 may be provided outside the body 10. In this embodiment, an auxiliary flow line 141 branches off from the gas flow line 140 disposed outside the body 10 and is connected to a third space 135 that covers the elements installed outside the body 10. Thus, gas flowing through the gas flow line 140 is also injected into the third space 135 through the auxiliary flow line 141 so that explosion-proof pressurization can also be conducted for the third space 135 as well as for the first and second spaces 133 and 134. As stated above, due to characteristics of the ultraviolet ballast water treatment apparatus that is installed in a vessel having a limited space therein, explosion-proof pressurization for electronic devices must be conducted by increasing the pressure in an internal space isolated from the outside such that external harmful air, especially air containing explosive substances, can be prevented from being drawn into the internal space in which the electronic devices are installed. Installed outside the body 10, electronic devices such as the ultraviolet ray sensor 340, a flow meter, a temperature sensor, etc. are disposed in the separate third space 135 that is isolated from the outside. Given this, explosion-proof pressurization for the third space 135 must also be conducted. For this, in the present invention, the auxiliary flow line 141 communicating the gas flow line 140 with the third space 135 can supply gas (pure air) into the third space 135 while explosion-proof pressurization for the first and second spaces 133 and 134 are conducted. In this way, explosion-proof pressurization for first, second and third spaces 133, 134, and 135 can be conducted at the same time without a separate explosion-proof pressurization work for the third space 135 being required. Furthermore, explosion-proof pressure can be uniformly applied to the first, second and third spaces 133, 134, and 135 that are provided separately from each other.

Figure 35:
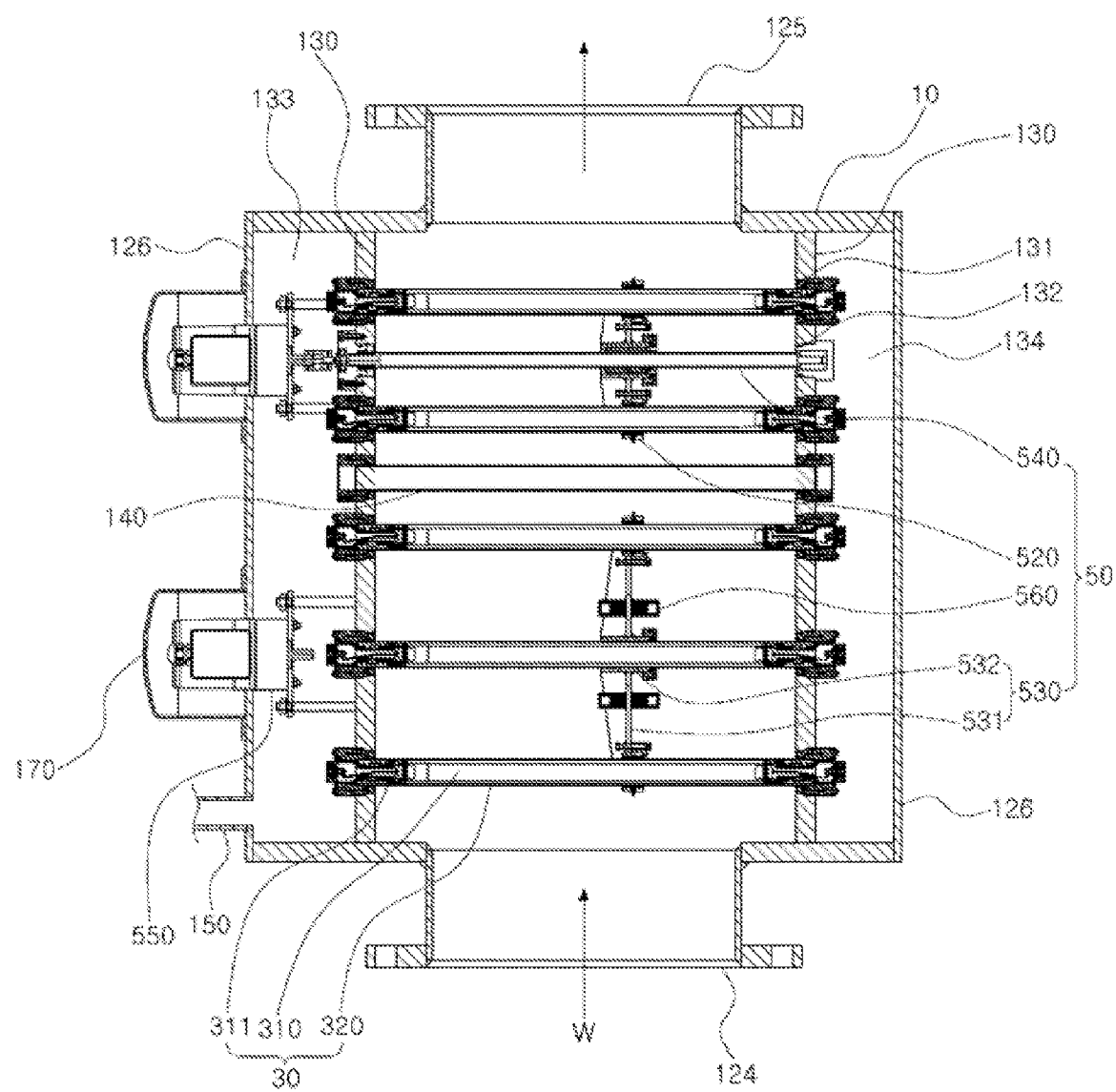
FIG. 35 is a sectional view taken along line D-D' of an ultraviolet ballast water treatment apparatus according to still another embodiment of the present invention.

Referring to FIG. 35, in still another embodiment, the gas flow line 140 may be disposed in the body 10 and connect the first space 133 to the second space 134 in such a way that the gas flow line 140 passes through both the partition plates 130. This structure can prevent the gas flow line 140 from protruding outward from the body 10 and increasing the volume of the apparatus. Furthermore, explosion-proof pressurization for the first and second spaces 133 and 134 that are provided separately from each other can be conducted at the same time by using the internal space of the body 10. In addition, explosion-proof pressure can be uniformly applied to the first and second spaces 133 and 134. Here, due to the structure in which the gas flow line 140 is disposed in the body 10 across the space through which ballast water flows between the partition plates 130, the gas flow line 140 is preferably made of a quartz pipe to prevent the gas flow line 140 from impeding application of ultraviolet rays onto ballast water. In this case, although the gas flow line 140 is disposed across the space through which ballast water flows, ultraviolet rays can pass through the gas flow line 140 made of a quartz pipe, so that sterilization effect of ultraviolet rays on ballast water can be maintained.

Referring to FIGS. 3, 4, 37, and 38, in an ultraviolet ballast water treatment apparatus according to still another embodiment of the present invention, the space in the body 10 is partitioned by the partition plates 130 into the space through which ballast water that is drawn into the body 10 through the inlet port 124 and discharged out of the body 10 through the outlet port 125 flows, and the space through which no ballast water flows. The ultraviolet lamps 310 are oriented perpendicular to the direction of the flow of ballast water that passes through the inlet port 124 and the outlet port 125. The opposite ends of the ultraviolet lamps 310 are supported by the partition plates 130. A protruding plate 160 that protrudes a predetermined length from the inner surface of the body 10 and surrounds the outlet port 125 is provided on the inner surface of the body 10. Thanks to the protruding plate 160, of ballast water flowing through the body 10, ballast water that passes near electrodes 311 provided on the opposite ends of the ultraviolet lamps 310 supported by the partition plates 130 (no ultraviolet ray is emitted from portions of the ultraviolet lamps 310 that are adjacent to the electrodes 311) can be prevented from being directly discharged out of the body 10 through the outlet port 125 without being exposed to ultraviolet rays.

Figure 36:
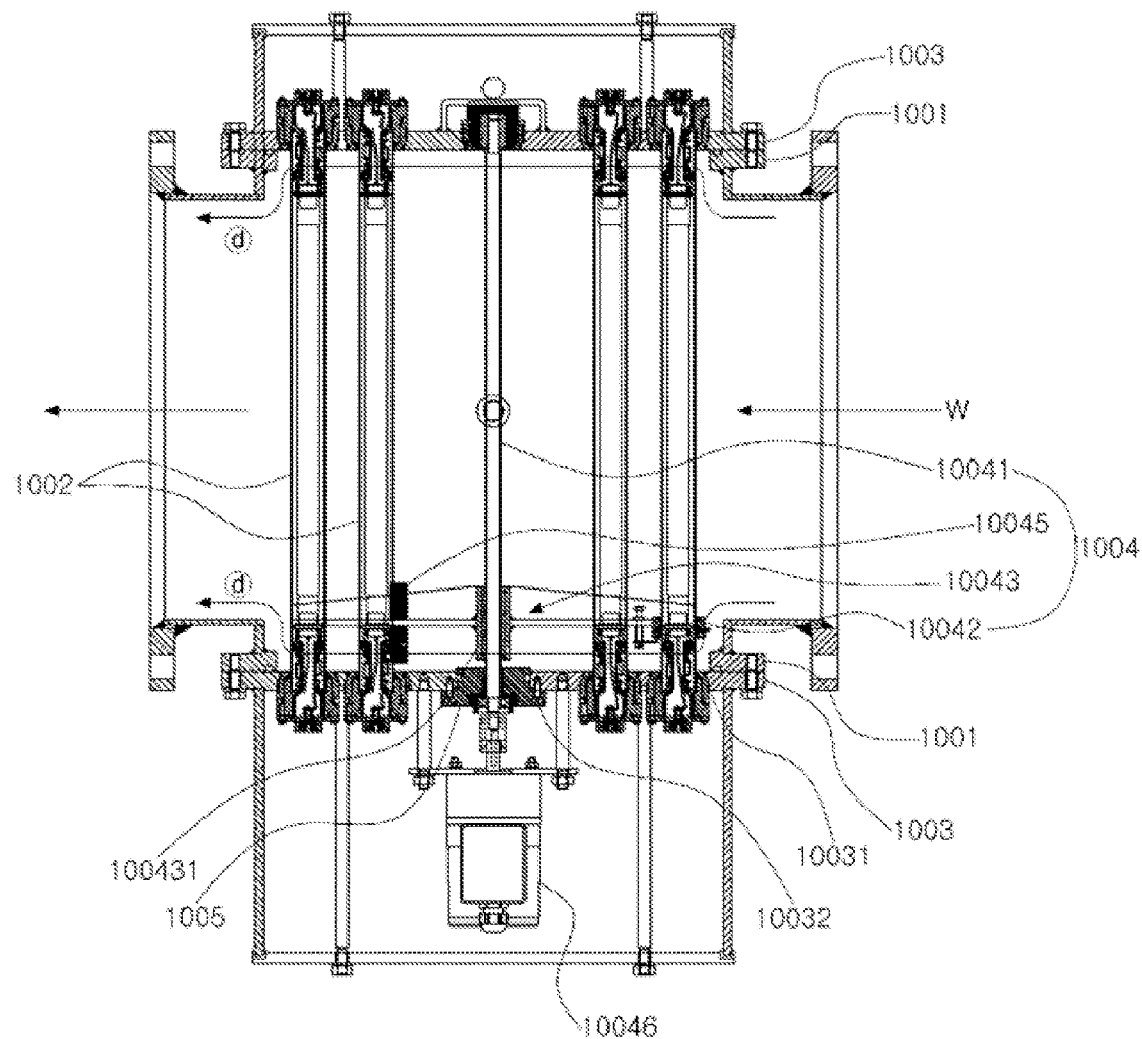
FIG. 36 is a sectional view showing the flow of ballast water in the conventional ultraviolet ballast water treatment apparatus.

In the case of the conventional ultraviolet ballast water treatment apparatus, as shown in FIGS. 1 and 36, the space in the body 1001 is partitioned by the partition plates 1003 into the ballast-water-flowing space and the no-ballast-water space. The opposite ends of the ultraviolet lamps 1002 that are oriented perpendicular to the direction in which ballast water flows through the body 1001 are respectively supported by the partition plates 1003. The electrodes 10021 for generating ultraviolet rays (no ultraviolet ray is emitted from portions of the ultraviolet lamps 1002 that are adjacent to the electrodes 10021) are respectively provided on the opposite ends of each ultraviolet lamp 1002. Each electrode 10021 protrudes a predetermined length from the corresponding partition plate 1003 into the ballast-water-flowing space. Therefore, as shown in FIG. 36, with regard to the flow of ballast water in the body 1001, in the case of the flow ⓓ of ballast water that linearly moves along the opposite partition plates 1003 after drawn into the body through the inlet port, ballast water passes through only the portions of the ultraviolet lamps 1002 that are adjacent to the opposite electrodes 10021 and thus are not exposed to ultraviolet rays. Therefore, the sterilization effect of ultraviolet rays on ballast water is reduced. Thus, there is a problem in that microbes contained in such a flow of ballast water are discharged to the outside without being treated.

Furthermore, in the conventional ultraviolet ballast water treatment apparatus, as shown in FIG. 36, the opposite ends of the ultraviolet lamps 1002, the drive motor, etc. are disposed in the no-ballast-water spaces defined by the partition plates 1003. The no-ballast-water space that receives the comparatively large drive motor therein is comparatively large in volume, because it has the same diameter as that of the body 1001 and extends a predetermined length that can cover the entirety of the drive motor. Given characteristics of the ultraviolet ballast water treatment apparatus that is installed in a vessel defining a limited space therein, if the ultraviolet ballast water treatment apparatus is excessively large, a problem of inefficient use of space is caused.

To avoid the above problems of the conventional technique, in the flow of ballast water through the body 10 according to this embodiment of the present invention, as shown in FIGS. 3, 4, 37, and 38, ballast water that flows along the partition plates 130 supporting the opposite ends of the ultraviolet lamps 310 and passes by the electrodes 311 provided on the opposite ends of the ultraviolet lamps 310 without being directly exposed to ultraviolet rays collides with the protruding plate 160 around the outlet port 125. Thus, the direction of the flow of ballast water is changed such that ballast water passes by the portions of the ultraviolet lamps 310 that emit ultraviolet rays and thus is directly exposed to ultraviolet rays before being discharged out of the body 10 through the outlet port 125.

Figure 37:
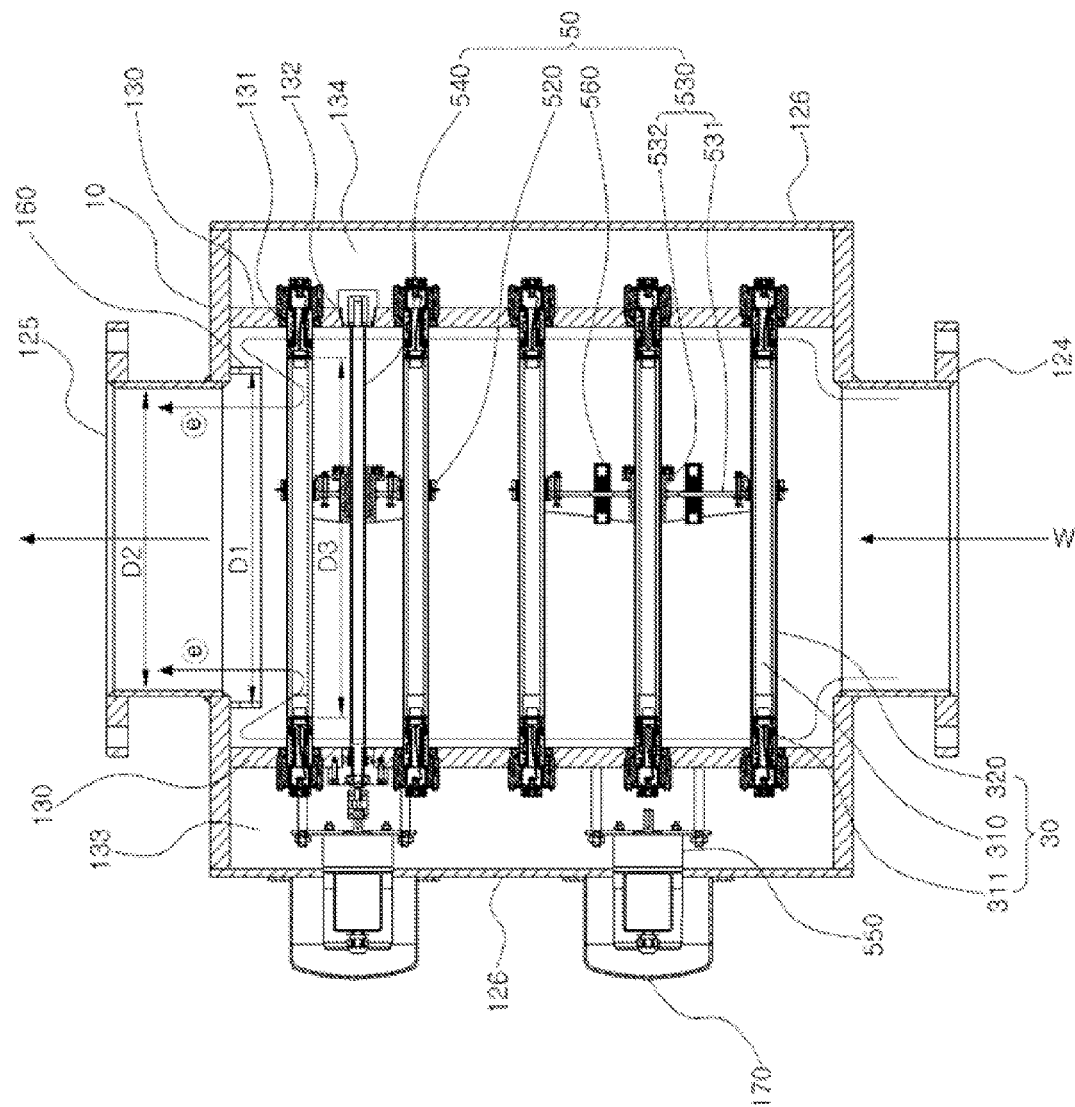
FIG. 37 is a sectional view taken along line D-D' of an ultraviolet ballast water treatment apparatus according to still another embodiment of the present invention.

In detail, as shown in FIG. 37, the protruding plate 160 is made of cylindrical member that surrounds the entirety of the circumference of the outlet port 125 (typically, having a cylindrical shape) on the inner surface of the body 10 and protrudes a predetermined length from the inner surface of the body 10. With regard to the operation of the protruding plate 160, in the case of the flow ⓔ of ballast water that linearly moves along the opposite partition plates 130 after being drawn into the body 10 through the inlet port 124 and passes through only the portions of the ultraviolet lamps 310 that are adjacent to the opposite electrodes 311, the ballast water cannot be directly discharged to the outside through the outlet port 125. That is, the ballast water collides with the protruding plate 160 around the outlet port 125, so that the flow of ballast water is changed to the reverse direction. Thus, the ballast water moves away from the electrodes 311 of the ultraviolet lamp 310 disposed adjacent the outlet port 125 and then passes by the portion of the ultraviolet lamp 310 that directly emit ultraviolet rays. Thereby, the ballast water can be directly exposed to ultraviolet rays before being discharged out of the body 10 through the outlet port 125. In this way, the protruding plate 160 can prevent ballast water from being directly discharged out of the body through the outlet port 125 without being directly exposed to ultraviolet rays. Thereby, the ballast water treatment efficiency can be enhanced. The diameter D1 of the protruding plate 160 is equal to or larger than the diameter D2 of the outlet port 125 and is equal to or less than the distance D3 between the opposite electrodes 311 of each ultraviolet lamp 310.

Figure 38:
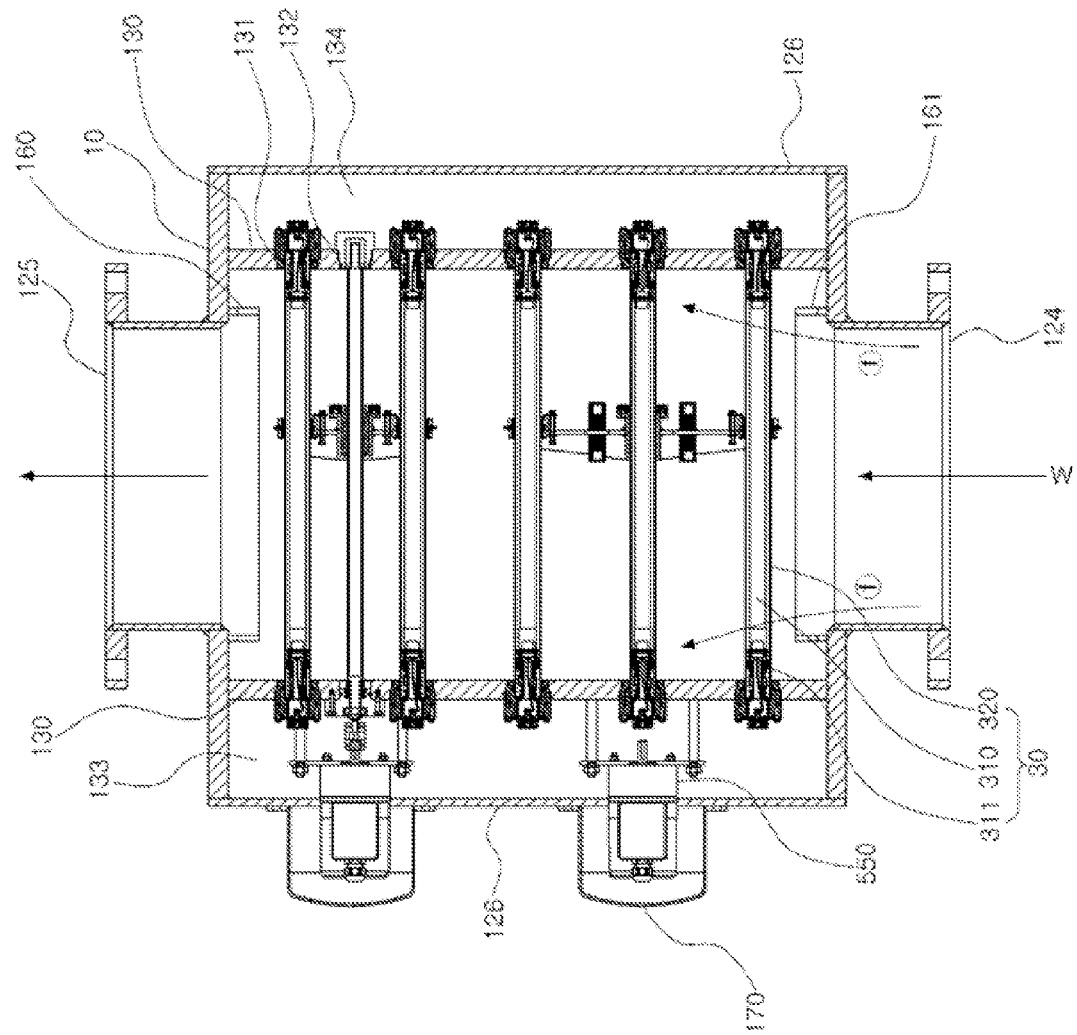
FIG. 38 is a sectional view showing an ultraviolet ballast water treatment apparatus with an additional second blade plate, corresponding to the view of FIG. 37.

Furthermore, as shown in FIG. 38, a second protruding plate 161 may be provided on the inner surface of the body 10. The second protruding plate 161 protrudes a predetermined length from the inner surface of the body 10 and surrounds the inlet port 124, through which ballast water is drawn into the body 10. The second protruding plate 161 can reduce a rate at which ballast water drawn into the body 10 through the inlet port 124 directly moves toward the opposite electrodes 311 of the ultraviolet lamps 310 along the partition plates 130 just after being drawn into the body 10. The second protruding plate 161, other than being provided around the inlet port 124, has a similar structure to that of the above-mentioned protruding plate 160. With regard to the operation of the second protruding plate 161, in the case of the flow (f) of ballast water drawn into the body 10 through the inlet port 124, if there is no element such as the second protruding plate 161, there is a high possibility for ballast water that passes by the inner circumferential surface of the inlet port 124 to move toward the opposite electrodes 311 of the ultraviolet lamps 310 along the partition plate 130 just after being drawn into the body 10. However, in the case where the second protruding plate 161 is provided around the inlet port 124, ballast water just after being drawn into the body through the inlet port 124 is guided by the second protruding plate 161 such that the ballast water moves toward the central portion of the body 10 rather than toward the opposite partition plates 13 of the body 10. Thus, the drawn ballast water passes by at least the portions of the ultraviolet lamps 310 that directly emit ultraviolet rays, rather than by the electrodes 311 of the ultraviolet lamp 310 that is adjacent to the inlet port 124. Consequently, the ballast water treatment efficiency of ultraviolet rays can be further enhanced.

Furthermore, in the present invention, as shown in FIGS. 37 and 38, the first and second spaces 133 and 134 in which there is no ballast water are defined by the partition plates 130 in the body 10. These opposite spaces 133 and 134 have minimized sizes (volumes) appropriate to receive the opposite ends of the ultraviolet lamps 310 and the opposite ends of the drive shaft 540 therein. A separate motor receiving casing 170 is provided on the outer surface of the body 10, and the drive motor 550 that is larger (longer) than the first or second space of the body 10 is received in the motor receiving casing 170. In this way, the entire volume of the body 10 can be reduced compared to that of the conventional technique, whereby space required for installation of the ultraviolet ballast water treatment apparatus in a vessel having a limited space can be reduced. That is, the sum of the volume of the motor receiving casing 170 and the volumes of the opposite first and second spaces of the body 10 that are minimized to the degree appropriate to receive only the opposite ends of the ultraviolet lamps 310 and drive shafts 540 can be markedly reduced compared to the sum of the volumes of the opposite spaces of the body 1001 of the conventional ultraviolet ballast water treatment apparatus that have sizes enough to receive the entirety of the drive motor.

Referring to FIGS. 3, 4, 39, and 40, an ultraviolet ballast water treatment apparatus according to still another embodiment of the present invention includes a plurality of ultraviolet ray sensors 340 that measure the intensity of ultraviolet rays emitted from the ultraviolet lamps 310. Thus, even if any one of the ultraviolet ray sensors 340 malfunctions, the control unit (not shown) that generally controls the operation of the ultraviolet ballast water treatment apparatus can use the other normal ultraviolet ray sensors 340 and continuously operate the ultraviolet ballast water treatment apparatus without interrupting the operation of the apparatus.

Figure 2:
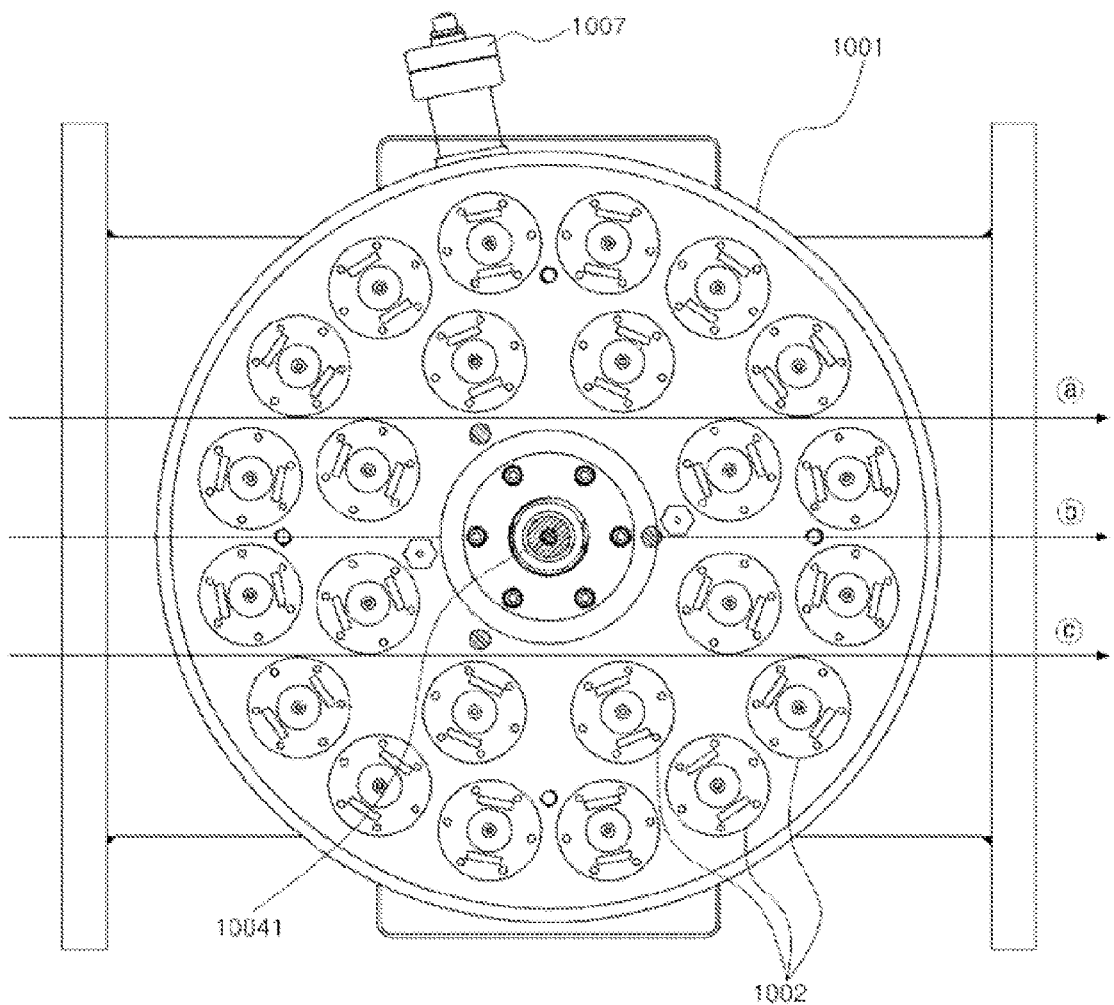
FIG. 2 is a sectional view taken along line A-A' of the conventional ultraviolet ballast water treatment apparatus.

In the case of the conventional ultraviolet ballast water treatment apparatus, as shown in FIGS. 1 and 2, the single ultraviolet ray sensor 1007 is provided in the body 1001 so as to measure the intensity of ultraviolet rays emitted from the ultraviolet lamps 1002. That is, the control unit (not shown) that generally controls the operation of the ultraviolet ballast water treatment apparatus uses measured values transmitted from only the single ultraviolet ray sensor 1007 to control the operation of the ultraviolet ballast water treatment apparatus. If the ultraviolet ray sensor 1007 malfunctions, the general operation of the ultraviolet ballast water treatment apparatus must be interrupted during a process of repairing the ultraviolet ray sensor 1007 or replacing it with a new one. There is a problem in that use of the ultraviolet ballast water treatment apparatus becomes inefficient. Furthermore, the single ultraviolet ray sensor 1007 is disposed at a predetermined position in the body 1001 and is affected most by ultraviolet rays emitted from the ultraviolet lamps 1002 adjacent to the ultraviolet ray sensor 1007. Even if the intensity of ultraviolet rays emitted from the ultraviolet lamps 1002 adjacent to the ultraviolet ray sensor 1007 is normal but the intensity of ultraviolet rays emitted from the ultraviolet lamps 1002 far from the ultraviolet ray sensor 1007 is less than the normal value, the ultraviolet ray sensor 1007 determines that the intensity of ultraviolet rays is within the normal range and transmits it to the control unit. In this case, ballast water passing by the ultraviolet lamps 1002 far from the ultraviolet ray sensor 1007 may be discharged out of the body without being normally treated by ultraviolet rays, and the ultraviolet ray sensor 1007 cannot detect such abnormal treatment.

Figure 39:
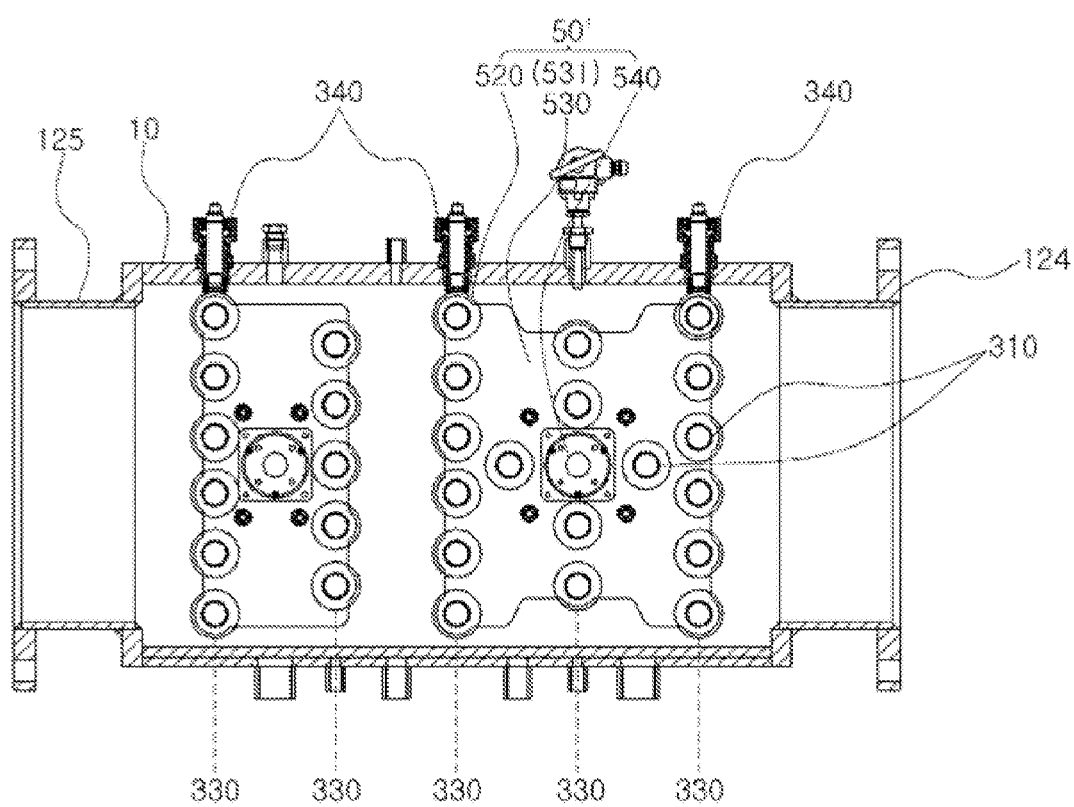
FIG. 39 is a sectional view taken along line C-C' of an ultraviolet ballast water treatment apparatus according to still another embodiment of the present invention.

To avoid the above conventional problems, in the present invention, as shown in FIGS. 3, 4, and 39, the several ultraviolet ray sensors 340 for measuring the intensity of ultraviolet rays emitted from the ultraviolet lamps 310 are provided in the body 10. Even if any one of the ultraviolet ray sensors 340 malfunctions, the control unit (not shown) that generally controls the operation of the ultraviolet ballast water treatment apparatus can use the other ultraviolet ray sensors 340 and continuously operate the ultraviolet ballast water treatment apparatus without interrupting the operation of the apparatus. That is, as shown in FIG. 39, in the case where the ultraviolet ray sensors 340 are installed at positions spaced apart from each other at regular intervals in the body 10, even if any one of the ultraviolet ray sensors 340 malfunctions, the control unit (not shown) can use the intensity of ultraviolet rays measured by the other ultraviolet ray sensors 340 and continuously control the general operation of the ultraviolet ballast water treatment apparatus without requiring interruption of the ultraviolet ballast water treatment apparatus for replacement of the malfunctioning ultraviolet ray sensor 340.

In addition, the control unit (not shown) calculates an average of values measured by the ultraviolet ray sensors 340 and uses the averages to control the operation of the ultraviolet ballast water treatment apparatus. That is, as pointed out in the problems of the conventional technique, in the case where only the single ultraviolet ray sensor is installed at a predetermined position, even when the intensity of ultraviolet rays emitted from the ultraviolet ray sensor disposed far from the ultraviolet ray sensor is less than the normal value, the ultraviolet ray sensor may determine that the intensity of ultraviolet rays is normal and transmit it to the control unit if the intensity of ultraviolet rays emitted from the ultraviolet lamps disposed adjacent to the ultraviolet ray sensor is within a normal range. Therefore, there are problems in that the operation of the ultraviolet ballast water treatment apparatus may not be precisely controlled, and the treatment efficiency may be reduced. On the other hand, the ultraviolet ballast water treatment apparatus according to the present invention uses an average of values measured by the several ultraviolet ray sensors 340 that are installed at positions spaced apart from each other at regular intervals. That is, intensity values of portions where the intensity of ultraviolet rays measured is comparatively large and intensity values of portions where the intensity of ultraviolet rays measured is comparatively small are added up and then an ultraviolet ray intensity average for the entirety of the body 10 is calculated. The ultraviolet ray intensity average is used to control the ultraviolet ballast water treatment apparatus. If the ultraviolet ray intensity average for the entirety of the body 10 is equal to or less than a reference value, the control unit interrupts the operation of the ultraviolet ballast water treatment apparatus to prevent untreated ballast water from being discharged out of the body.

Furthermore, in the present invention, specially, in the case where three or more ultraviolet ray sensors 340 are provided, if there is an ultraviolet ray sensor 340 of which a measured value is markedly different from the calculated average, the control unit (not shown) classifies the ultraviolet ray sensor 340 as a malfunctioning ultraviolet ray sensor and excludes the value measured by the ultraviolet ray sensor 340 classified as the malfunctioning ultraviolet ray sensor from the values used for calculating the average. Therefore, the average for use in controlling the operation of the ultraviolet ballast water treatment apparatus can be more precisely calculated. Typically, even though the performance of an ultraviolet lamp 310 is reduced and the intensity of ultraviolet rays emitted therefrom is reduced, the case where the performance of the ultraviolet lamp is gradually reduced over a predetermined period of time is common, and the case where the intensity of ultraviolet rays is suddenly rapidly reduced is seldom caused. A rapid reduction in the value of the intensity of ultraviolet rays measured by an ultraviolet ray sensor 340 is mainly because there is a problem in the ultraviolet ray sensor 340 itself. Particularly, this is more apparent, considering that each ultraviolet ray sensor 340 measures the intensity of ultraviolet rays emitted from the several peripheral ultraviolet lamps 310 rather than measuring the intensity of ultraviolet rays emitted from only the single ultraviolet lamp 310. Given this, in the present invention, among the three ultraviolet ray sensors 340 installed in the body 10, if there is an ultraviolet ray sensor 340 of which a measured value is markedly different from the calculated average, the control unit classifies the ultraviolet ray sensor 340 as a malfunctioning ultraviolet ray sensor and excludes the value measured by the ultraviolet ray sensor 340 classified as the malfunctioning ultraviolet ray sensor from the values used for calculating the average. As such, because the value measured by the malfunctioning ultraviolet ray sensor is excluded in calculating the average of the intensity of ultraviolet rays, the average can be more precisely calculated. Consequently, the operation of the ultraviolet ballast water treatment apparatus can be more precisely controlled.

Figure 40:
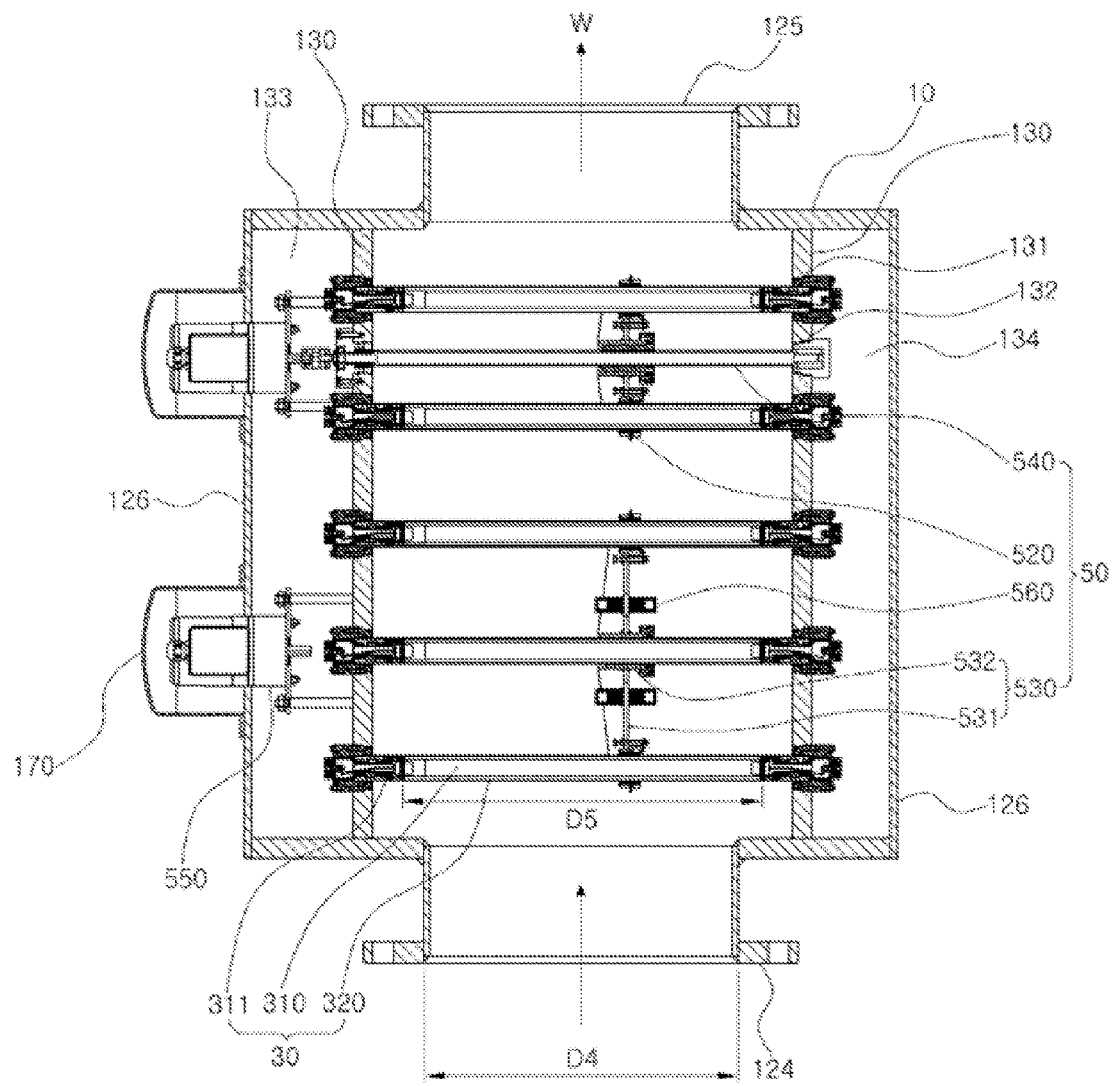
FIG. 40 is a view illustrating relationship a length of an ultraviolet lamp and a diameter of an inlet port.

Moreover, referring to FIG. 40, the space in the body 10 is partitioned by the partition plates 130 into the space through which ballast water that is drawn into the body 10 through the inlet port 124 and discharged out of the body 10 through the outlet port 125 flows, and the space through which no ballast water flows. The ultraviolet lamps 310 are oriented perpendicular to the direction of the flow of ballast water that passes through the inlet port 124 and the outlet port 125. The opposite ends of the ultraviolet lamps 310 are supported by the partition plates 130. The electrodes 311 that are provided on the respective opposite ends of each ultraviolet lamp 310 (no ultraviolet ray is emitted from portions of the ultraviolet lamp 310 that are adjacent to the electrodes 311) protrude from the partition plates 130 into the ballast-water-flowing space. Thus, the length of the portion of the ultraviolet lamp 310 that substantially directly emits ultraviolet rays in the ballast-water-flowing space is a distance D5 between the opposite electrodes 311. Given this, the present invention is preferably configured such that a diameter D4 of the inlet port 124 or the outlet port 125 is equal to or less than the distance D5 between the opposite electrodes of the ultraviolet lamp 310. By virtue of this structure, ballast water drawn into the body 10 through the inlet port 124 can be moved, at the early stage of inflow into the body 10, directly toward the portions of the ultraviolet lamps 310 that are between the opposite electrodes and that substantially emit ultraviolet rays. In other words, ballast water drawn into the body 10 through the inlet port 124 can be prevented from directly moving toward the opposite electrodes 311 of the ultraviolet lamps 310 and flowing along the partition plates 130 without being exposed to ultraviolet rays. In this embodiment, particularly, the diameter D4 of the inlet port 124 is equal to or less than the distance D5 between the opposite electrodes of the ultraviolet lamp 310. Thus, in an initial stage when ballast water is drawn into the body through the inlet port 124, the ballast water can flow toward the portions of the ultraviolet lamps 310 that are between the opposite electrodes and that substantially directly emit ultraviolet rays. Consequently, the ballast water treatment effect of ultraviolet rays can be further enhanced.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An ultraviolet ballast water treatment apparatus having a rectangular cross-section, comprising:
   a body including an inlet port and an outlet port through which ballast water is drawn into and discharged out of the body;
   an ultraviolet lamp unit including ultraviolet lamps applying ultraviolet rays to ballast water flowing through the body; and
   a washing unit provided to remove foreign substances adhering to the ultraviolet lamp unit,
   wherein a cross-section of the body that is perpendicular to a direction of orientation of the ultraviolet lamps is rectangular, and the ultraviolet lamps are arranged at regular intervals in the rectangular cross-section, whereby a number of ultraviolet lamps arranged per a unit cross-sectional area is minimized.

2. The ultraviolet ballast water treatment apparatus of claim 1, wherein the ultraviolet lamps form a plurality of lines in the rectangular cross-section of the body, each of the lines including the corresponding ultraviolet lamps arranged in a row perpendicular to a direction in which the ballast water flows,
   wherein the ultraviolet lamps of a second line spaced apart from a first line adjacent to the inlet port by a predetermined distance with respect to the direction of the flow of ballast water are respectively disposed between the ultraviolet lamps of the first line when seen in the direction of the flow of ballast water, whereby the ballast water is prevented from being discharged out of the body without colliding with the ultraviolet lamps.

3. The ultraviolet ballast water treatment apparatus of claim 2, wherein a drive shaft provided to move an arm provided with a wiper is disposed between the lines, the wiper being used to remove foreign substances adhering to the ultraviolet lamp unit.

4. The ultraviolet ballast water treatment apparatus of claim 2, wherein the lines comprise three lines, and a drive shaft provided to move an arm provided with a wiper is disposed on an intermediate line of the three lines, the wiper being used to remove foreign substances adhering to the ultraviolet lamp unit, wherein the ultraviolet lamp of the intermediate line that corresponds to a position interfering with the drive shaft is disposed ahead of or behind the drive shaft with respect to the direction of the flow of the ballast water, whereby the ballast water is prevented from being discharged out of the body without colliding with the ultraviolet lamps.

5. The ultraviolet ballast water treatment apparatus of claim 1, wherein the washing unit comprises:
  a wiper body encircling each of the ultraviolet lamps, with a wiper installed in the wiper body, the wiper being used to remove foreign substances;
  an arm connecting the wiper body to a drive shaft; and
  a drive motor providing power to the drive shaft moving the arm, wherein the wiper comprises a main wiper part and an auxiliary wiper part installed in the wiper body, the main wiper part and the auxiliary wiper part doubly removing foreign substances adhering to the ultraviolet lamp unit.

6. The ultraviolet ballast water treatment apparatus of claim 5, wherein the main wiper part is disposed in a central portion of an inner circumferential surface of the wiper body, the main wiper part removing foreign substances adhering to the ultraviolet lamp unit disposed inside the wiper body, and the auxiliary wiper part comprises auxiliary wiper parts respectively disposed on opposite sides of the main wiper parts so that when the arm is moved forward or rearward, foreign substances adhering to the ultraviolet lamp unit are primarily removed by a corresponding one of the auxiliary wiper parts before being wiped by the main wiper part.

7. The ultraviolet ballast water treatment apparatus of claim 6, wherein each of the auxiliary wiper parts comprises an inclined protrusion protruding from an inner circumferential surface of a main body of the auxiliary wiper part outward and forward in a direction inclined by a predetermined angle, the inclined protrusion comprising a pointed part coming into line contact with a surface of the ultraviolet lamp unit rather than making surface contact therewith, and the main wiper part comprises: a depression in an inner circumferential surface thereof that comes into contact with the surface of the ultraviolet lamp unit; and a first blade and a second blade respectively provided on opposite sides of the depression.

* * * * *